(12) United States Patent
Koshoubu et al.

(10) Patent No.: US 11,269,139 B2
(45) Date of Patent: Mar. 8, 2022

(54) WAVEGUIDE TYPE OPTICAL INTERFEROMETER CIRCUIT

(71) Applicant: Nippon Telegraph and Telephone Corporation, Tokyo (JP)

(72) Inventors: Nobutatsu Koshoubu, Atsugi (JP); Ryoichi Kasahara, Atsugi (JP); Katsuhiko Hirabayashi, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/971,486

(22) PCT Filed: Feb. 21, 2019

(86) PCT No.: PCT/JP2019/006667
§ 371 (c)(1),
(2) Date: Aug. 20, 2020

(87) PCT Pub. No.: WO2019/163924
PCT Pub. Date: Aug. 29, 2019

(65) Prior Publication Data
US 2020/0386943 A1    Dec. 10, 2020

(30) Foreign Application Priority Data

Feb. 22, 2018 (JP) .............. JP2018-030103
Jun. 11, 2018 (JP) .............. JP2018-111233

(51) Int. Cl.
*G02B 6/12* (2006.01)

(52) U.S. Cl.
CPC ..... *G02B 6/12014* (2013.01); *G02B 6/12028* (2013.01); *G02B 6/12033* (2013.01); *G02B 2006/12159* (2013.01)

(58) Field of Classification Search
CPC ............ G02B 6/12014; G02B 6/12028; G02B 6/12033; G02B 2006/12159
See application file for complete search history.

(56) References Cited

U.S. PATENT DOCUMENTS

| 9,722,706 B1 | 8/2017 | Liu et al. |
| 2004/0126052 A1 | 7/2004 | Kamei et al. |

(Continued)

FOREIGN PATENT DOCUMENTS

| CN | 1510461 A | 7/2004 |
| JP | 2003-075662 A | 3/2003 |

(Continued)

OTHER PUBLICATIONS

International Search Report dated Mar. 19, 2019, issued in PCT Application No. PCT/JP2019/006667, filed Feb. 21, 2019.

(Continued)

*Primary Examiner* — Sung H Pak
(74) *Attorney, Agent, or Firm* — Workman Nydegger

(57) ABSTRACT

A dependency of a characteristic of an optical circuit on an optical signal intensity occurring due to input of a high intensity optical signal is reduced in a waveguide type optical interferometer circuit. The waveguide type optical interferometer circuit is a waveguide type optical interferometer circuit formed in one plane, and includes an input waveguide, an optical branching unit, an optical coupling unit, an output waveguide, and optical waveguides having different lengths from each other and being interposed between the optical branching unit and the optical coupling unit. A light intensity compensating region is formed on an optical path extending from the optical branching unit to the optical coupling unit, and the light intensity compensating region is formed by using a light intensity compensating material having a light intensity coefficient different from a light intensity coefficient of an optical distance relative to an incident light intensity in the optical path.

19 Claims, 59 Drawing Sheets

(56) References Cited

U.S. PATENT DOCUMENTS

| | | |
|---|---|---|
| 2006/0198579 A1 | 9/2006 | Bulthuis et al. |
| 2011/0229080 A1 | 9/2011 | Bulthuis et al. |
| 2013/0101252 A1* | 4/2013 | Rasras .............. G02B 6/12014 385/24 |

FOREIGN PATENT DOCUMENTS

| | | |
|---|---|---|
| JP | 2005-148585 A | 6/2005 |
| JP | 2008-532094 A | 8/2008 |

OTHER PUBLICATIONS

Hiroko Nagano et al., *Design and Application to Environmental Sensing of a Compact Spectroscopic Sensor Using a Visible Arrayed Waveguide Grating*, The Review of the Laser Engineering, vol. 35, No. 4, Apr. 2007, pp. 265-272.

Kinichi Tsunoda, *Waveguide Chemical- and Bio-Sensors Using Evanescent Wave*, Optical Review, vol. 34, No. 10, 2005, pp. 513-517.

Terui, Hiroshi et al., "Reduction of Second-Order Temperature Dependence of Athermal AWG with Resin-Filled Groove by Pressure Control", IEEE Photonics Technology Letters, Oct. 1, 2009, vol. 21, No. 19, pp. 1426-1428.

* cited by examiner

WAVEGUIDE TYPE OPTICAL INTERFEROMETER CIRCUIT

TECHNICAL FIELD

The present invention relates to a waveguide type optical interferometer circuit, or more specifically, to a waveguide type optical interferometer circuit using an optical waveguide provided with high optical power resistance having high stability against an input signal with a high light intensity, which is applicable, for example, to optical communication, optical information processing, optical measurement and analysis, and so forth.

BACKGROUND ART (Silica-Based Planar Lightwave Circuit)

In the technical field of optical communication, an "optical fiber", a "light emitting element", and a "light receiving element" have heretofore been said to be three fundamental elements of the optical communication. In addition to these three elements, an optical communication system that makes use of excellent transmission characteristics of optical fibers also requires various optical components and associated techniques that encompass optical filters, optical multiplexers, optical demultiplexers, optical switches, optical modulators, and so forth. These optical components have been used for enhancing functions, reliability, and economic efficiency of optical communication networks and have thus contributed to the evolution of optical communication systems.

The aforementioned optical components can realize various functions by using a planar lightwave circuit (PLC) that applies an optical waveguide formed on a substrate plane. Research and development have been conducted on various optical components that construct optical circuits with optical waveguides using various materials including semiconductors such as InP and Si, polymers, and the like. Among them, a silica-based PLC adopting silica-based glass has excellent characteristics in light of mass productivity, low cost, and high reliability. The silica-based PLC can realize an optical interference circuit that brings about various interferences of components of light with one another, and has been widely put into practical use in the field of optical communication.

In the PLC, a device aims at signal light demultiplexing or optical path conversion by means of interference, for example. In particular, a device having excellent wavelength multiplexing-demultiplexing functions by using multiple optical interferences is realized with a Mach-Zehnder interferometer (MZI) or an arrayed waveguide grating (AWG).

(PLC for Visible Light Analysis and PLC for Infrared Spectroscopy)

Meanwhile, in the technical field of optical measurement and analysis, various optical circuits for measurement and analysis such as optical demultiplexers and sensor circuits that can be used in an ultraviolet-visible light range from 200 nm to 780 nm or in an infrared range from about 2.5 µm to about 25 µm other than optical communication wavelength ranges including the 850-nm range, the 1.3-µm range, and a range from 1.5 to 1.7 µm, have been studied as applications of the AWG and the MZI each being an excellent waveguide type optical interferometer.

To be more precise, an application of the AWG to a visible light spectrometer, an application of the MZI to a sensor that utilizes surface plasmon resonance (SPR), and the like are being studied as disclosed in NPL 1 and 2 cited below, for example.

(Mach-Zehnder Interferometer)

First, an outline of the Mach-Zehnder interferometer (MZI) will be described as an example of a conventional waveguide type optical interferometer circuit. FIG. 1 shows a substrate plan view to explain a schematic configuration of a Mach-Zehnder interferometer type optical interferometer circuit.

In FIG. 1, two input waveguides 102, directional couplers 103 and 106, two arm waveguides 104 and 105 having different lengths from each other and being interposed between the two couplers, and two output waveguides 107 are formed on a substrate 101 of a planar lightwave circuit (PLC). Signal light inputted from the input waveguides 102 on the left in FIG. 1 is demultiplexed into the two arm waveguides 104 and 105 by the directional coupler 103. After being passed through the respective arm waveguides, components of the signal light are multiplexed by the directional coupler 106 on the right. The components of the light having passed through the respective arm waveguides interfere with each other and are outputted to the respective output waveguides 107.

Assuming that a wavelength used by the signal light is λ, an effective refractive index of the optical waveguides is n, and a difference in length between the two arm waveguides 104 and 105 having the different lengths is ΔL, a wavelength dependency of transmissivity of the Mach-Zehnder interferometer (MZI) in FIG. 1 is expressed by the following Formula (1):

$$J(\lambda) = 1/2 \times \{1 + \cos[2\pi n \Delta L/\lambda]\} \qquad \text{Formula (1)}$$

Based on Formula (1), a wavelength λc that maximizes the transmissivity of the Mach-Zehnder interferometer in FIG. 1 is given by the following Formula (2):

$$\lambda c = n \times \Delta L / k \qquad \text{Formula (2),}$$

where k is a positive integer.

(Arrayed Waveguide Grating)

Next, the arrayed waveguide grating (AWG) will be described as another example of the conventional waveguide type optical interferometer circuit. FIG. 2 shows a substrate plan view to explain a schematic configuration of the arrayed waveguide grating (AWG).

In FIG. 2, an input waveguide 202, an optical branching unit 203, an optical coupler 206, multiple arrayed optical waveguides 207, and multiple output waveguides 208 are formed on a substrate 201 of a planar lightwave circuit (PLC).

As with FIG. 1, in the AWG of FIG. 2, signal light inputted from the input waveguide 202 on the left is demultiplexed into the multiple arrayed optical waveguides 207 by the optical branching unit 203. After having propagated through the arrayed optical waveguides having different lengths from one another, components of the light from the respective arm waveguides are multiplexed and caused to interfere with one another in the optical coupler 206 on the right. The interfering light components are outputted from the multiple output waveguides 208, respectively.

The arrayed waveguide type wavelength multiplexer-demultiplexer described above is characterized by its capability of multiplexing and demultiplexing the wavelength-multiplexed light containing multiple wavelengths in a lump by using the interferences of the multiple components of light propagating on several tens to hundreds of the arrayed optical waveguides 207 being disposed in parallel and having the lengths different from one another by the length ΔL, and is therefore used as a key device for wavelength multiplexing optical communication.

FIG. 3 shows an example of a transmissivity spectrum from a central input port to a central output port of the AWG in FIG. 2. The transmissivity spectrum of FIG. 3 achieves an excellent narrow band characteristic of about 1 nm with the center of peak at 1545.5 nm.

In this transmissivity spectrum, a wavelength λc' that maximizes the transmissivity is given by the following Formula (3):

$$\lambda c' = n \times \Delta L / m \qquad \text{Formula (3)}$$

Here, m is the order of diffraction (a positive integer) and n is the effective refractive index of the waveguides. Meanwhile, ΔL is the difference in length between the arrayed optical waveguides adjacent to each other, which is specifically a value in a range from about 10 to 100 μm.

CITATION LIST

Non Patent Literature

NPL 1: "Design and Application to Environmental Sensing of a Compact Spectroscopic Sensor using a Visible Arrayed Waveguide Grating", The Review of the Laser Engineering, Vol. 35, 4, April 2007, pp 265-272

NPL 2: "Waveguide Chemical- and Bio-Sensors Using Evanescent Wave", Optical Review, Vol. 34, 10, 2005, pp 513-517

SUMMARY OF INVENTION

The aforementioned conventional waveguide type optical interferometer circuits have the following problems.

(Problem in Increasing Intensity of Optical Power Density by Signal Multiplexing for Use in Optical Communication)

In a current optical communication system involving a broad bandwidth and a large transmission capacity, multichannel signals are simultaneously transmitted on a single transmission optical fiber by using various signal multiplexing techniques including time multiplexing, optical wavelength multiplexing, phase multiplexing, and so forth in order to enhance communication efficiency. Accordingly, multichannel signals are multiplexed and transmitted on a single core of an optical waveguide in an optical waveguide circuit as well.

In order to maintain an S/N ratio of an optical signal on each channel at a predetermined level or above and to gain a transmittable distance without performing optical amplification due to an equipment-related situation, an optical signal of a predetermined intensity or above needs to be transmitted on each channel. Even if the light intensity of each channel signal is not very high, an extremely large number of the channel signals are multiplexed and transmitted whereby an optical signal having an extremely high intensity will flow in the core of the single optical waveguide as a consequence. For instance, even if the light intensity of each channel is about 0.1 mW, signal multiplexing of more than 1000 channels will result in transmission of high intensity light in excess of 100 mW in the core of the single optical waveguide core having a micrometer-order size. Thus, the optical waveguide faces instability of its optical characteristics that may lead to deterioration or destruction of the material of the core.

(Problems Related to Optical Measurement and Analysis Applications Such as Raman Spectroscopy and FT-IR)

Meanwhile, in the technical field of optical measurement and analysis, there is a situation where detection sensitivity grows larger as the intensity of incident light is larger in the case of applications to spectroscopes, sensors, and so forth in the ultraviolet-visible light range from 200 nm to 780 nm or in the infrared range from about 2.5 μm to about 25 μm as mentioned above.

For example, a signal intensity of incident light is attenuated to about $10^{-6}$ in the case of a Raman scattering spectroscope and this spectroscope therefore requires an incident light intensity of at least several milliwatts in order to ensure sufficient detection sensitivity. Specifically, an excitation light source of a laser having a wavelength of 532 nm with output power of at least about 5 mW is used in general.

Meanwhile, as a light source for a Fourier transform infrared spectrometer (FT-IR), a tungsten iodine lamp is used for a range of wavenumbers from 12500 $cm^{-1}$ (0.8 μm) to 3800 $cm^{-1}$ (a wavelength of about 2.63 μm) and a high intensity ceramic light source is used for a range from 7800 $cm^{-1}$ (1.282 μm) to 240 $cm^{-1}$ (41.7 μm). In each case, the light intensity of the light source needs to be at least about 0.5 mW.

As described above, optical wavelength filters of the waveguide type optical interferometers such as the MZI and the AWG are required to have stability of optical characteristics regarding high light intensity input at respective optical wavelengths so as to improve detection sensitivity not only in the case of using a near infrared range of an optical communication wavelength band in the field of the optical communication but also in the case of using the ultraviolet-visible light range or the infrared range in the field of applications to the spectroscopes and sensors.

(Change in Optical Distance Due to Light Intensity)

In general, every optical material exhibits a non-linear optical phenomenon in a case where the light intensity is extremely high. For example, a refractive index is not a constant value but varies depending on the light intensity due to a non-linear refractive index effect. In other words, an optical distance L (which is also referred to as an optical length of an optical path, and is equivalent to an integral along a route of either a product nl of an absolute refractive index n of a medium that allows passage of the light and a physical distance of passage 1, or a value nds obtained by multiplying a spatial linear element ds by the absolute refractive index n) varies with a light intensity I. Regarding the material of the waveguide used to form the waveguide type optical interferometer, such a change in effective refractive index relative to the incident light intensity (the non-linear refractive index effect) is not negligible.

(Non-Linear Refractive Index Effect)

An electric field attributed to intense light using a laser or the like induces a linear polarization and also a non-linear polarization which is proportional to a high-order term of the electric field of the light. These high-order polarizations are considered to emerge due to distortions of electronic structures of ions, molecules, complexes, and so forth by the intense electric field of the incident light.

In the case where the light intensity of the incident light is high, the change in refractive index or absorption is induced due to the non-linear polarization in which the light and the medium intensely interact with each other. A non-linear optical susceptibility is a complex number ($\chi = \chi' + i\chi''$), in which a real part ($\chi'$) is linked to non-linear refraction while an imaginary part ($\chi''$) is linked to absorption in a positive case and release in a negative case, respectively.

Based on the SI system of unit, a dependency of the refractive index (n) on the light intensity (I [W/m²]) is expressed as follows:

$$n = n_0 + n_2 \times I \quad \text{Formula (4)},$$

where $n_0$ is a dimensionless number being a normal linear refractive index and $n_2$ (m²/W) is a coefficient called a non-linear refractive index.

(Factors for Non-Linear Refractive Index Effect)

Physical factors to cause the non-linear refractive index effect are enumerated below in accordance with the order of the larger non-linear refractive index $n_2$ (generally in the order of slower response time $\tau$):

(1) a thermal effect (an effect due to a temperature coefficient of the refractive index, thermal expansion, and so forth) ($n_2 \approx 10^{-3}$ to $10^{-6}$(m²/W)m $\pi \approx 10^{-1}$ sec);
(2) an effect produced as an imaginary part of optical resonance absorption saturation from the Kramers-Kronig relation (also inclusive of a two-photon absorption saturation effect):
(3) an electrostrictive effect ($\tau \approx 10^{-7}$ to $10^{-9}$ sec);
(4) a molecular reorientation effect ($n_2 \approx 10^{-16}$ (m²/W), $\pi \approx 10^{-12}$ sec);
(5) an effect due to light induction motion of atomic nuclei in molecules ($\pi \approx 10^{-14}$ to $10^{-16}$ sec); and
(6) electron polarization due to light-induced electron cloud distortion of a bound electron system in an atom or a molecule ($n_2 \approx 10^{-19}$ (m²/W), $\pi \approx \mathbf{10^{-15}}$ sec), and so forth.

An organic molecular material that exhibits intramolecular charge transfer exceptionally has an extremely large $n_2 I$ and shows an ultrafast response.

Meanwhile, an effective non-linear refractive index phenomenon is also observed by using a second-order non-linear optical effect twice in a cascade fashion in which a second-order harmonic wave is generated under a quasi-phase-matched condition out of a second-order non-linear optical crystal.

Incidentally, the value of the non-linear refractive index n2 of silica-based glass ($SiO_2$) is around $2 \times 10^{-20}$ (m²/W). Accordingly, an enormous light intensity is required in order to bring about a prominent effect.

(Dependencies of Conventional MZI and AWG on Light Intensity)

As described earlier, in the case of using the conventional Mach-Zehnder interferometer (MZI) and the conventional arrayed waveguide grating (AWG) as the optical wavelength filters, the wavelengths λc and λc' that maximize the transmissivities of the light transmission spectra of the Mach-Zehnder interferometer (MZI) and the arrayed waveguide grating (AWG) are expressed by Formulae (2) and (3) mentioned above, respectively. As apparent from these formulae, both depend on n×ΔL that represents a difference in optical path length of the waveguide (the product of the effective refractive index and the length).

In the case where the effective refractive index n or the difference ΔL in optical path length varies depending on the light intensity, the light transmission spectrum of each of the Mach-Zehnder interferometer (MZI) and the arrayed waveguide grating (AWG) also varies depending on the light intensity, thus causing a change in characteristic of the optical wavelength filter.

In the meantime, a light transmission characteristic of the Mach-Zehnder interferometer (MZI) of the simplest structure is expressed by Formula (1). Accordingly, even in the case of use at the wavelength λc that maximizes the transmissivity of the light transmission spectrum, the optical transmissivity becomes the minimum if the difference n×ΔL in optical path length of the waveguides (the product of the effective refractive index and the length) is of about the same length as the wavelength λc due to the change in the light intensity. This means that the interferometer does not have any characteristics as the optical wavelength filter at all.

(Change in Optical Distance Due to Light Intensity)

As mentioned above, every material exhibits the non-linear optical phenomenon in the case where the light intensity is extremely high. Especially in a case of forming the optical waveguide from a material having a refractive index to be changed directly depending on the light intensity as in the Kerr effect in a third-order non-linear optical material, the effective refractive index of the optical waveguide varies with an increase in light intensity and the optical distance also varies with the light intensity.

Meanwhile, in a case where an optical waveguide is formed from a photoisomerization material having a molecular structure to be changed by irradiation with light having specific energy or higher, for instance, the effective refractive index of the optical waveguide varies even if the light intensity is relatively low. Accordingly, the optical characteristics as the optical wavelength filters vary as defined by Formulae (2) and (3) mentioned above.

Moreover, a transmission light loss of an optical fiber exhibits a relatively low loss of about 0.2 dB/km in a wavelength range of the 1550-nm band. In contrast, a transmission light loss of the planar lightwave circuit (PLC) made of silica-based glass is about 0.3 dB/m.

In short, a practical material of the optical waveguide neither has 100% of the transmissivity at an optical wavelength actually used nor has a temperature coefficient of the refractive index equal to zero. Therefore, an influence of the thermal effect among the factors for the non-linear refractive index effect is not negligible. In other words, the waveguide may generate heat as a consequence of absorption of the incident light signals and the effective refractive index of the optical waveguide varies because a temperature dependency (dn/dt) of the refractive index is not zero. Hence, the optical wavelength filter characteristics expressed by Formula (2) and Formula (3) vary as a consequence.

(Object of Present Invention)

The present invention has been made in view of the aforementioned circumstances, and an object thereof is to reduce a dependency of a characteristic of an optical circuit on an optical signal intensity, which occurs due to input of a high intensity optical signal to a waveguide type optical interferometer circuit such as a Mach-Zehnder interferometer (MZI) and an arrayed waveguide grating (AWG).

To attain this object, an aspect of the invention of the present application includes any of the following configurations.

(Configuration 1)

A waveguide type optical interferometer circuit formed in one plane including:
  an input waveguide;
  an optical branching unit;
  an optical coupling unit;
  an output waveguide; and
  a plurality of optical waveguides having different lengths from each other and being interposed between the optical branching unit and the optical coupling unit, in which
  a light intensity compensating region is formed on an optical path extending from the optical branching unit to the optical coupling unit, and a light intensity coefficient of an incident light intensity of an effective refractive index relative to light propagating on the optical path is different from a light intensity coefficient of an incident light intensity of an effective refractive index relative to the light propagating on the light intensity compensating region.

(Configuration 2)

The waveguide type optical interferometer circuit according to configuration 1, in which the light intensity compensating region is provided to at least one of the optical branching unit and the optical coupling unit and is formed as at least one groove intersecting with the optical path.

(Configuration 3)

The waveguide type optical interferometer circuit according to configuration 2, in which if a total incident light intensity to be made incident on the optical branching unit is defined as Ptotal, a straight line of the optical path joining a center of a connecting end from the input waveguide to a center of a connecting end to the i-th, where i is a positive integer, optical waveguide interposed between the optical branching unit and the optical coupling unit in a case of absence of the light intensity compensating region is defined as K, an optical distance of K is defined as Lai, an optical distance of the i-th optical waveguide is defined as Lbi, a total value of changes in optical distances due to formation of the light intensity compensating region having a groove width of the groove intersected by the optical path of the i-th straight line K is defined as Lri, and a light intensity coefficient of a prescribed optical distance with respect to the total incident light intensity Ptotal is defined as d/dPtotal, the waveguide type optical interferometer circuit satisfies $d(2=Lai+Lbi+Lri)/dPtotal=C$, where i=1 to N, C is a constant value irrespective of the value of i, and N is the number of the optical waveguides.

(Configuration 4)

The waveguide type optical interferometer circuit according to configuration 3, in which if a total value of an optical distance of a groove width of the groove intersected by the j-th optical path, where j is a positive integer not equal to i, is defined as Lrj, the waveguide type optical interferometer circuit satisfies $Lri>Lrj$, in a case where the optical distance Lbi of the i-th optical waveguide is larger than an optical distance Lbj of the j-th optical waveguide.

(Configuration 5)

The waveguide type optical interferometer circuit according to configuration 3, in which if a total value of an optical distance of an interval between the grooves intersected by the i-th optical path is defined as Lqi, and a total value of an optical distance of an interval between the grooves intersected by the j-th optical path, where j is a positive integer not equal to i, is defined as Lqj, the waveguide type optical interferometer circuit satisfies $Lqi>Lqj$, in a case where the optical distance Lbi of the i-th optical waveguide is larger than an optical distance Lbj of the j-th optical waveguide.

(Configuration 6)

The waveguide type optical interferometer circuit according to configuration 3, in which if a total value of an optical distance of the groove width of the groove intersected by the j-th optical path, where j is a positive integer not equal to i, is defined as Lrj, a total value of an optical distance of an interval between the grooves intersected by the i-th optical path is defined as Lqi, and a total value of an optical distance of an interval between the grooves intersected by the j-th optical path is defined as Lqj, the waveguide type optical interferometer circuit satisfies $(Lri/Lqi) \le (Lrj/Lqj)$, in a case where the optical distance Lbi of the i-th optical waveguide is larger than an optical distance Lbj of the j-th optical waveguide.

(Configuration 7)

The waveguide type optical interferometer circuit according to configuration 2, in which any of a total of a groove width of the groove and a total of an interval between the plurality of grooves is proportional to light intensity distribution in a case where the light made incident from the input optical waveguide is radiated inside the optical branching unit.

(Configuration 8)

The waveguide type optical interferometer circuit according to configuration 7, in which if a radiation angle of a straight line of the i-th optical path, where i is a positive integer, relative to a center axis is defined as $\theta i$ and a total of an optical distance of an interval between the grooves intersected by the straight line of the optical path is defined as Lqi, Lqi is a function of $\theta$ and is a function of Gaussian distribution.

(Configuration 9)

The waveguide type optical interferometer circuit according to configuration 7, in which if a radiation angle of a straight line of the i-th optical path, where i is a positive integer, relative to a center axis is defined as $\theta i$ and a total of an optical distance of the groove width intersected by the straight line of the optical path is defined as Lri, Lri is a function of $\theta$, and a difference obtained by subtracting Lri from a constant is a function of Gaussian distribution.

(Configuration 10)

The waveguide type optical interferometer circuit according to configuration 7, in which if a radiation angle of a straight line of the i-th optical path, where i is a positive integer, relative to a center axis is defined as $\theta i$ and a total of an optical distance of an interval between the grooves intersected by the straight line of the optical path is defined as Lqi, Lqi is a function of $\theta$ and is a Sinc function.

(Configuration 11)

The waveguide type optical interferometer circuit according to configuration 7, in which if a radiation angle of a straight line of the i-th optical path, where i is a positive integer, relative to a center axis is defined as $\theta i$ and a total of an optical distance of the groove width intersected by the straight line of the optical path is defined as Lri, Lri is a function of $\theta$, and a difference obtained by subtracting Lri from a constant is a Sinc function.

(Configuration 12)
The waveguide type optical interferometer circuit according to any one of configurations 1 to 11, in which the waveguide type optical interferometer circuit has a structure in which a material having a different thermal conductivity is located on a top surface or a bottom surface of the light intensity compensating region and along the optical path.

(Configuration 13)
The waveguide type optical interferometer circuit according to any one of configurations 1 to 11, in which
any of the optical branching unit and the optical coupling unit is formed from a slab optical waveguide and adopts an embedded waveguide structure including a lower clad, a core, and an upper clad, and
the light intensity compensating region forms a groove structure that intersects with the optical path and intersects with the core at least partially.

(Configuration 14)
The waveguide type optical interferometer circuit according to configuration 1, in which the light intensity compensating region is provided to at least one of the optical waveguides.

(Configuration 15)
The waveguide type optical interferometer circuit according to configuration 14, in which the light intensity compensating region is formed from a groove at least partially intersecting with the optical waveguide.

(Configuration 16)
The waveguide type optical interferometer circuit according to configuration 14, in which a groove for temperature adjustment is formed around the light intensity compensating region and along the optical waveguide.

(Configuration 17)
The waveguide type optical interferometer circuit according to configuration 14, further including:
a structure to locate a material having a different thermal conductivity around the light intensity compensating region and along the optical waveguide.

(Configuration 18)
The waveguide type optical interferometer circuit according to configuration 14, in which an average value Laj of optical distances of a plurality of the light intensity compensating regions in one optical waveguide having a longer waveguide length out of the plurality of optical waveguides having different lengths is smaller than an average value Lbk of optical distances of a plurality of the light intensity compensating regions in another optical waveguide having a shorter waveguide length out of the plurality of optical waveguides having different lengths.

(Configuration 19)
The waveguide type optical interferometer circuit according to configuration 14, in which an average value Lcj of an optical distance of the optical waveguide between a plurality of the light intensity compensating regions in one optical waveguide having a longer waveguide length out of the plurality of optical waveguides having different lengths is larger than an average value Ldk of an optical distance of the optical waveguide between the plurality of the light intensity compensating regions in another optical waveguide having a shorter waveguide length out of the plurality of optical waveguides having different lengths.

(Configuration 20)
The waveguide type optical interferometer circuit according to configuration 14, in which
if a ratio of an average value Laj of optical distances of a plurality of the light intensity compensating regions to an average value Lcj of an optical distance of the optical waveguide between the plurality of light intensity compensating regions in one optical waveguide having a longer waveguide length out of the plurality of optical waveguides having different lengths is defined as (Laj/Lcj), and
a ratio of an average value Lbk of optical distances of a plurality of the light intensity compensating regions to an average value Ldk of an optical distance of the optical waveguide between the plurality of light intensity compensating regions in another optical waveguide having a shorter waveguide length out of the plurality of optical waveguides having different lengths is defined as (Lbk/Ldk),
the waveguide type optical interferometer circuit satisfies $(Laj/Lcj) \leq (Lbk/Ldk)$.

(Configuration 21)
The waveguide type optical interferometer circuit according to any one of configurations 14 to 20, in which
the optical waveguide adopts an embedded waveguide structure including a lower clad, a core, and an upper clad, and
the light intensity compensating region forms a groove structure that intersects with a direction of travel of a lightwave and intersects with the core at least partially.

According to the present invention, it is possible to reduce a dependency of a characteristic of an optical circuit on an optical signal intensity, which occurs due to input of a high intensity optical signal to a waveguide type optical interferometer circuit.

DESCRIPTION OF EMBODIMENTS

Figure 1:
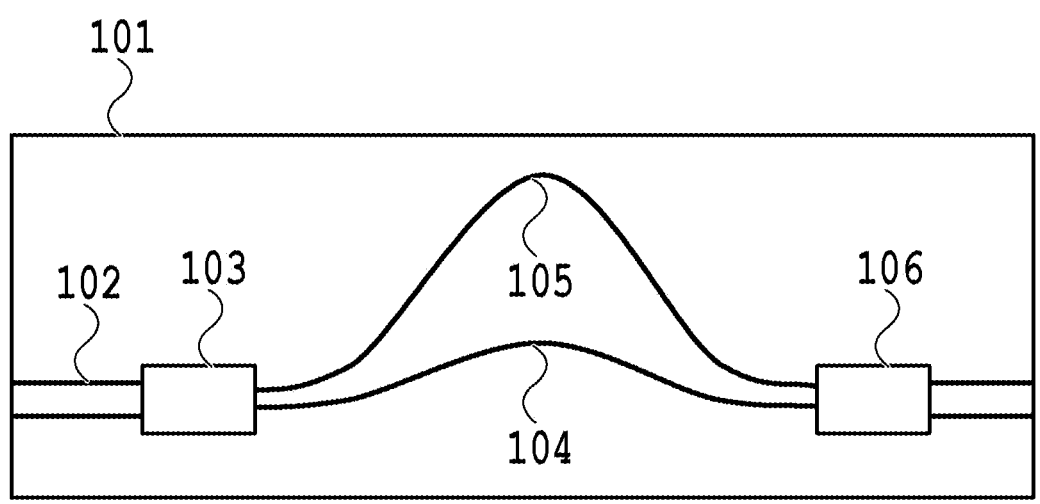
FIG. 1 is a substrate plan view to explain a schematic configuration of a Mach-Zehnder interferometer (MZI) representing an example of a conventional waveguide type optical interferometer circuit.
Figure 2:
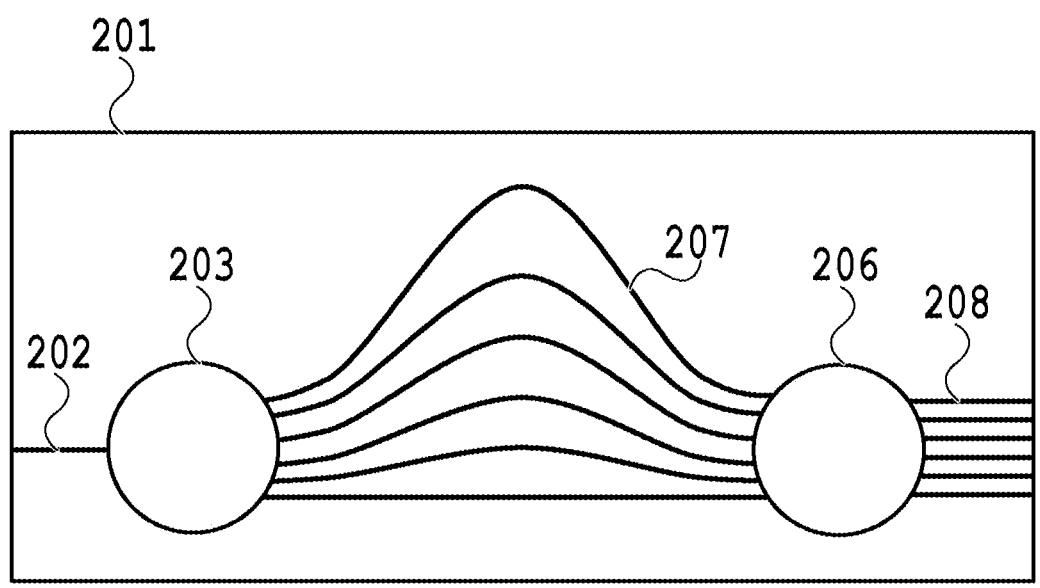
FIG. 2 is a substrate plan view to explain a schematic configuration of an arrayed waveguide grating (AWG) representing another example of the conventional waveguide type optical interferometer circuit.
Figure 3:
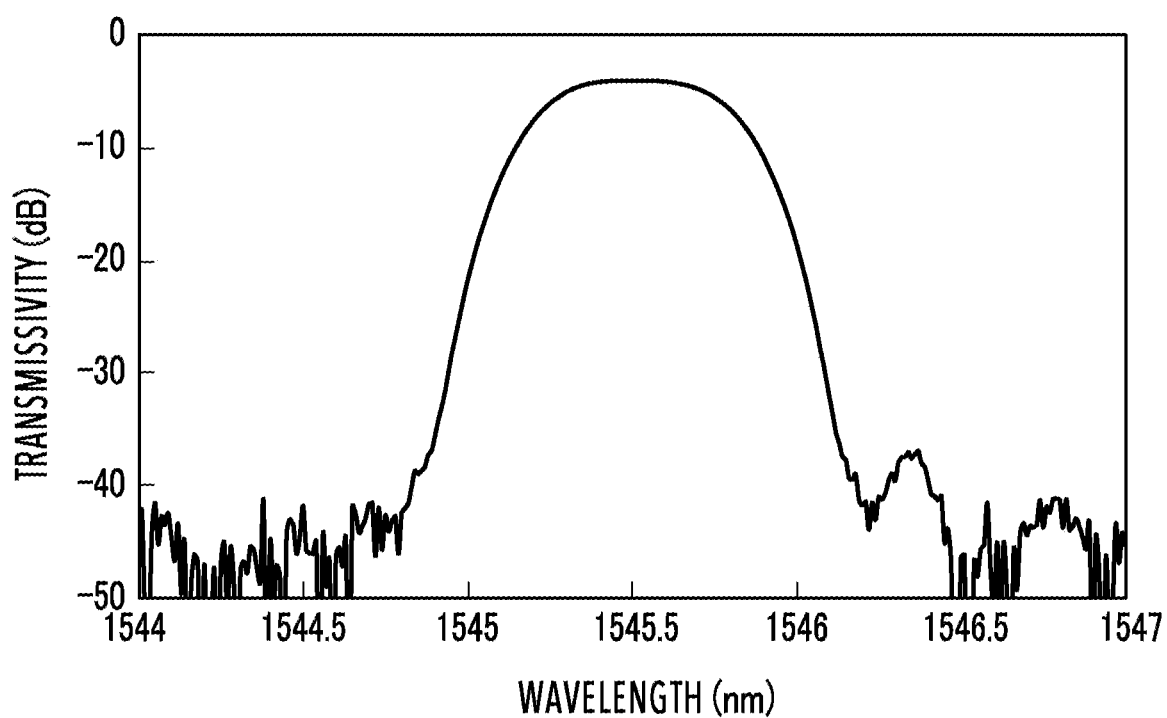
FIG. 3 is a diagram showing an example of a transmissivity spectrum from a central input port to a central output port of the AWG in FIG. 2.

A method of forming an optical waveguide of a waveguide type optical interferometer circuit of the present invention will be described to begin with.
(Method of Forming Silica-Based Optical Waveguide)

Silica-based planar lightwave circuits have excellent characteristics in light of mass productivity, low cost, and high reliability and can be embodied into various optical interference circuits that have been put to practical use in the field of optical communication. Such a planar lightwave circuit can be formed by using glass deposition techniques including standard photolithography, a dry etching technique, FHD (flame hydrolysis deposition), and the like.

In a specific manufacturing process of an optical waveguide of this embodiment, a lower clad layer and a core layer having a higher refractive index than that of the clad layer, which are mainly made of silica glass and the like, are first deposited on a substrate of Si or the like. Then, various waveguide patterns are formed as resist patterns on the core layer by using the photolithography, and the core layer provided with the waveguide patterns are formed by performing a process in accordance with the dry etching method based on the resist patterns. Lastly, waveguides formed from the core layer are embedded by using an upper clad layer. A waveguide type optical functional circuit is formed by the aforementioned process.

The optical waveguide used in the present invention adopts an embedded waveguide structure formed from germanium (Ge) doped silica glass and the like, in which a relative refractive index difference between the core and the clad is set to 2%, for example, and a height of the core is set to 4 µm and a width of the core is set to 4 µm in a standard waveguide.

As described later in detail, this embodiment is characterized in that either an optical branching unit or an optical coupling unit is provided with any of a region, a zone, and grooves formed from a light intensity compensating material, which has a light intensity coefficient different from a light intensity coefficient (a coefficient of change of an optical distance L with respect to a light intensity I, dL/dI) of an optical distance of the optical waveguide, for the purpose of light intensity compensation. Here, a cross-sectional structure of a groove of the waveguide type optical interferometer circuit of this embodiment is not limited only to the structure that intersects with all of the upper clad, the core, and the lower clad waveguide. The structure only needs to intersect with the core at least partially.

Various materials such as a third-order non-linear optical material, a photoisomerization material, and an excimer material can be used as the aforementioned light intensity compensating material. As mentioned above, the present invention will describe the light intensity compensating material that has a thermal effect (the effect due to the temperature coefficient of the refractive index, the thermal expansion, and so forth) being the largest non-linear refractive index effect. To be more precise, the present invention will describe a light intensity compensating material that utilizes a change in refractive index that occurs as a consequence of thermal expansion due to a rise in temperature associated with light absorption.
(Difference in Light Absorptivity Between Optical Waveguide and Organic Resin Material)

As mentioned above, the transmission light loss of the optical fiber exhibits a low loss of about 0.2 dB/km in the wavelength range of the 1550-nm band. In contrast, the transmission light loss of the silica-based planar lightwave circuit (PLC) is about 0.3 dB/m, which is three orders of the magnitude larger.

In comparison, the transmission light loss of the organic material-based resin material used for the above-mentioned light intensity compensating material has a light loss of at least about 0.1 dB/cm, which is even several tens of times larger than the transmission light loss of the silica-based planar lightwave circuit. This light loss is caused by light absorption at wavelengths in the vicinity of the 1400-nm band, in the vicinity of the 1650-nm band, and the like due to harmonic waves associated with stretching vibration and whirl vibration of the C—H bond unique mainly to the organic material. Attributed to the physical property of the material, it is difficult to eliminate this light loss completely.

In other words, in the case of using the silica-based glass with a low loss for the optical waveguide core material and using the organic material as the light intensity compensating material, the optical waveguide core material and the light intensity compensating material develop a difference in amount of light absorption which is several tens of times as large in the 1550-nm communication wavelength range.

Accordingly, in the case where the light having the extremely high intensity is transmitted in the single optical waveguide core as mentioned above, local temperature distribution due to the difference in amount of light absorption occurs in the core portion and the portion of the light intensity compensating material in the silica-based planar lightwave circuit (PLC). The temperature coefficient of the refractive index of the light intensity compensating material has the opposite sign and the difference in size which is several tens of times as large in comparison with those of the silica-based glass. Accordingly, a local variation in optical phase difference occurs in association therewith.

The local temperature distribution or the variation in optical phase difference are not brought about by an environmental temperature or an average temperature of optical waveguide elements but are dependent on the intensity of the light made incident on the optical waveguide core. Accordingly, the local temperature distribution occurs and the variation in optical distance in association therewith develops at any environmental temperature and at any average temperature of the optical waveguide elements. Particularly, in the case of the optical waveguide element such as the Mach-Zehnder interferometer (MZI) and the arrayed waveguide grating (AWG) that function by causing the multiple light fluxes to develop phase differences and to develop interferences with one another, the variation in optical distance caused by the high intensity optical signal is not only unignorable but also leading to deteriorations in optical characteristics of the Mach-Zehnder interferometer (MZI) or the arrayed waveguide grating (AWG).

For this reason, in the case of the optical waveguide element configured to compensate for the light intensity by using the light intensity compensating material, it is necessary to balance changes in optical distance between the optical waveguides having different optical waveguide lengths and being designed to develop the optical phase difference in order to suppress the variation in optical distance relative to the incident light intensity to the optical waveguide core attributable to a variation in local temperature inside the light intensity compensating material. To be more precise, the optical phase difference between the respective optical waveguides needs to be spared from the variation relative to the incident light intensity, or alternatively, a range of the optical phase variation needs to be small enough for practical use.

EXAMPLES OF LIGHT INTENSITY COMPENSATING MATERIAL

The light intensity compensating material preferably has a larger light absorptivity and a larger temperature coefficient of the refractive index than those of the optical waveguide core material. For instance, in the case of using silica-based glass for the optical waveguide material, most of organic materials can be used as the light intensity compensating material.

Examples of such a material include: aromatic compounds such as benzene and toluene; cyclic hydrocarbon compounds such as cyclohexane; straight chain hydrocarbon compounds such as isooctane, n-hexane, n-octane, n-decane, and n-hexadecane compounds; chlorides such as carbon tetrachloride; sulfides such as carbon disulfide; low molecular materials of ketones and the like such as methyl ethyl ketone; polyolefins such as polyethylene, polypropylene, and polybutylene; polydienes such as polybutadiene and natural rubber; polystyrene; vinyl polymers such as polyvinyl acetate, poly (methyl vinyl ether), poly (ethyl vinyl ether), polyacrylate, methyl polyacrylate, polymethacrylate, methyl polymethacrylate, butyl polymethacrylate, hexyl methacrylate, and dodecyl methacrylate; polyethers such as straight chain olefin-based polyethers, polyphenylene oxide (PPO) and copolymers or blends thereof, polyether sulfone (PES) with a mixture of an ether group and a sulfone group, polyether ketone (PEK) with a mixture of an ether group and a carbonyl group, polyphenylene sulfide (PPS) or polysulfone (PSO) having a thioether group and copolymers or blends thereof; polyolefins with its terminal provided with at least one substituent group of an OH group, a thiol group, a carbonyl group, a halogen group, and the like as typified by HO—(C—C—C—C—)$_n$—(C—C—(C—C—)$_m$)—OH; high molecular materials including polyoxides such as polyethylene oxide and polypropylene oxide, polybutylisocyanate, and polyvinylidene fluoride; and a cross-linking substance formed from epoxy resin, an oligomer substance, and a curing agent. Furthermore, a mixture obtained by mixing two or more of the aforementioned materials may also be used.

In addition, either polysiloxane or a polysiloxane cross-linking substance (generally called silicone resin) is preferably used. This material not only has a large temperature coefficient of the refractive index but also has excellent water resistance and long-term stability, and is therefore most suitable as the light intensity compensating material of the present invention.

Polysiloxane is expressed by the following general chemical formula (5):

R1-((R4)Si(R3)-O)-((R4)Si(R3)-O)$_n$—((R4)Si(R3)-O)—R2      Formula (5).

In the above formula, each of signs R1 and R2 on right and left ends denotes a terminal group, which is any of hydrogen, an alkyl group, a hydroxyl group, a vinyl group, an amino group, an aminoalkyl group, an epoxy group, an alkylepoxy group, an alkoxyepoxy group, a methacrylate group, a chloro group, and an acetoxy group.

Each of signs R3 and R4 in the siloxane bond denotes a side chain group, which is any of hydrogen, an alkyl group, an alkoxy group, a hydroxyl group, a vinyl group, an amino group, an aminoalkyl group, an epoxy group, a methacrylate group, a chloro group, an acetoxy group, a phenyl group, a fluoroalkyl group, an alkylphenyl group, and a cyclohexane group. The polysiloxane to be loaded may be of one type or a mixture of two or more types.

On the other hand, the polysiloxane cross-linking substance is obtained by bringing reactive polysiloxane having a terminal group of any of a vinyl group, hydrogen, a silanol group, an amino group, an epoxy group, and a carbinol group and polysiloxane into a reaction under the existence of a platinum catalyst, a radical, an acid, a base, and the like. Meanwhile, it is also possible to use polysiloxane to be loaded after being converted into a soft gel state, a compound formed by allowing polysiloxane in a gel state to include low molecular weight polysiloxane, and a material prepared by mixing polysiloxane having a high molecular material weight with polysiloxane having a lower molecular weight and then bringing the mixture into a cross-linking reaction.

In the waveguide type optical interferometer circuit of the present invention, a light intensity compensating region for compensating a change in optical characteristic due to the light intensity is formed on an optical path of the waveguide type optical interferometer circuit extending from the optical branching unit to the optical coupling unit by using the above-described light intensity compensating material. In this instance, the light intensity compensating region is formed such that the light intensity coefficient for the light propagating on the optical path is different from the light intensity coefficient for the light propagating on this light intensity compensating region, where both light intensity coefficient are for the incident light intensity in effective refractive index.

The following Examples 1 to 10 each explain an example of forming the light intensity compensating region on at least any one of the optical branching unit and the optical coupling unit. Meanwhile, Examples 11 to 15 each explain an example of forming the light intensity compensating region on at least any one of multiple optical waveguides interposed between the optical branching unit and the optical coupling unit and having different lengths from one another.

Aspects of examples of the present invention will be described below in detail with reference to the drawings.

Example 1

Figure 4:
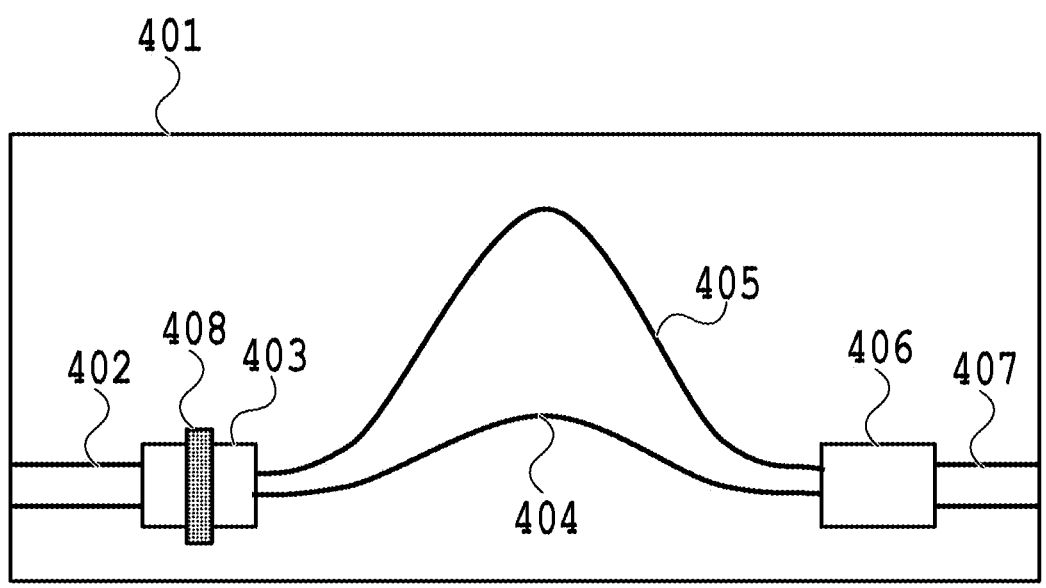
FIG. 4 is a substrate plan view to explain a configuration of a waveguide type optical interferometer circuit according to Example 1 of the present invention, in which a Mach-Zehnder interferometer type optical branching unit (an MMI) is provided with a light intensity compensating region.
Figure 5:
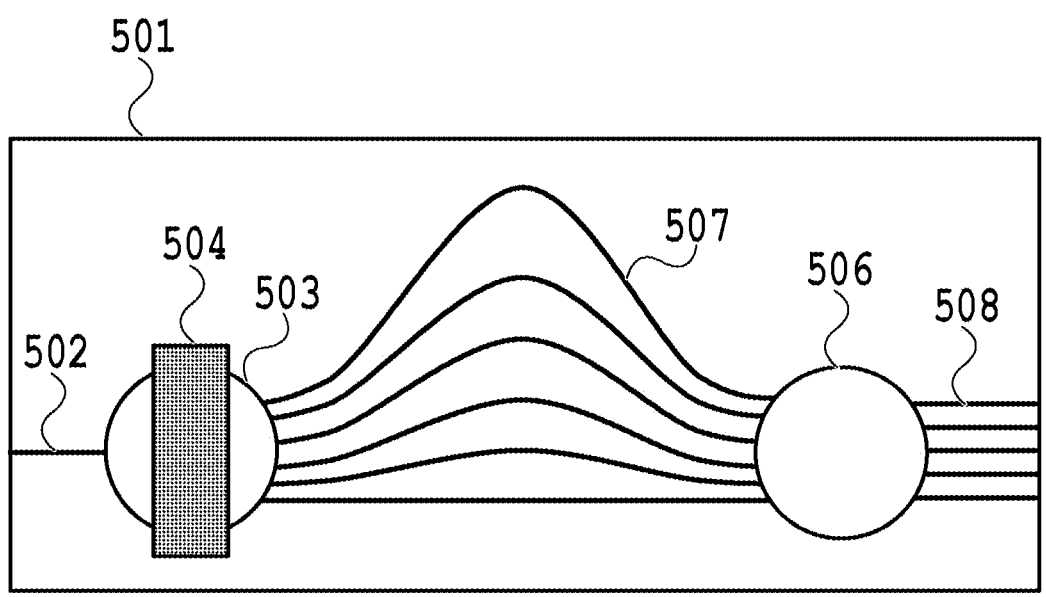
FIG. 5 is a substrate plan view to explain another configuration of the waveguide type optical interferometer circuit according to Example 1 of the present invention, in which an optical branching unit (a slab optical waveguide) of an arrayed waveguide grating is provided with a light intensity compensating region.

FIG. 4 is a substrate plan view to explain a configuration of a waveguide type optical interferometer circuit of a Mach-Zehnder interferometer (MZI) type according to Example 1 of the present invention, and FIG. 5 is a substrate plan view to explain a configuration of a waveguide type optical interferometer circuit of an arrayed waveguide grating (AWG) type according to Example 1 of the present invention.

In FIG. 4, two input waveguides 402, multimode interference waveguides (MMI) 403 and 406 that function as an optical branching unit and an optical coupling unit, two arm waveguides 404 and 405 that have different lengths from each other and are connected while being interposed between the two couplers, and two output waveguides 407 are formed on a substrate 401 of a planar lightwave circuit (PLC).

In FIG. 5, one input waveguide 502, slab optical waveguides 503 and 506 that function as an optical branching unit and an optical coupling unit, arrayed optical waveguides formed from multiple optical waveguides 507 that have different lengths from one another and are connected while being interposed between the two couplers, and multiple output waveguides 508 are formed on a substrate 501 of a planar lightwave circuit (PLC).

In both cases of the MZI type in FIG. 4 and the AWG configuration in FIG. 5, each waveguide type optical interferometer circuit mentioned above can be said to be a waveguide type optical interferometer circuit being an optical interferometer circuit formed in the same plane, which includes the optical branching unit, the optical coupling unit, and optical paths formed from the multiple optical waveguides having different lengths from one another and being interposed between the optical branching unit and the optical coupling unit.

In the waveguide type optical interferometer circuits according to Example 1 of the present invention in FIG. 4 and FIG. 5, light intensity compensating regions 408 and 504, each of which includes at least one groove or parallel grooves intersecting with multiple branched optical paths and being filled with a material for light intensity compensation, are provided in the MMI 403 and in the slab waveguide 503 serving as the optical branching units on an input side.

A similar light intensity compensating region may also be provided in the MMI 406 or the slab optical waveguide 506 being the optical coupling units on an output sides. The invention of the present application is characterized in that the light intensity compensating region is provided in one or both of the optical branching unit and the optical coupling unit. In this way, it is possible to locate the light intensity compensating regions in the respective optical waveguides in a concentrated manner without causing dispersion unlike the case of providing the light intensity compensating regions in the middle of the optical waveguides, for instance. This makes it possible to simplify the manufacturing process. Moreover, another advantage thereof is a capability of constructing the light intensity compensating regions independently of the design of the respective optical waveguides.

Basic conditions provided to the light intensity compensating region of the present invention will be discussed. Regarding the two arm waveguides 404 and 405 having the different lengths from each other or the respective optical waveguides 507 forming an array (hereinafter referred to as the optical waveguides) in FIG. 4 and FIG. 5, if a total incident light intensity to be made incident on the MMI 403 or the slab waveguide 503 serving as the optical branching unit is defined as Ptotal, an optical distance of each i-th (i=1 to N, where N is the total number of the optical waveguides forming the array and N=2 in the case of the MZI) optical waveguide in the case where Ptotal is made incident on each optical waveguide is defined as Li, and a light intensity coefficient of the optical distance of each optical waveguide relative to the total incident light intensity Ptotal is defined as $dLi/dPtotal$, the number of the light intensity compensating region (grooves), lengths thereof, and a filling material corresponding to the optical paths of the respective optical waveguides are configured to satisfy:

$$dLi/dPtotal < 25 \text{ (μm/W)} \qquad \text{Formula (6)}$$

Here, two or more grooves may be provided to the light intensity compensating region.

(Grounds for Limitation of Formula (6))

This arrangement is made because, in a case of considering an application to a spectroscope (a light source of 0.5 W or above) in the infrared range from about 2.5 μm to about 25 μm, for example, it is possible to split a measurement spectrum at least into a half as large as a measurement range if a bandpass filter having a half width of 25 μm can be realized. Accordingly, the respective arms are set to satisfy $$dLi/dPtotal < 25 \text{ μm}/2/0.5 \text{ W}/25 \text{ μm/W},$$

thus balancing the light intensity compensation.

In the case of forming the AWG as the waveguide type optical interferometer circuit as shown in FIG. 5, the light intensity compensating regions may be provided not only to the slab waveguide in the optical branching unit but also to the slab waveguide in the optical coupling unit. Each light intensity compensating region can be formed from one groove intersecting with the respective optical paths that are either branched off or coupled together on the same substrate plane, or from multiple grooves extending parallel to one another while providing intervals in an optical waveguide direction. Here, widths (lengths in the direction of light in the grooves) and the intervals of the respective grooves can be set equal or variable in a longitudinal direction of the grooves. In other words, it is possible to balance the light intensity compensation between the arms in accordance with the conditions of the aforementioned Formula (6) by providing the light intensity compensating region, which has the light intensity coefficient different from the light intensity coefficient of the optical distance of the slab waveguide, to at least one of the optical coupling unit and the optical branching unit.

(Change in Temperature Near Grooves in Light Intensity Compensating Region of Example 1)

Temperature distribution in the case of input of high intensity light to the optical waveguides was analyzed in accordance with a finite element method in order to confirm a change in temperature in the vicinity of the grooves in the light intensity compensating regions according to Example 1 of the present invention.

Figure 6:
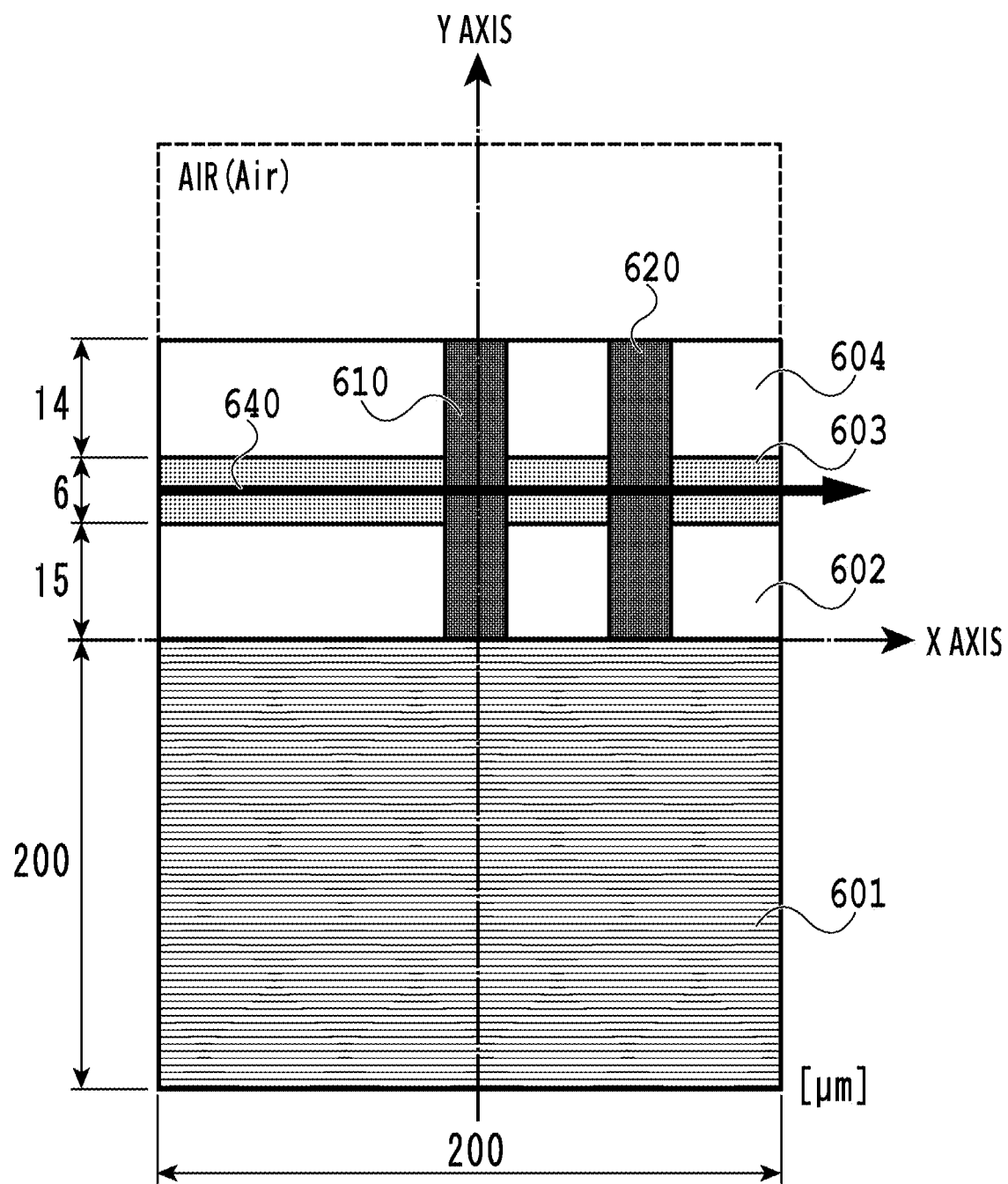
FIG. 6 is a schematic substrate cross-sectional view of a model of the light intensity compensating region used in a temperature distribution analysis according to a finite element method.

FIG. 6 shows a schematic substrate cross-sectional view of a model of the light intensity compensating regions in the optical branching unit of the waveguide type optical interferometer circuit of the present invention used for the analysis, which is taken along a light beam (high intensity light 640 incident from left side).

The model of the light intensity compensating regions in FIG. 6 assumes the case of providing two grooves 610 and 620 away from each other in the direction of the light beam 640. Here, a direction of travel of the light beam 640 in an optical waveguide core 603 was defined as X axis while a film thickness direction was defined as Y axis. On a Si substrate 601 having a thickness of 200 µm, a lower clad (silica glass) 602, an optical waveguide core 603, and an upper clad (silica glass) 604 were formed in thicknesses of 15 µm, 6 µm, and 14 µm, respectively.

In FIG. 6, the high intensity light 640 at 23 dBm was assumed to propagate inside the optical waveguide core 603 for 200 µm in a positive direction of the X axis. The light absorption in the optical waveguide was negligible, smaller than the light absorption in the light intensity compensating regions, or was below 0.1 dBm/cm to be more precise. On the other hand, the light absorptivity of the light intensity compensating material in the grooves of the light intensity compensating regions was set to 1.8 dB/cm.

Meanwhile, thermal conductivities of the respective regions were set to 149 [W/mK] for the Si substrate, 1.35 [W/mK] for the optical waveguide core and the clads, and 0.2 [W/mK] for the light intensity compensating material, respectively. Setting the groove widths of the two light intensity compensating regions equal to each other, the temperature distribution analysis was conducted in accordance with the finite element method while changing the groove widths and a distance between the centers of the grooves, respectively.

Figure 7:
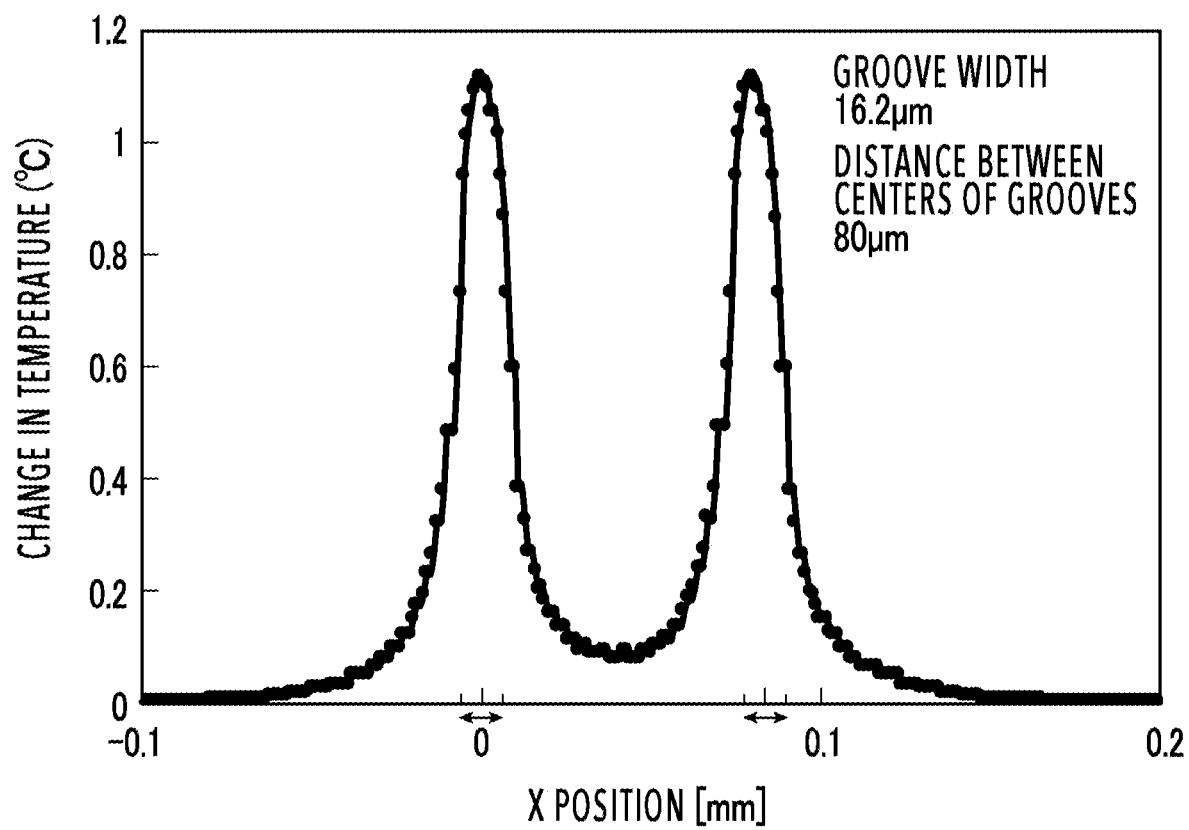
FIG. 7 is a graph showing distribution in X direction of a temperature change in the temperature distribution analysis according to the finite element method, in a case where a groove width of each of two grooves is 16.2 μm and a distance between the centers of the grooves is 80 μm.

FIG. 7 shows distribution in X direction of a temperature change (° C.) due to thermal diffusion in a case where the groove width of each of the two grooves was set to 16.2 µm and the distance between the centers of the grooves was set to 80 µm (where an interval between the grooves was set to 63.8 µm). While this illustrates the distribution of a steady state temperature along the center axis of the optical waveguide core, a rise in temperature takes place not only inside each groove but also at peripheral portions thereof. In particular, in the middle (X=0.04 mm) of the grooves of the two light intensity compensating regions, the rise in temperature is significant due to influence of the thermal diffusion from the two grooves, and a rise in temperature of about 0.1° C. is observed even at the optical waveguide core portion where there is no light absorption.

Figure 8:
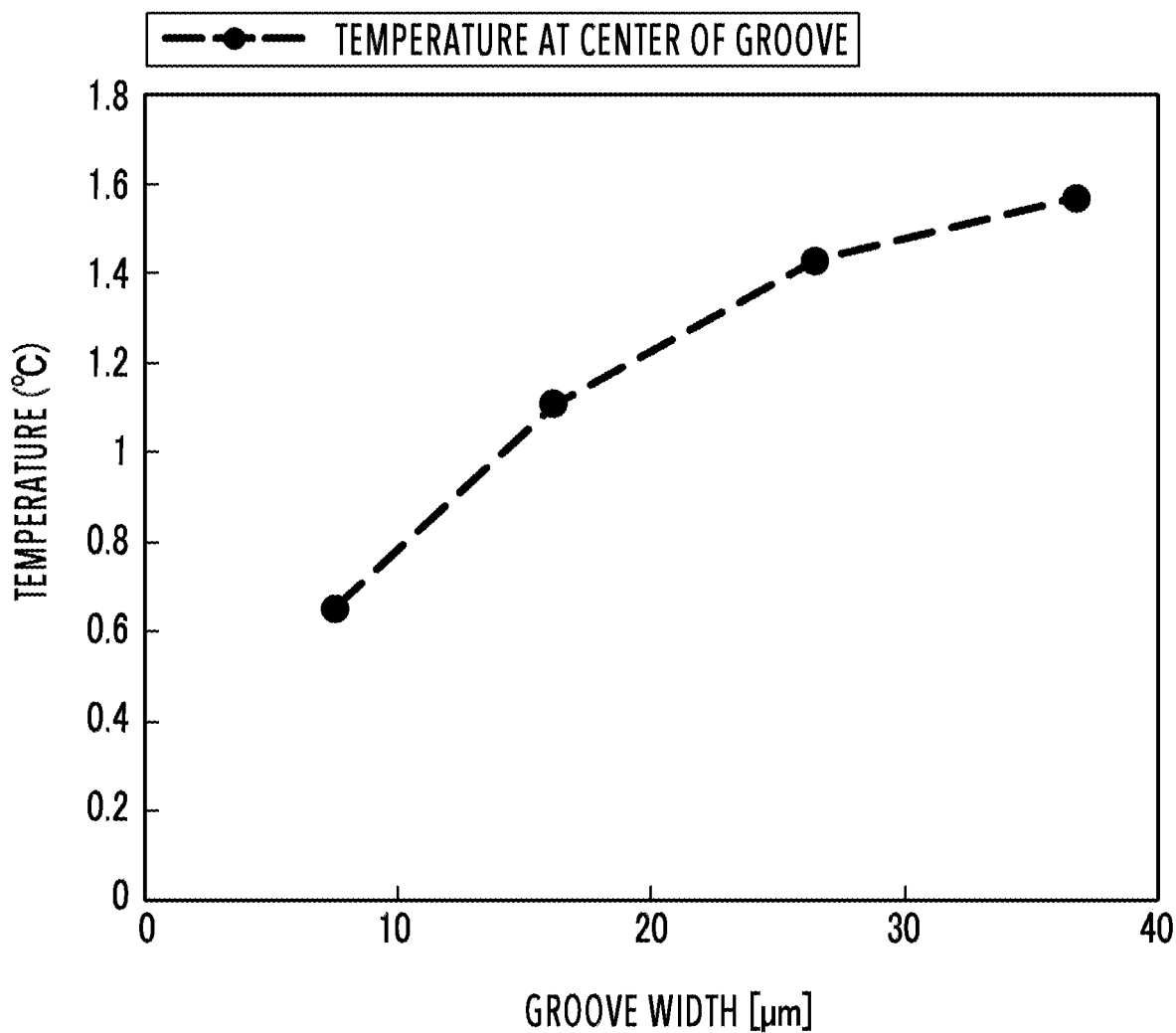
FIG. 8 is a graph showing a change in temperature at the center of each groove in a case of changing each groove width in the temperature distribution analysis according to the finite element method.

FIG. 8 shows a change in temperature at the center (which corresponds to each peak in FIG. 7) of each groove in the case of changing the groove width in the temperature distribution analysis according to the finite element method. While this is a graph plotting a rise in temperature at a central position of the optical waveguide core of each groove, the temperature at the center became higher as the groove width was increased more. Accordingly, it turns out that the groove width should be increased and the rise in temperature in the optical waveguide core should be reduced in order to increase the temperature of the light intensity compensating material, that is, to increase the change in optical distance.

Figure 9:
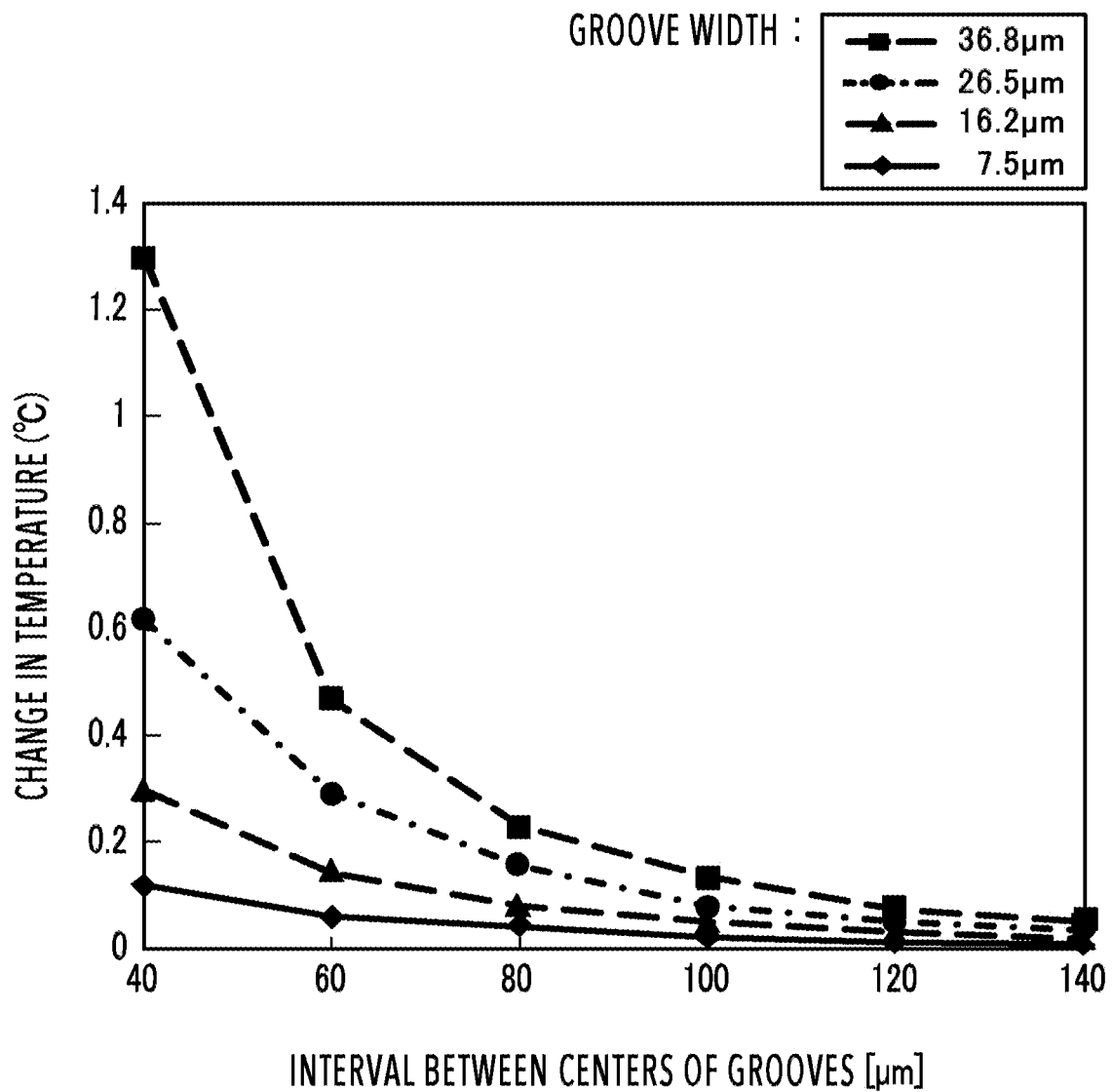
FIG. 9 is a graph showing changes in temperature in the temperature distribution analysis according to the finite element method, in a case of changing an interval between the centers of the two grooves regarding each of the groove widths in four different lengths.

FIG. 9 shows results of changes in temperature in the temperature distribution analysis according to the finite element method, in a case of changing the interval between the centers of the two grooves and regarding four different groove widths. It turns out that the rise in temperature of the optical waveguide core grows larger at a position in the middle of the two grooves as the interval between the centers of the grooves becomes smaller, and that this tendency grows even larger as the groove widths become larger.

Figure 10:
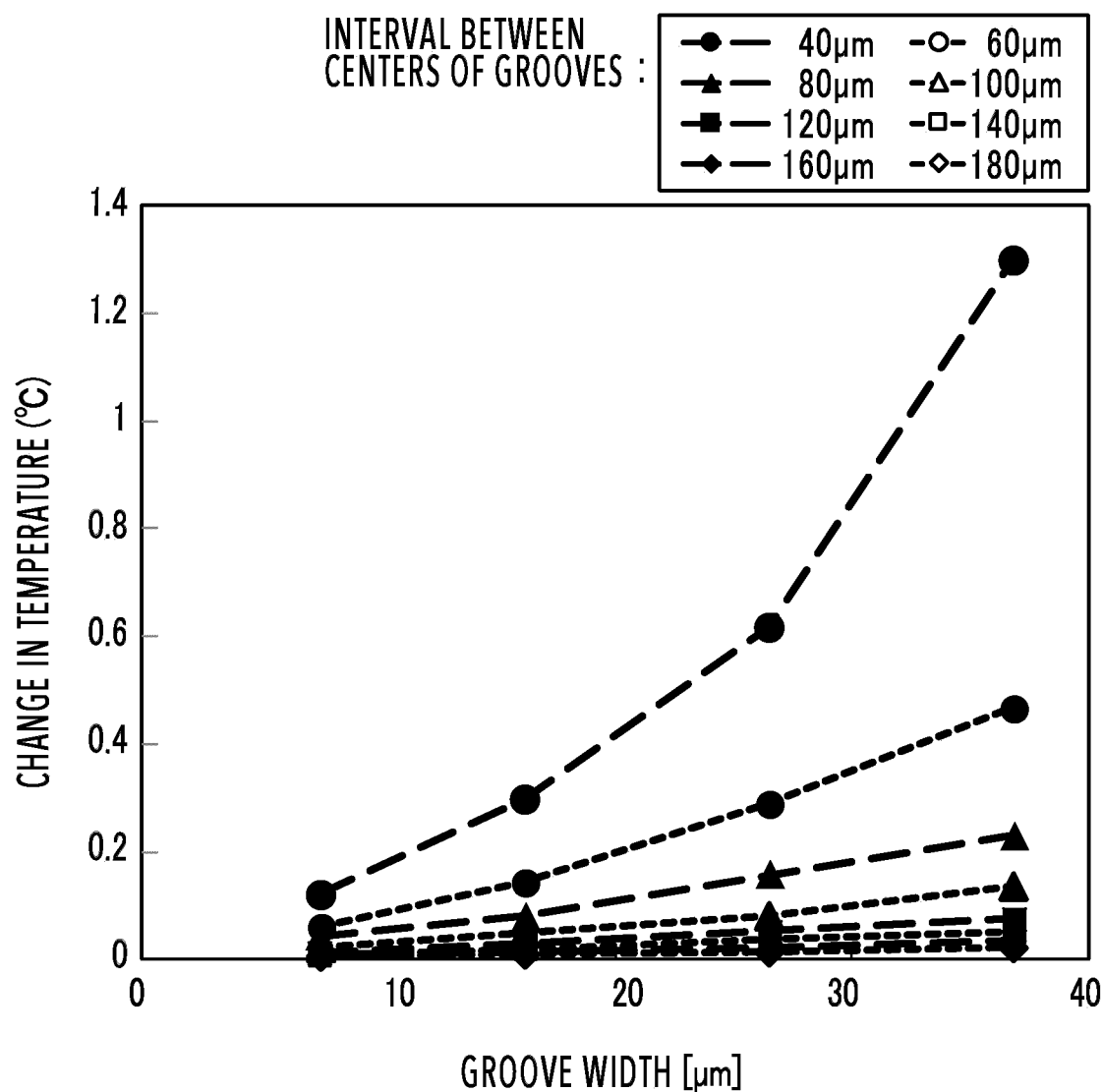
FIG. 10 is a graph showing changes in temperature in the temperature distribution analysis according to the finite element method, in a case of changing the groove width regarding the intervals between the centers of the grooves in eight different lengths.

FIG. 10 shows results of changes in temperature in the temperature distribution analysis according to the finite element method, in a case of changing the groove widths of the two grooves equally to each other regarding eight different intervals between the centers of the grooves. The change in temperature grows larger at the position in the middle of the two grooves as the groove widths become larger, and in particular, that the tendency of this rise in temperature grows even larger as the interval between the centers of the two grooves becomes smaller.

That is to say, in light of the above-mentioned analysis results, it is possible to suppress the rise in temperature at the centers of the grooves in the respective light intensity compensating regions or at the optical waveguide located between the grooves by reducing the groove widths and increasing the interval between the centers of the grooves, thereby reducing the change in optical distance. On the other hand, it is possible to increase the change in optical distance by increasing the groove widths and reducing the interval between the centers of the grooves.

(Structure of Light Intensity Compensating Region in Slab Optical Waveguide)

The following description will explain a case of an optical interferometer circuit represented by the AWG type, in which the light intensity compensating region provided in the slab optical waveguide is formed into a groove structure that includes one or more grooves intersecting with multiple optical paths of the light branched off inside the slab optical waveguide and the grooves are filled with the light intensity compensating material.

In particular, the groove structure is formed from one groove intersecting with the respective optical paths that are either branched off or coupled together on the same substrate plane, or from multiple grooves extending parallel to one another while providing intervals in the optical waveguide direction. The respective grooves are formed as grooves of which at least any of widths and intervals are set equal or variable in the longitudinal direction of the grooves.

A description will be given of a case where the light intensity compensating region is designed to compensate for the change in optical distance with regard to a desired light intensity by filling the respective grooves with the same light intensity compensating material that has a positive light intensity coefficient. In this case, the change in optical distance in the light intensity compensating region is proportional to a sum of physical distances (the widths or the intervals) of the grooves intersecting with the optical paths. Accordingly, the change in optical distance in the light intensity compensating region will be described briefly by use of the groove widths or the intervals of the grooves.

In reality, however, it is obvious that the light intensity compensating region can achieve an effect of light intensity compensation also by forming multiple grooves of the same groove width (a physical length) and filling the respective grooves with light intensity compensating materials of different types each having a desired light intensity coefficient, for example. The groove widths of the grooves and the lengths of the optical paths between the grooves (the distances and intervals between the grooves) illustrated in the respective drawings below are defined as optical distances with respect to the light intensity of the relevant light intensity compensating region.

Moreover, if the light intensity coefficient of the optical waveguide of its own is greater than the light intensity coefficient of the light intensity compensating material in the waveguide type optical interferometer circuit, then it is needless to say that the relative light intensity coefficient of the light intensity compensating material can be defined as being "negative".

Example 2

First, a structure of Example 2 will be described in detail in order to explain the structure of the light intensity compensating region of the present invention.

Figure 11:
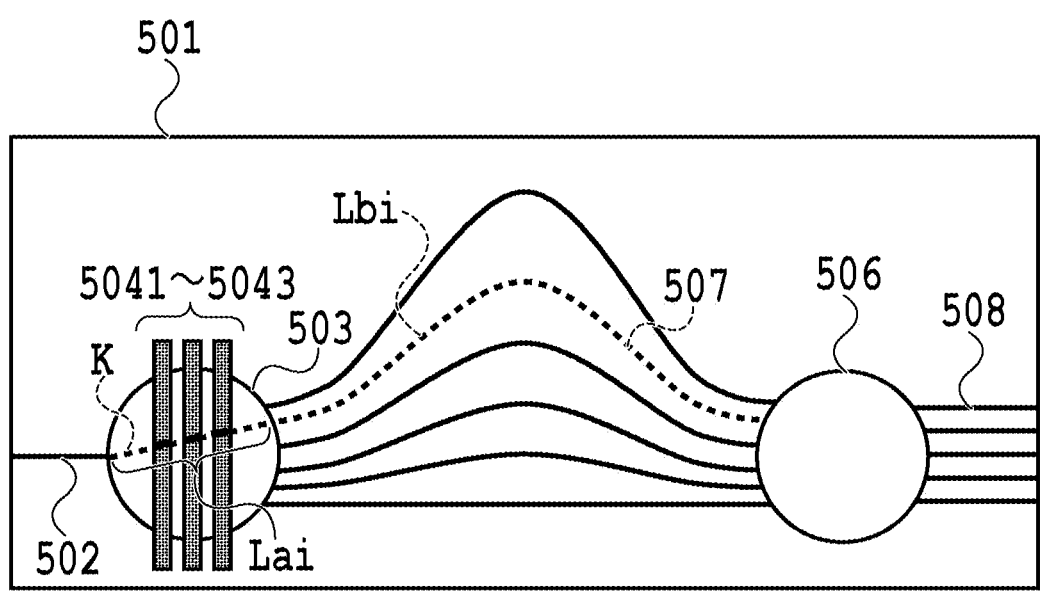
FIG. 11 is a substrate plan view to explain a configuration of a waveguide type optical interferometer circuit according to Example 2 of the present invention.

FIG. 11 is a substrate plan view to explain a configuration of a waveguide type optical interferometer circuit of the AWG type according to Example 2 of the present invention as with FIG. 5 in Example 1. In FIG. 11, the one input waveguide 502, the slab optical waveguides 503 and 506 serving as the optical branching unit and the optical coupling unit, the multiple arrayed optical waveguides 507 that have different lengths from one another and are connected while being interposed between the two couplers, and the multiple output waveguides 508 are formed on the substrate 501 of the planar lightwave circuit (PLC).

In the optical waveguides of the waveguide type optical interferometer circuit according to Example 2 of the present invention in FIG. 11, the incident light from the input waveguide 502 is branched off by the slab optical waveguide 503 on the input side into the arrayed optical waveguides 507 having the differenced lengths from one another. Each pair of branched light beams develop a phase difference attributed to the difference in length between the corresponding optical waveguides 507, and the light beams containing those phase differences are coupled together by using the slab optical waveguide 506 and are caused to interfere with one another and then outputted to the respective output waveguides 508. In the slab optical waveguide 503 of FIG. 11, the light compensating region of a groove structure, formed from multiple grooves 5041 to 5043 of equal widths and equal intervals, each intersecting with branched off light paths K, is illustrated as an example.

In this instance, the slab optical waveguide 506 on the output side (a multiplexing side) can also adopt a structure that is substantially symmetric with respect to the slab optical waveguide 503 on the input side (a demultiplexing side) in most cases in light of a single output waveguide 508. Accordingly, it is possible to calculate a change of optical distance in the total optical path from input to output of the waveguide type optical interferometer circuit by taking into account the optical distance in the slab optical waveguide 503. To be more precise, the optical distance of the total length from the input to the output of the waveguide type optical interferometer circuit can be calculated by adding up an optical distance Lbi of the respective optical waveguides 507 and a double of an optical distance Lai of the optical path on the slab optical waveguide 503 for each branched off light into the respective optical waveguide.

That is to say, given that there is no light intensity compensating region in the optical branching slab optical waveguide 503 in FIG. 11 and in the case where K is a straight line of an optical path joining the center of a connecting end from the input waveguide 502 to the center of a connecting end (an output end) to an i-th (i is a positive integer having a value in a range from 1 to N, where N is the number of the optical waveguides 507 that constitute the array) optical waveguide 507, Lai is the optical distance of the straight line K, and Lbi is the optical distance of the i-th (i is the positive integer) optical waveguide 507 of its own, then the optical distance of the entire optical path of the light passing through the optical waveguide 507 is equal to 2×Lai+Lbi.

Figure 12:
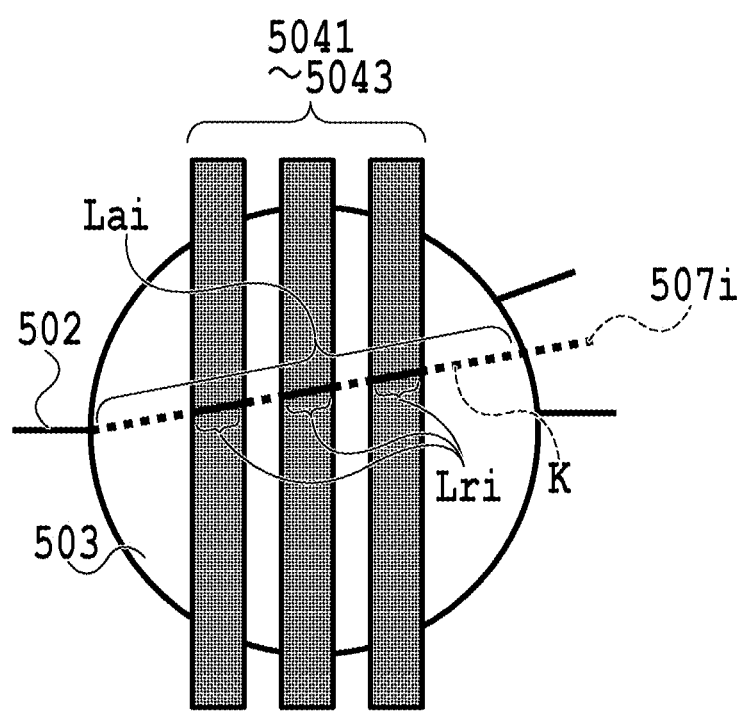
FIG. 12 is an enlarged diagram of a substrate plane of a slab optical waveguide in an optical branching unit of the waveguide type optical interferometer circuit according to Example 2 of the present invention.

FIG. 12 shows an enlarged diagram of the substrate plane of the slab optical waveguide 503 in the optical branching unit of the waveguide type optical interferometer circuit according to Example 2 of the present invention. Here, if Lri is a total value of the optical distance of the groove widths of the respective grooves 5041 to 5043 of the light intensity compensating region intersected by the optical path corresponding to the straight line K, then the change in optical distance in the light intensity compensating region relative to the total incident light intensity Ptotal becomes dLri/dPtotal, and the change in optical distance of the entirety of the waveguide type optical interferometer circuit relative to the total incident light intensity Ptotal in the case of absence of the light intensity compensating region becomes d(2×Lai+Lbi)/dPtotal. Accordingly, in order to balance the changes in optical distance of these two, it is necessary to satisfy:

$$d(2\times Lai+Lbi+Lri)/dPtotal=C, \qquad \text{Formula (7).}$$

(where i=1 to N, C is a constant value irrespective of the value of i, and N is the number of the optical waveguides)

In other words, the waveguide type optical interferometer circuit having the optical characteristics not dependent on the optical signal intensity can be realized by configuring the light intensity compensating region while adjusting the groove widths of the respective intersecting grooves, the number of the grooves, the intervals of the grooves, the light intensity coefficient of the material filling the grooves, and the like with respect to the straight line of the optical path in the slab optical waveguide of the optical branching unit corresponding to the light beam passing through each optical waveguide, in such a way as to satisfy the above-described conditions.

Example 3

Figure 13:
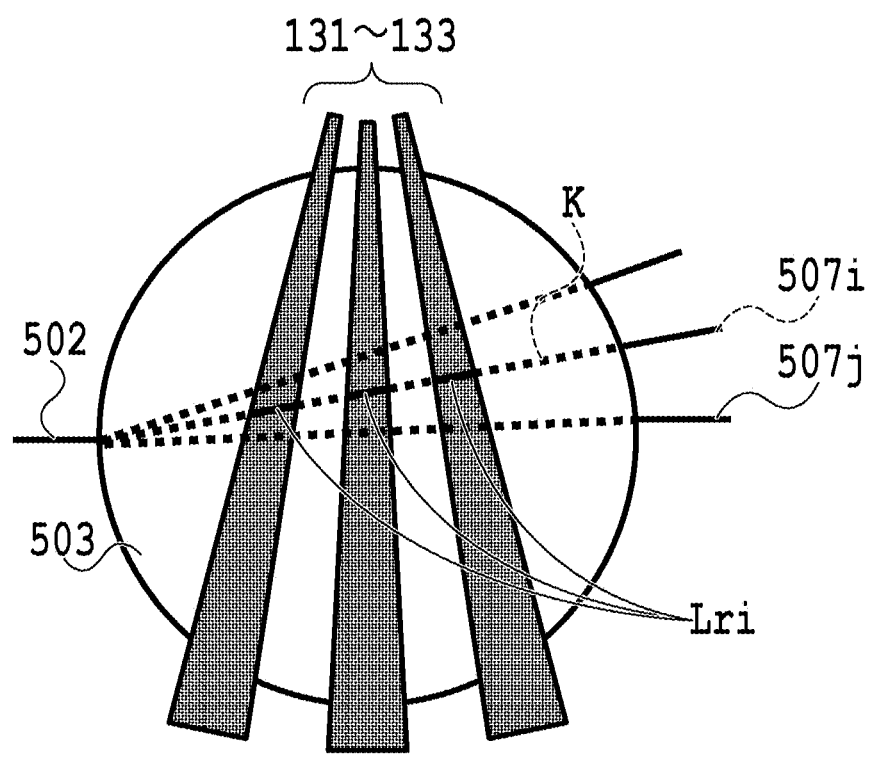
FIG. 13 is an enlarged diagram of a substrate plane of a portion of a slab optical waveguide in a waveguide type optical interferometer circuit according to Example 3 of the present invention.

FIG. 13 is an enlarged diagram of a substrate plane of a portion of the slab optical waveguide 503 in a waveguide type optical interferometer circuit according to Example 3 of the present invention with an advanced mode of the above-described concept, which is a schematic diagram for explaining an example of the groove structure of the light intensity compensating region 504. The same constituents as those in FIG. 12 will be denoted by the same reference signs.

In FIG. 13, the light intensity compensating region 504 is formed from three grooves 131 to 133 having variable groove widths and variable intervals between the grooves in the longitudinal direction of the grooves.

In the structure of the waveguide type optical interferometer circuit according to Example 3 of the present invention in FIG. 13, a difference in the change in optical distance between respective optical waveguides having different lengths in an interferometer is compensated for by changing the groove widths and the intervals between the grooves at portions of the respective grooves 131 to 133 in the light intensity compensating region to intersect with the straight lines K of the optical paths in the longitudinal direction of the grooves depending on the respective optical paths. Thus, this structure is designed to improve balance in the light intensity compensation.

The waveguide type optical interferometer circuit of Example 3 in FIG. 13 is an optical interferometer circuit of the AWG type as with Example 2 in FIGS. 5, 11, and 12. The waveguide type optical interferometer circuit is formed from the optical branching unit, the optical coupling unit, and the multiple optical waveguides (the arrayed waveguides) interposed between the optical branching unit and the optical coupling unit and having different lengths from one another.

Regarding the waveguide type optical interferometer circuit of Example 3 in FIG. 13, a straight-line optical path joining an input end from the input waveguide 502 to an output end to an i-th (i is a positive integer) optical waveguide 507i in the slab optical waveguide 503 being either the optical branching unit or the optical coupling unit is defined as K, and a total value of the groove widths (the optical distance) of the respective grooves 131 to 133 of the light intensity compensating region 504 intersected by the straight line K is defined as Lri. Likewise, a total value of the groove widths concerning an optical path to a j-th optical waveguide 507j is defined as Lrj.

In the case where the optical distance Lbi of the i-th optical waveguide 507i is longer than the optical distance Lbj of the j-th optical waveguide 507j (Lbi>Lbj), the total value Lri of the groove widths of the grooves intersected by the straight line K connected to the longer optical waveguide is made smaller than the total value Lrj of the groove widths of the grooves intersected by the straight line K connected to the shorter optical waveguide. Specifically, this structure is characterized by satisfaction of:

$$\text{if } Lbi>Lbj, \text{ then } Lri<Lrj \qquad \text{Formula (8)}.$$

Note that both of long and short arrayed waveguides shown as an example here encompass not only the arrayed waveguide type wavelength multiplexer-demultiplexer (AWG) but also the two arms with different lengths in the Mach-Zehnder interferometer (MZI) and the same applies to the following examples. The optical distance of the light intensity compensating region intersected by the straight line K may be divided into multiple portions.

Example 4

Figure 14:
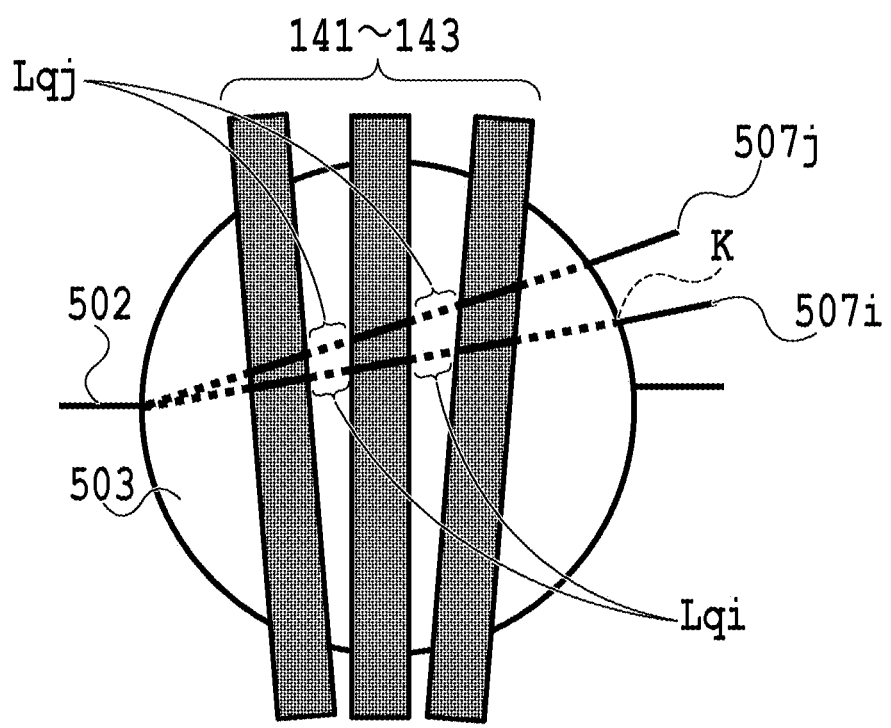
FIG. 14 is an enlarged diagram of a substrate plane of a portion of a slab optical waveguide in a waveguide type optical interferometer circuit according to Example 4 of the present invention.

FIG. 14 is an enlarged diagram of a substrate plane of a portion of the slab optical waveguide 503 in a waveguide type optical interferometer circuit according to Example 4 of the present invention, which is a schematic diagram for explaining another example of the groove structure of the light intensity compensating region 504. The same constituents as those in FIG. 12 will be denoted by the same reference signs. In FIG. 14, the light intensity compensating region 504 is formed from three grooves 141 to 143 having equal groove widths and variable intervals between the grooves in the longitudinal direction of the grooves.

In the groove structure of the light intensity compensating region in the slab optical waveguide of the waveguide type optical interferometer circuit according to Example 3 of the present invention in FIG. 14, a difference in the change in optical distance due to the light intensity between respective optical waveguides having different lengths in an interferometer circuit is compensated for by changing the intervals between the grooves (the optical waveguide lengths) at portions of the respective grooves 141 to 143 in the light intensity compensating region to intersect with the optical paths K in the longitudinal direction of the grooves depending on the respective optical paths. Thus, this structure is designed to improve the balance of the light intensity compensation.

The waveguide type optical interferometer circuit of Example 4 in FIG. 14 is an optical interferometer circuit of the AWG type as with Example 2 in FIGS. 5 and 11 to 13. The waveguide type optical interferometer circuit is formed from the optical branching unit, the optical coupling unit, and the multiple optical waveguides (the arrayed waveguides, the arm waveguides) interposed between the optical branching unit and the optical coupling unit and having different lengths from one another.

Regarding the waveguide type optical interferometer circuit of Example 4 in FIG. 14, in the slab optical waveguide 503 serving as the optical branching unit or the optical coupling unit, a straight-line optical path joining an input end from the input waveguide 502 to the output end to the i-th (i is a positive integer) optical waveguide 507i is defined as K, and a total value of the optical distance of the intervals between the grooves (optical path lengths) sandwiched by the grooves 141 to 143 of the light intensity compensating region 504 and intersected by the straight line K is defined as Lqi. Likewise, a total value of the intervals between the grooves (optical path lengths) concerning the optical path to the j-th (j ≠ i) optical waveguide 507j is defined as Lqj.

In the case where the optical distance Lbi of the i-th optical waveguide is longer than the optical distance Lbj of the j-th optical waveguide (Lbi>Lbj), the total value Lqi of the optical distance of the intervals between the grooves (the optical path lengths) of the grooves intersected by the straight line K connected to the longer optical waveguide is made smaller than the total value Lqj of the optical distance of the intervals between the grooves (the optical path lengths) of the grooves intersected by the straight line K connected to the shorter optical waveguide. Specifically, this structure is characterized by satisfaction of:

$$\text{if } Lbi>Lbj, \text{ then } Lqi<Lqj \qquad \text{Formula (9)}.$$

Regarding the change in optical distance caused by the respective arms in the interferometer, it is possible to improve the balance in the light intensity compensation between the two arms by setting the total value Lqj of the lengths of the optical waveguides between the grooves on the long arm side larger than the total value Lqj of the lengths of the optical waveguides between the grooves on the short arm side. Here, two or more grooves are obviously required in order to determine the interval between the grooves.

Example 5

Figure 15:
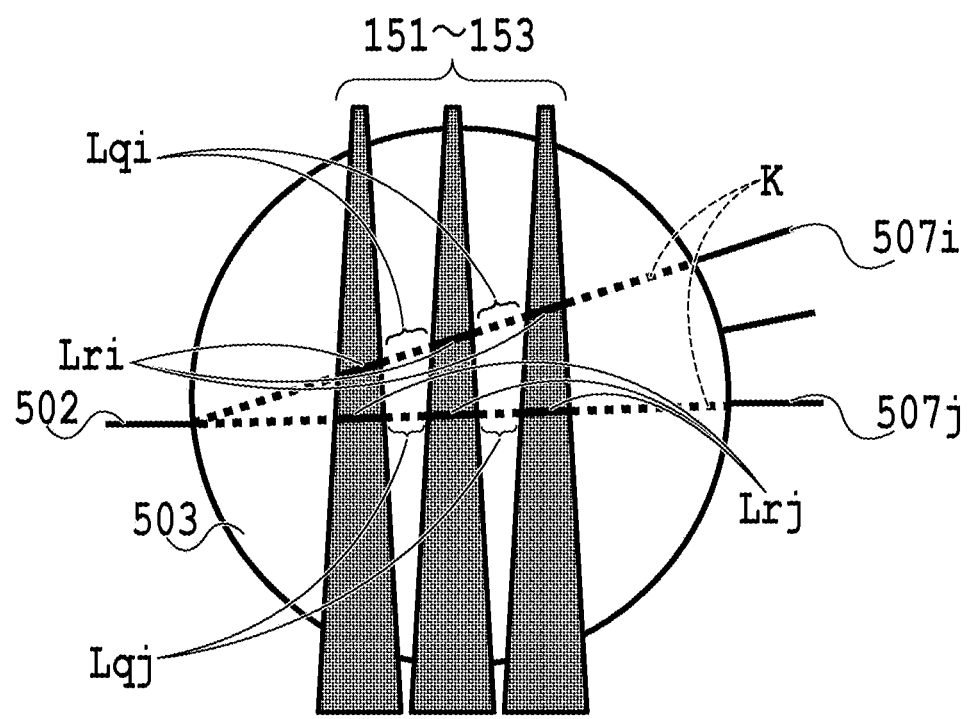
FIG. 15 is an enlarged diagram of a substrate plane of a portion of a slab optical waveguide in a waveguide type optical interferometer circuit according to Example 5 of the present invention.

FIG. 15 is an enlarged diagram of a substrate plane of a portion of the slab optical waveguide 503 in a waveguide type optical interferometer circuit according to Example 5 of the present invention, which is a schematic diagram for explaining an example of the groove structure of the light intensity compensating region 504. The same constituents as those in FIG. 12 will be denoted by the same reference signs. In FIG. 15, the light intensity compensating region 504 is formed from three grooves 151 to 153 having groove widths variable in the longitudinal direction of the grooves and constant intervals between center lines of the grooves.

In the groove structure of the light intensity compensating region in the slab optical waveguide of the waveguide type optical interferometer circuit according to Example 5 of the present invention in FIG. 15, a difference in the change in optical distance due to the light intensity between the respective optical waveguides is compensated for by setting a ratio of the "groove widths" (the optical distance) relative to the "optical path lengths" (the optical distance) of the intervals between the respective grooves of the light intensity compensating region on the long arm side of the arrayed optical waveguides smaller than a ratio of the "groove widths" (the optical distance) relative to the "optical path lengths" (the optical distance) of the intervals between the respective grooves of the light intensity compensating region on the short arm side thereof. Thus, this structure improves the balance in the light intensity compensation.

The light intensity compensating region is divided into more grooves or the groove widths in the light intensity compensating region are reduced by defining and restricting the groove structure of the light intensity compensating region based on the ratio of the "groove widths" relative to the intervals (the optical path lengths) between the respective grooves, thus improving heat dissipation. In this way, it is possible to impart high optical power resistance.

The waveguide type optical interferometer circuit of Example 5 in FIG. 15 is an optical interferometer circuit of the AWG type as with Example 2 in FIGS. 5 and 11 to 14. The waveguide type optical interferometer circuit is formed from the optical branching unit, the optical coupling unit, and the multiple optical waveguides (the arrayed waveguides, the arm waveguides) interposed between the optical branching unit and the optical coupling unit and having different lengths from one another.

Regarding the waveguide type optical interferometer circuit of Example 5 in FIG. 15, in the slab optical waveguide 503 serving as the optical branching unit or the optical coupling unit, a straight line of the optical path joining the input end from the input waveguide 502 to the output end to the i-th (i is a positive integer) optical waveguide 507i is defined as K, a total value of the optical distance of the groove widths of the respective grooves in the light intensity compensating region intersected by the straight line K is defined as Lri, and a total value of the optical distance of the intervals between the grooves (the optical path lengths) sandwiched between the respective grooves in the light intensity compensating region intersected by the straight line K is defined as Lqi. Likewise, values Lrj and Lqj are also defined in terms of the j-th (≠ i) optical path.

In the case where the optical distance of the i-th optical waveguide is longer than the optical distance of the j-th optical waveguide, the ratios of the groove widths and the intervals of the grooves are set as the following. Specifically, this structure is characterized by satisfaction of:

if $Lbi > Lbj$, then $(Lri/Lqi) \leq (Lrj/Lqj)$     Formula (10).

As a consequence of the above-described configuration, the light intensity compensating region is divided into more grooves or the groove widths in the light intensity compensating region are reduced so as to improve heat dissipation.

In this way, it is possible to impart high optical power resistance. The groove structure of the light intensity compensating region can be defined and restricted by setting the groove structure to the ratios of the "groove widths" of the grooves relative to the "optical waveguide lengths" of the intervals between the respective grooves.

Example 6

Analysis Results of State of Light Propagation in Slab Optical Waveguide in Accordance with Two-Dimensional FD-BPM)

Results of analyses of optical guided wave modes concerning a state of guided wave of the light made incident from the input waveguide on the slab optical waveguides of several shapes, which are carried out in accordance with a two-dimensional FD-BPM (finite difference beam propagation method) are shown in FIGS. 16 to 25 below in relation to Example 6.

The analysis of each optical guided wave mode was carried out in a TE mode while applying fourth-order Padé approximation to wide angle approximation, setting a relative refractive index difference of the core to Δ2%. setting an optical wavelength to 1550 nm, and setting a guided wave mode of an incident optical waveguide to a single mode.
(Analysis Result of Optical Guided Wave Mode in Rectangular Slab Shape)

FIGS. 16A to 17D show an analysis result of an optical guided wave mode of an optical branching unit having an MMI in a rectangular slab shape.

Figure 16A:
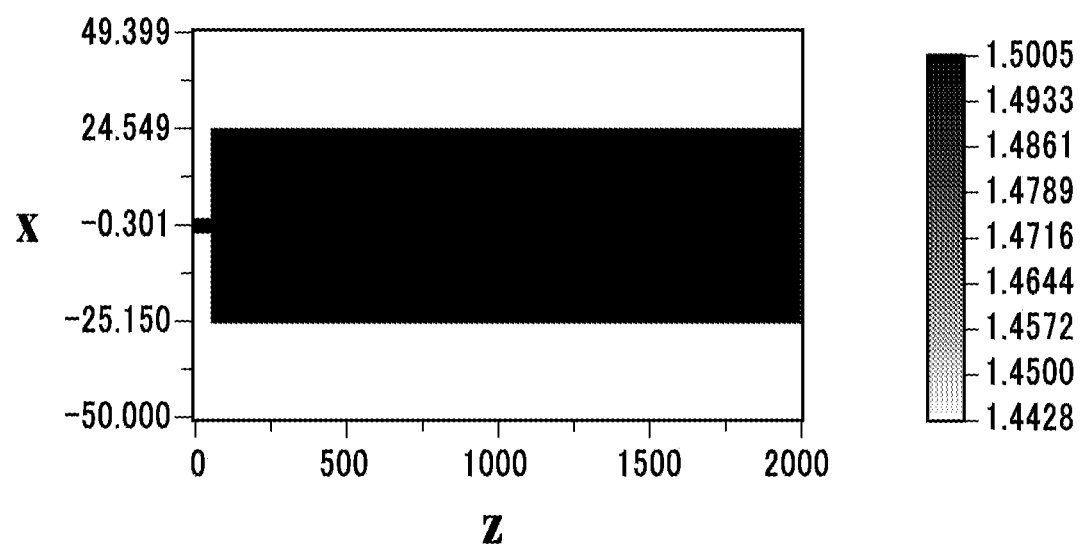
FIG. 16A is an explanatory diagram A of an analysis result of an optical guided wave mode of a rectangular slab waveguide MMI examined in association with Example 6 of the present invention.
Figure 16B:
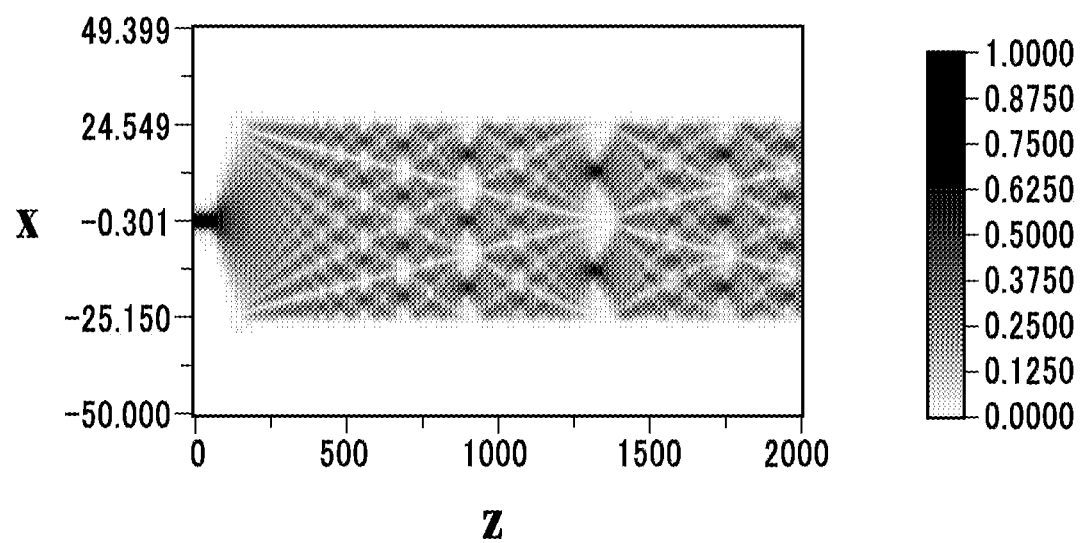
FIG. 16B is an explanatory diagram B of the analysis result of the optical guided wave mode of the rectangular slab waveguide MMI examined in association with Example 6 of the present invention.
Figure 17A:
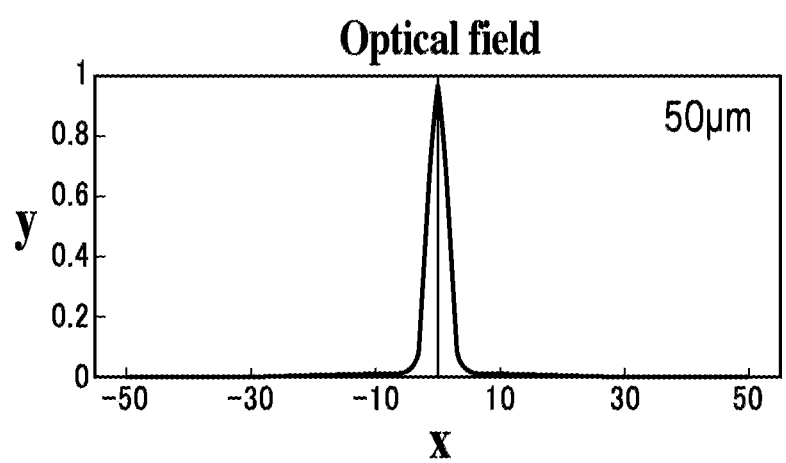
FIG. 17A is an explanatory diagram A of the analysis result of the optical guided wave mode of the rectangular slab waveguide MMI in FIGS. 16A and 16B.
Figure 17B:
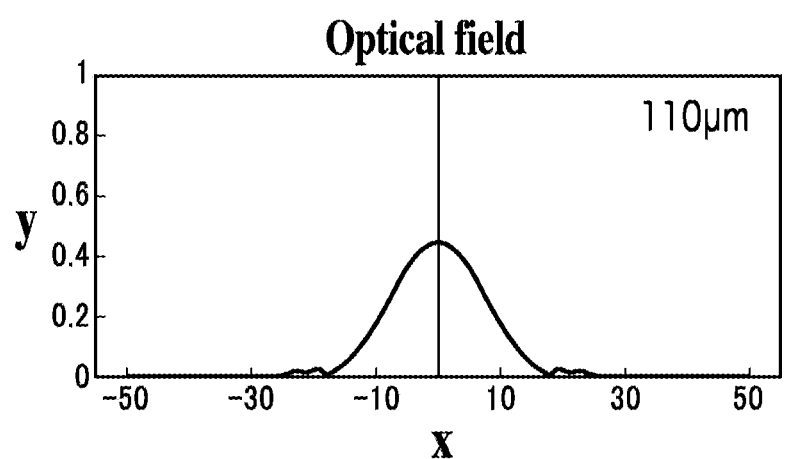
FIG. 17B is an explanatory diagram B of the analysis result of the optical guided wave mode of the rectangular slab waveguide MMI in FIGS. 16A and 16B.
Figure 17C:
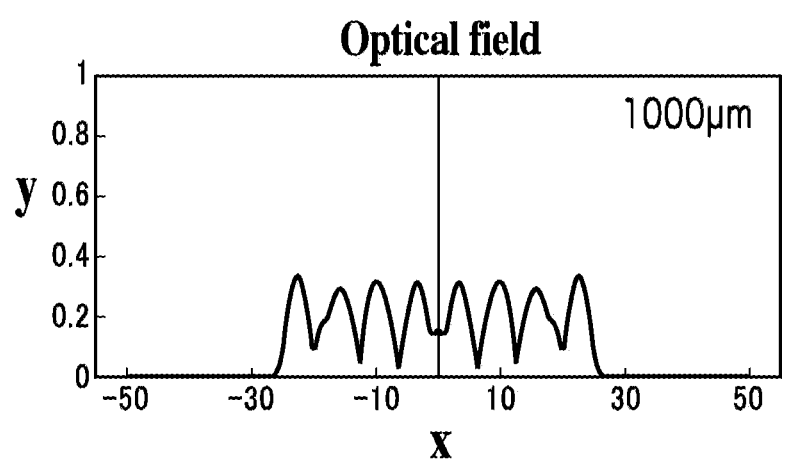
FIG. 17C is an explanatory diagram C of the analysis result of the optical guided wave mode of the rectangular slab waveguide MMI in FIGS. 16A and 16B.
Figure 17D:
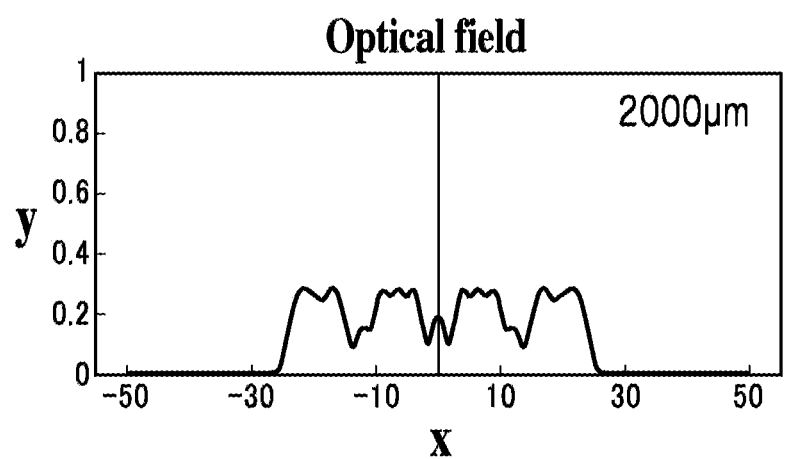
FIG. 17D is an explanatory diagram D of the analysis result of the optical guided wave mode of the rectangular slab waveguide MMI in FIGS. 16A and 16B.

FIG. 16A shows a shape of an optical waveguide of a rectangular slab shape in a direction (Z direction) of propagation of light from the left to right in FIG. 16A, which represents a rectangular analysis model of a core width of 4 μm and a waveguide length of 50 μm as an incident waveguide and a core width of 50 μm and a length of 2000 μm as a slab optical waveguide. Meanwhile, FIG. 16B shows light intensity distribution on an X-Z plane of guided wave light and FIGS. 17A to 17D show cross-sectional profiles in the X direction of the light intensity at Z positions of 50 μm, 110 μm, 1000 μm, and 2000 μm, respectively, from a light incident position inclusive of the 50-μm incident optical waveguide.

The analysis result in FIGS. 17A to 17D reveals that, in the case of the rectangular slab waveguide, the light is made incident and allowed to spread while retaining Gaussian distribution being single-mode distribution in the incident optical waveguide to a position slightly beyond 110 μm from the incident waveguide, but then mode conversion to higher order modes and optical interferences among the modes occur due to an effect of a boundary condition of the core width (50 μm) perpendicular to the direction of the guided wave of the slab waveguide, thus developing an interference pattern.
(Analysis Result of Optical Guided Wave Mode in Trapezoidal Slab Shape)

FIGS. 18A to 19D show an analysis result of an optical guided wave mode of an optical branching unit having an MMI in a trapezoidal slab shape.

Figure 18A:
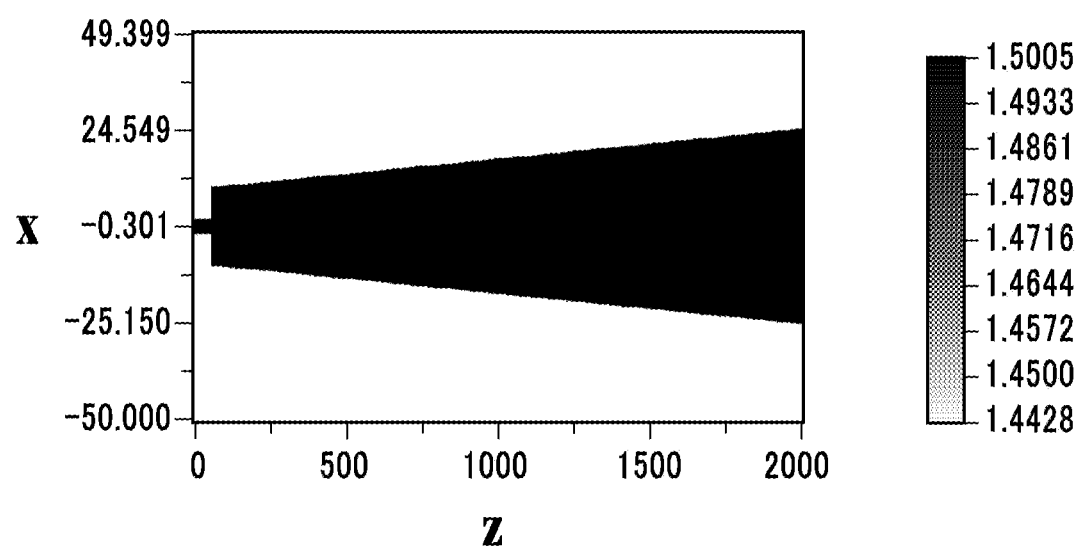
FIG. 18A is an explanatory diagram A of an analysis result of an optical guided wave mode of a trapezoidal slab waveguide MMI examined in association with Example 6 of the present invention.

FIG. 18A shows a shape of an optical waveguide of a trapezoidal slab shape in a direction (the Z direction) of propagation of light from the left to right in FIG. 18A, which represents a trapezoidal analysis model of a core width of 4 μm and a waveguide length of 50 μm as an incident waveguide and a length of 2000 µm and a core width linearly changing from 20 µm to 50 µm as a trapezoidal slab optical waveguide.

Figure 18B:
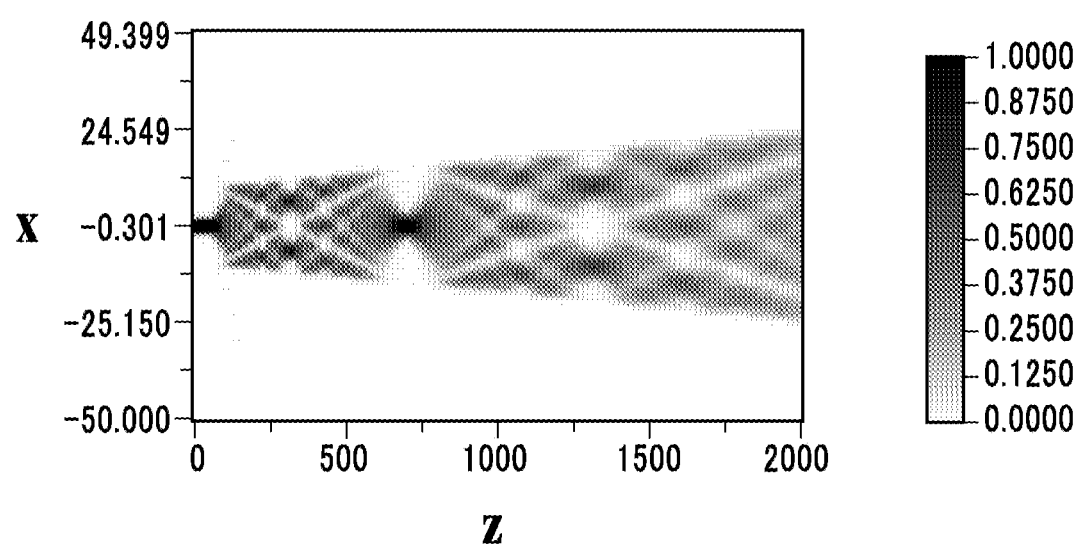
FIG. 18B is an explanatory diagram B of the analysis result of the optical guided wave mode of the trapezoidal slab waveguide MMI examined in association with Example 6 of the present invention.
Figure 19A:
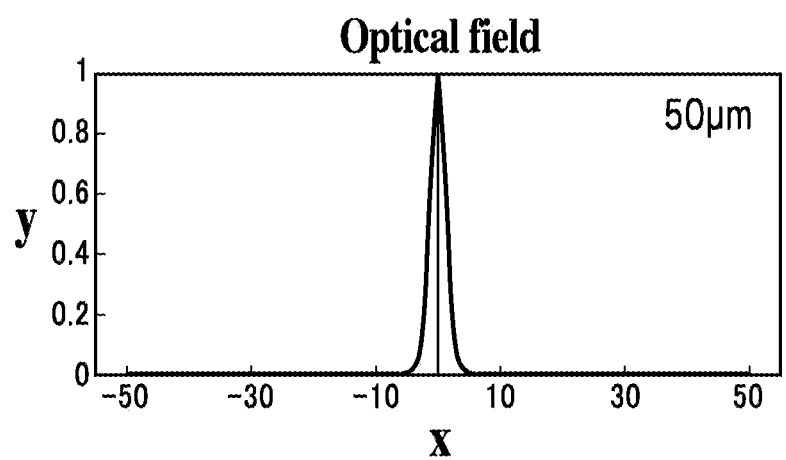
FIG. 19A is an explanatory diagram A of the analysis result of the optical guided wave mode of the trapezoidal slab waveguide MMI in FIGS. 18A and 18B.
Figure 19B:
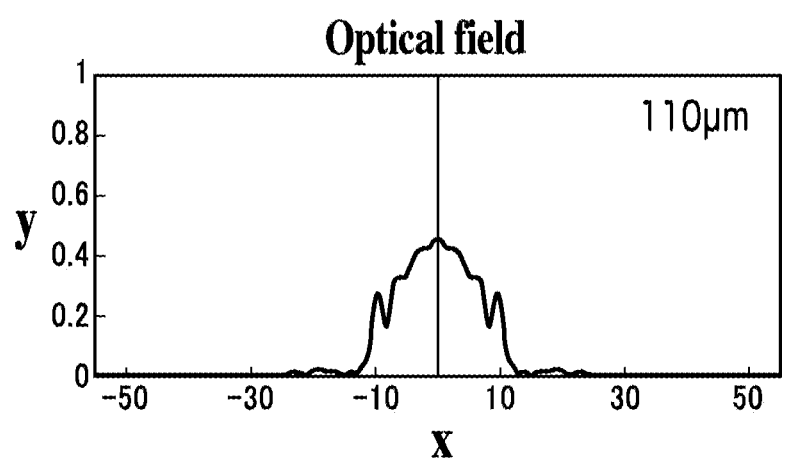
FIG. 19B is an explanatory diagram B of the analysis result of the optical guided wave mode of the trapezoidal slab waveguide MMI in FIGS. 18A and 18B.
Figure 19C:
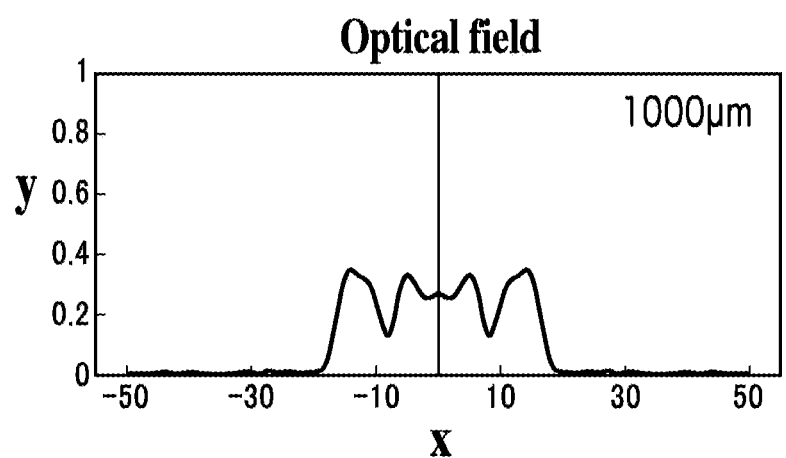
FIG. 19C is an explanatory diagram C of the analysis result of the optical guided wave mode of the trapezoidal slab waveguide MMI in FIGS. 18A and 18B.
Figure 19D:
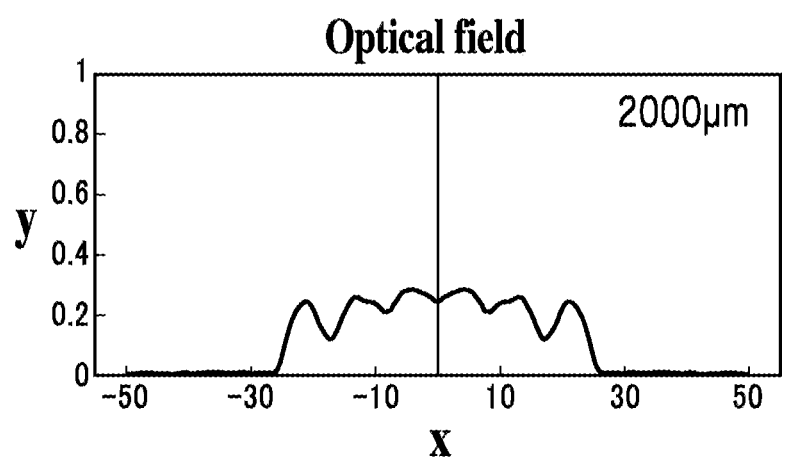
FIG. 19D is an explanatory diagram D of the analysis result of the optical guided wave mode of the trapezoidal slab waveguide MMI in FIGS. 18A and 18B.

Meanwhile, FIG. 18B shows light intensity distribution on the X-Z plane of guided wave light and FIGS. 19A to 19D show cross-sectional profiles in the X direction of the light intensity at Z positions of 50 µm, 110 µm, 1000 µm, and 2000 µm, respectively, from a light incident position inclusive of the 50-µm incident optical waveguide.

The analysis result in FIGS. 19A to 19D reveals that, in the case of the trapezoidal slab waveguide, the light is made incident and allowed to spread while substantially retaining the Gaussian distribution being the single-mode distribution in the incident optical waveguide to a position at about 110 µm from the incident waveguide, but then mode conversion to higher order modes and optical interferences among the modes occur due to an effect of a boundary condition of the trapezoidal slab waveguide, thus developing an interference pattern.

(Analysis Result of Optical Guided Wave Mode in Slab Waveguide of Tapered Shape)

FIGS. 20A to 21D show an analysis result of an optical guided wave mode of an optical branching unit having a slab waveguide of a tapered shape.

Figure 20A:
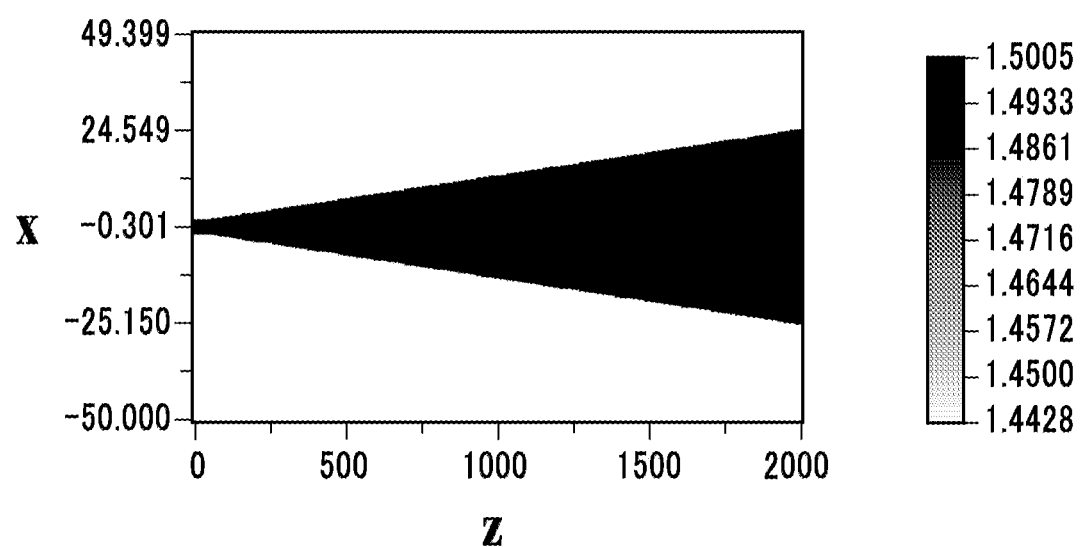
FIG. 20A is an explanatory diagram A of an analysis result of an optical guided wave mode of a tapered slab waveguide MMI examined as Example 6 of the present invention.

FIG. 20A shows a shape of an optical waveguide of a tapered shape in the direction (the Z direction) of propagation of light from the left to right in FIG. 20A, which represents a tapered analysis model of a core width of 4 µm and a waveguide length of 50 µm as an incident waveguide and a length of 2000 µm and a core width linearly changing from the core width at 5 µm of the incident optical waveguide to 50 µm as a tapered slab optical waveguide.

Figure 20B:
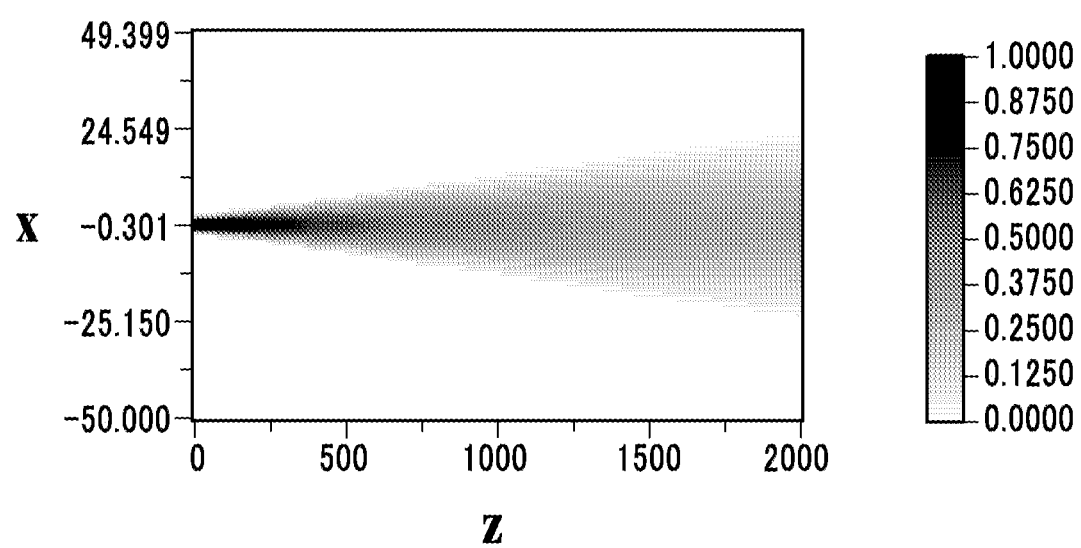
FIG. 20B is an explanatory diagram B of the analysis result of the optical guided wave mode of the tapered slab waveguide MMI examined as Example 6 of the present invention.
Figure 21A:
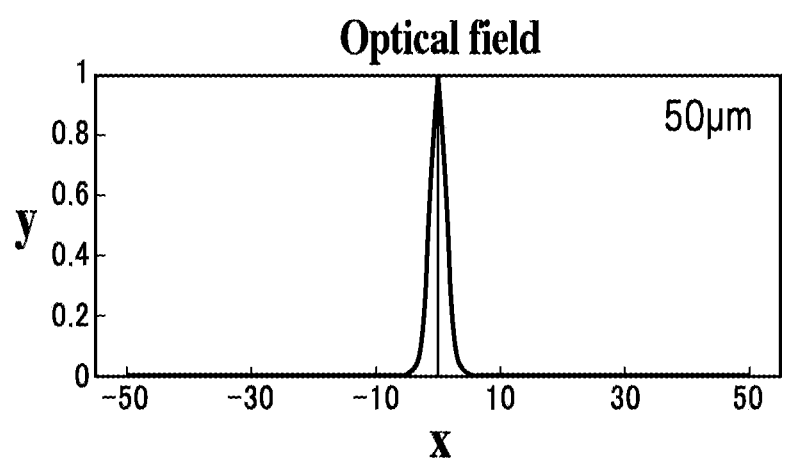
FIG. 21A is an explanatory diagram A of the analysis result of the optical guided wave mode of the tapered slab waveguide MMI in FIGS. 20A and 20B.
Figure 21B:
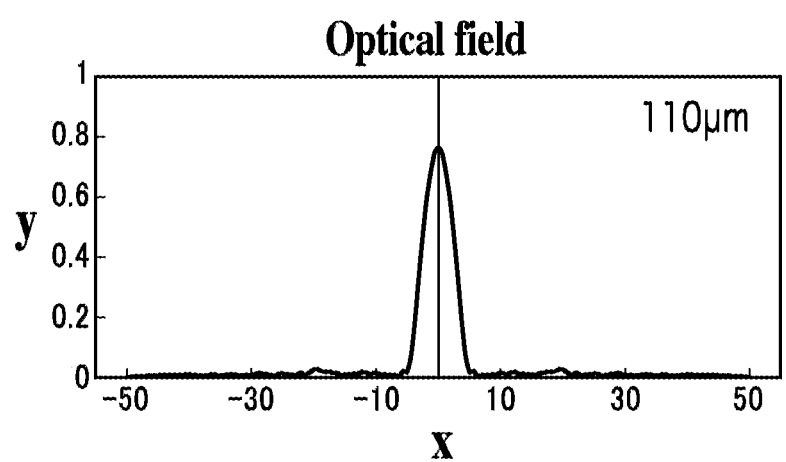
FIG. 21B is an explanatory diagram B of the analysis result of the optical guided wave mode of the tapered slab waveguide MMI in FIGS. 20A and 20B.
Figure 21C:
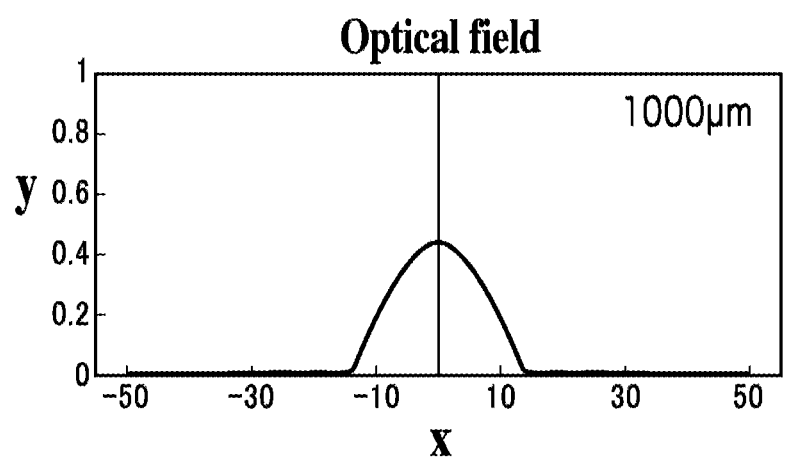
FIG. 21C is an explanatory diagram C of the analysis result of the optical guided wave mode of the tapered slab waveguide MMI in FIGS. 20A and 20B.
Figure 21D:
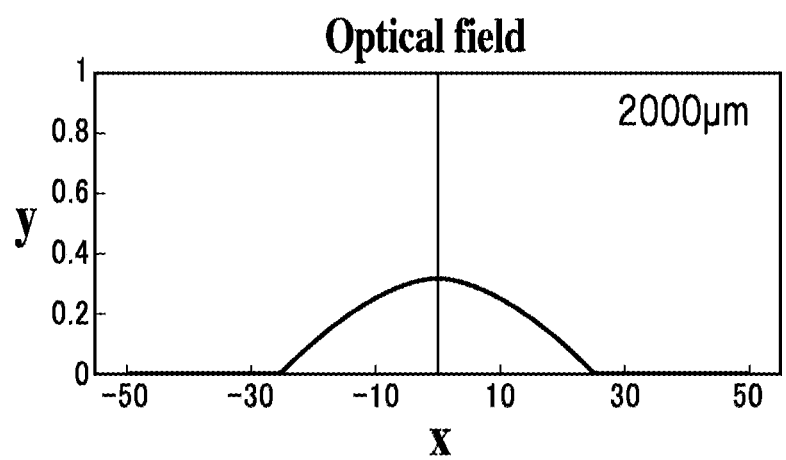
FIG. 21D is an explanatory diagram D of the analysis result of the optical guided wave mode of the tapered slab waveguide MMI in FIGS. 20A and 20B.

Meanwhile, FIG. 20B shows light intensity distribution on the X-Z plane of guided wave light and FIGS. 21A to 21D show cross-sectional profiles in the X direction of the light intensity at Z positions of 50 µm, 110 µm, 1000 µm, and 2000 µm, respectively, from a light incident position inclusive of the 50-µm incident optical waveguide.

The analysis result in FIGS. 21A to 21D reveals that, in the case of the slab waveguide of the tapered shape, mode conversion to higher order modes and optical interferences among the modes are suppressed due to a sharp change of the core width from 5 µm to 50 µm whereby light intensity distribution in the shape of Gaussian distribution is brought about while maintaining and spreading the single-mode distribution in the incident optical waveguide beyond 200 µm and to 2000 µm without causing any multimode interferences.

(Analysis Result of Optical Guided Wave Mode in Slab Waveguide of Parabolic Shape)

FIGS. 22A to 23D show an analysis result of an optical guided wave mode of an optical branching unit having a slab waveguide of a parabolic shape.

Figure 22A:
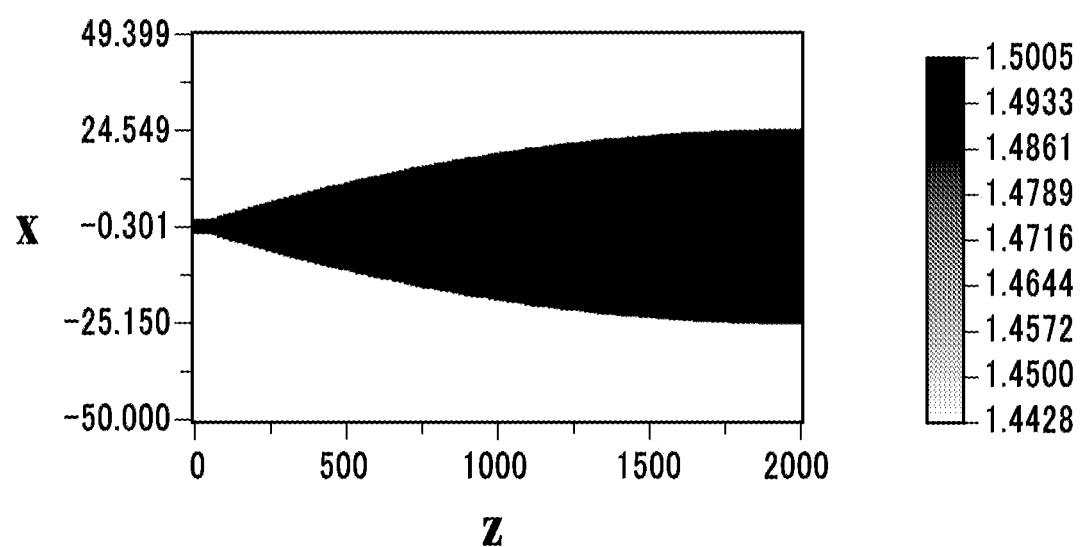
FIG. 22A is an explanatory diagram A of an analysis result of an optical guided wave mode of a parabolic slab waveguide MMI examined as Example 6 of the present invention.

FIG. 22A shows a shape of an optical waveguide of a parabolic shape in the direction (the Z direction) of propagation of light from the left to right in FIG. 22A, which represents a parabolic analysis model of a core width of 4 µm and a waveguide length of 50 µm as an incident waveguide and a length of 2000 µm and a core width in accordance with a parabolic function from the core width at 5 µm of the incident optical waveguide to 50 µm as a parabolic slab optical waveguide.

Figure 22B:
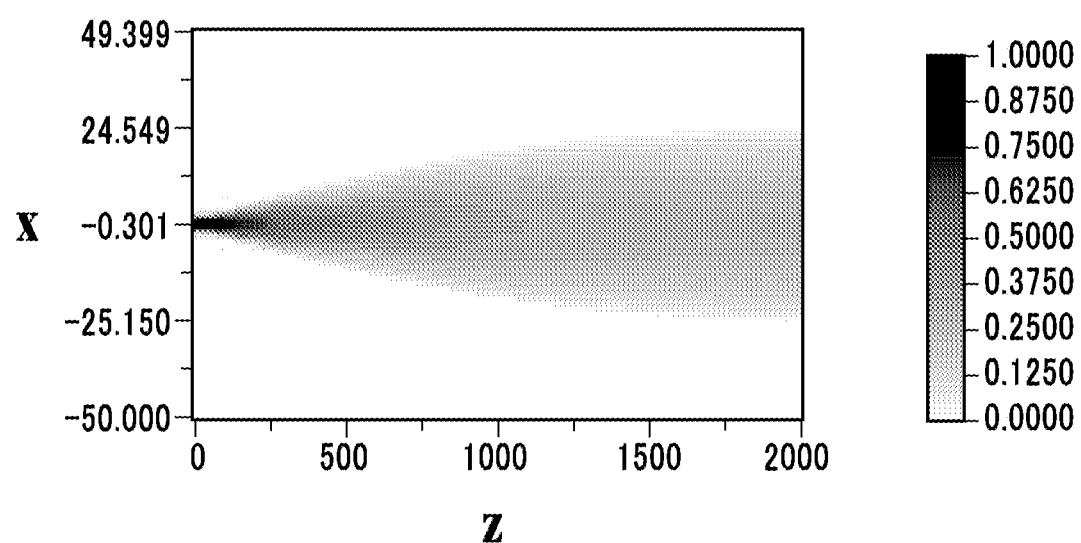
FIG. 22B is an explanatory diagram B of the analysis result of the optical guided wave mode of the parabolic slab waveguide MMI examined as Example 6 of the present invention.
Figure 23A:
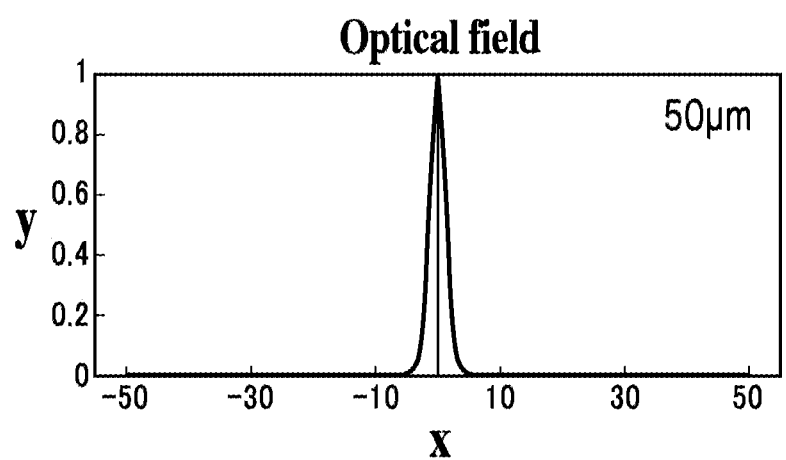
FIG. 23A is an explanatory diagram A of the analysis result of the optical guided wave mode of the parabolic slab waveguide MMI in FIGS. 22A and 22B.
Figure 23B:
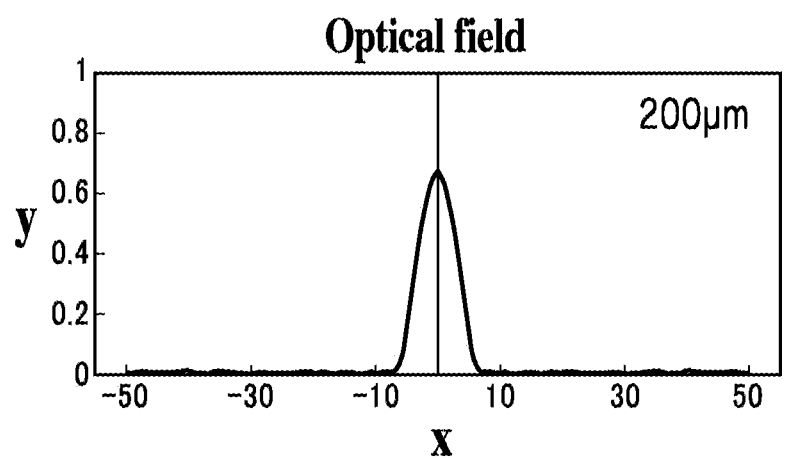
FIG. 23B is an explanatory diagram B of the analysis result of the optical guided wave mode of the parabolic slab waveguide MMI in FIGS. 22A and 22B.
Figure 23C:
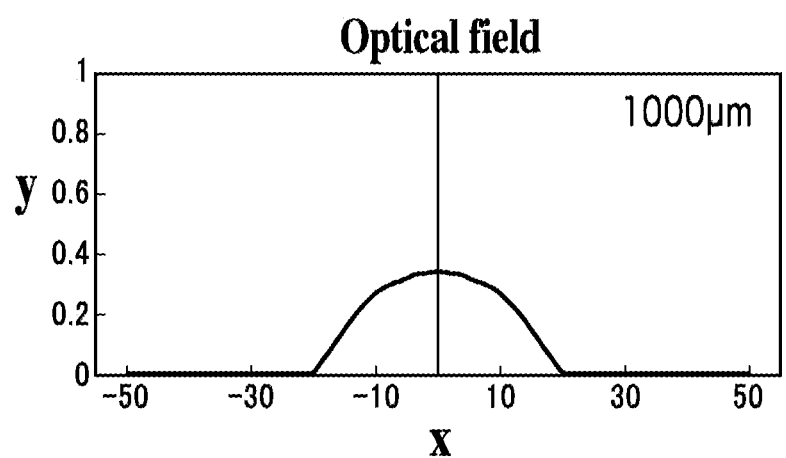
FIG. 23C is an explanatory diagram C of the analysis result of the optical guided wave mode of the parabolic slab waveguide MMI in FIGS. 22A and 22B.
Figure 23D:
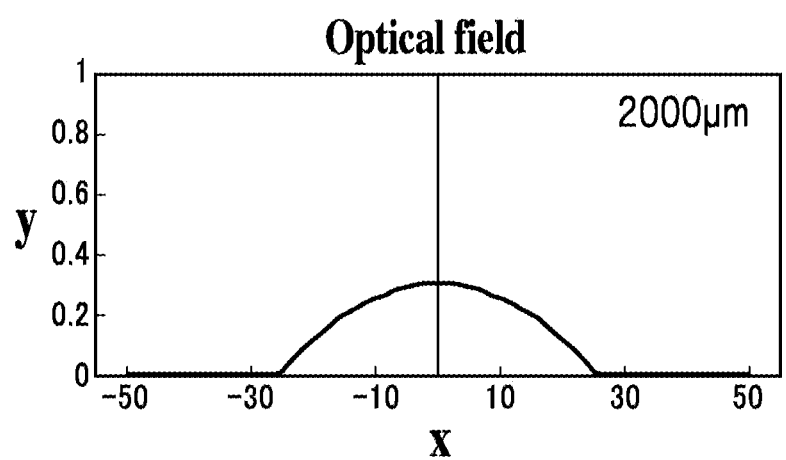
FIG. 23D is an explanatory diagram D of the analysis result of the optical guided wave mode of the parabolic slab waveguide MMI in FIGS. 22A and 22B.

Meanwhile, FIG. 22B shows light intensity distribution on the X-Z plane of guided wave light and FIGS. 23A to 23D show cross-sectional profiles in the X direction of the light intensity at Z positions of 50 µm, 200 µm, 1000 µm, and 2000 µm, respectively, from a light incident position inclusive of the incident optical waveguide at 50 µm or the like.

According to the analysis result in FIGS. 23A to 23D, mode conversion to higher order modes and multimode interferences attributed to optical interferences among the modes occur and light intensity distribution propagates in a shape of a Sinc function (sin(x)/x) in the case of the slab waveguide of the parabolic shape. However, in FIG. 23B, $\{\sin(x)/x\}^2$ holds true as the Y axis indicates the light intensity and peaks other than a main peak at x=0 get flattened and overlap the X axis.

(Analysis Result of Optical Guided Wave Mode in Case of Setting Off Free Radiation from Core End Portion)

FIGS. 24A to 25D show an analysis result of an optical guided wave in a case of setting off free radiation from a core end portion into a clad medium for comparison with the slab shapes.

Figure 24A:
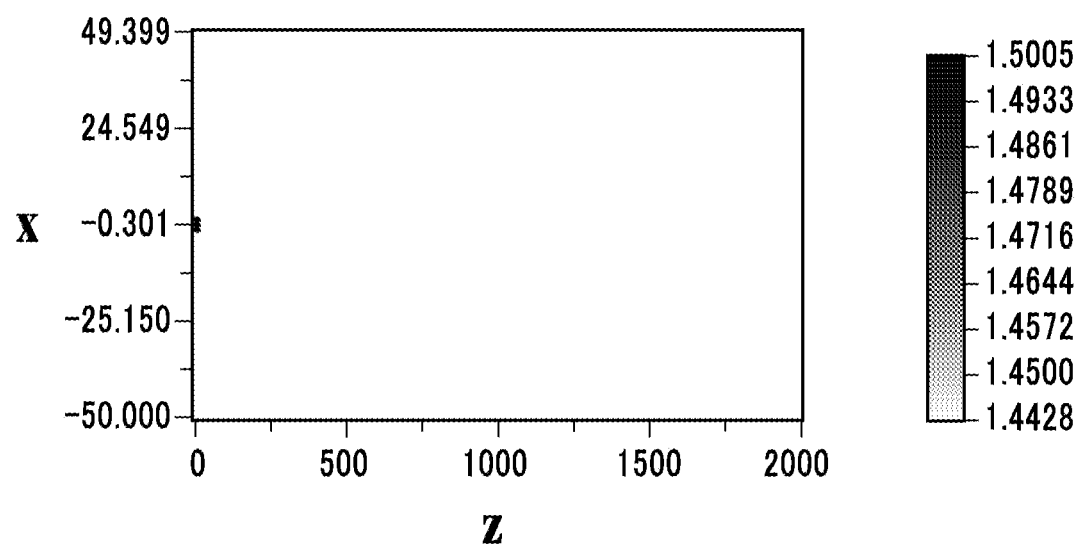
FIG. 24A is an explanatory diagram A of an analysis result of an optical guided wave mode in a case of setting off free radiation from a core end portion into a clad medium, which is examined for comparison.

FIG. 24A shows a shape of an optical waveguide in the direction (the Z direction) of propagation of light from the left to right in FIG. 24A representing an analysis model in which the light is guided in a core width of 4 µm and a waveguide length of 50 and is then radiated freely into the clad medium.

Figure 24B:
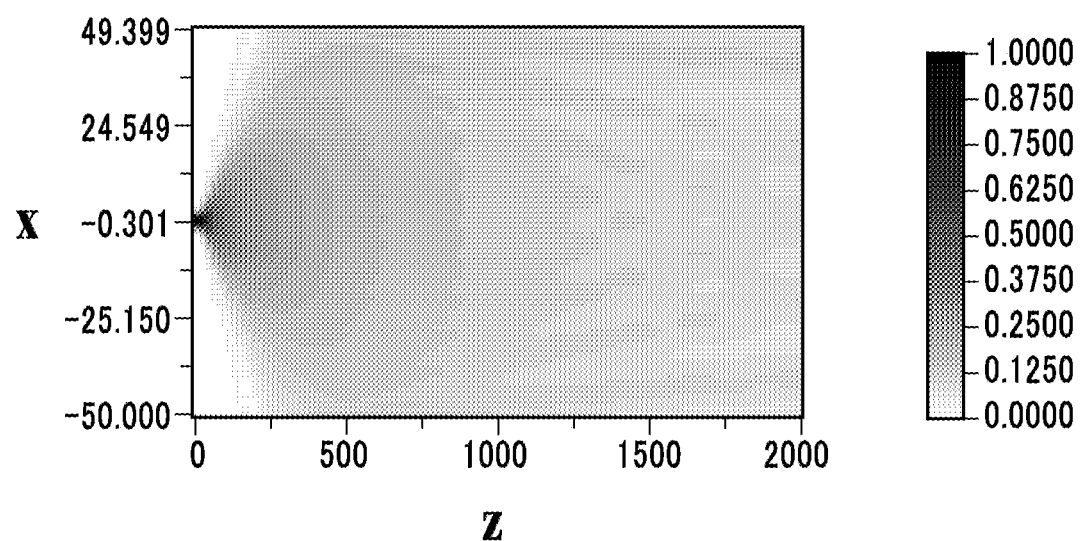
FIG. 24B is an explanatory diagram B of the analysis result of the optical guided wave mode in the case of setting off the free radiation from the core end portion into the clad medium, which is examined for comparison.
Figure 25A:
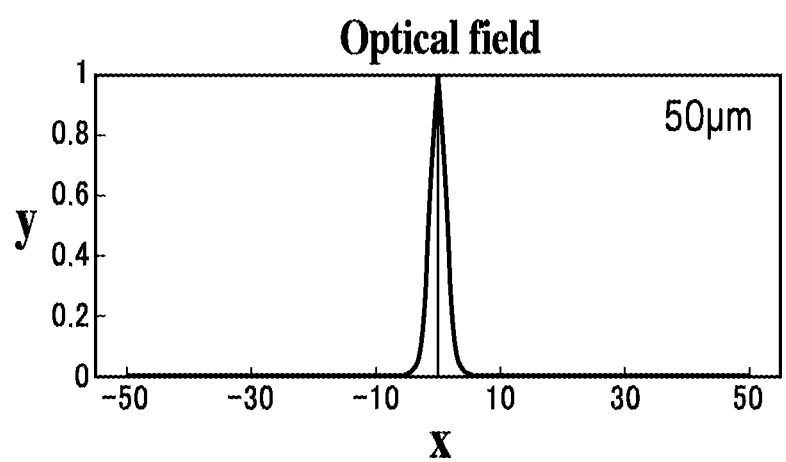
FIG. 25A is an explanatory diagram A of the analysis result of the optical guided wave mode in the case of setting off the free radiation in FIGS. 24A and 24B.
Figure 25B:
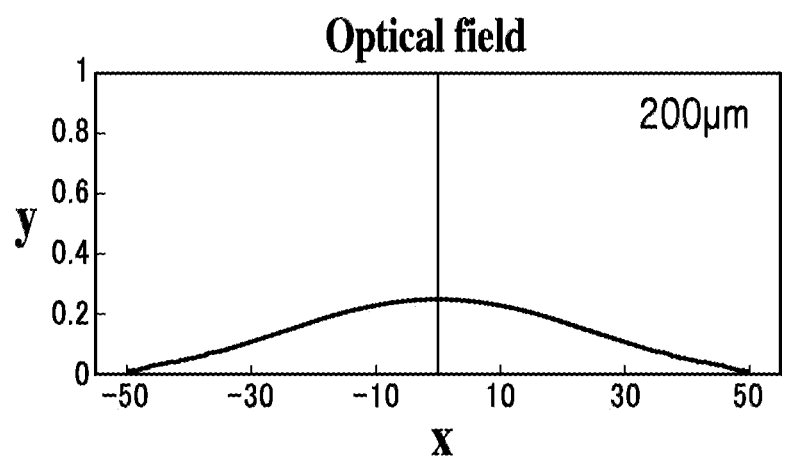
FIG. 25B is an explanatory diagram B of the analysis result of the optical guided wave mode in the case of setting off the free radiation in FIGS. 24A and 24B.
Figure 25C:
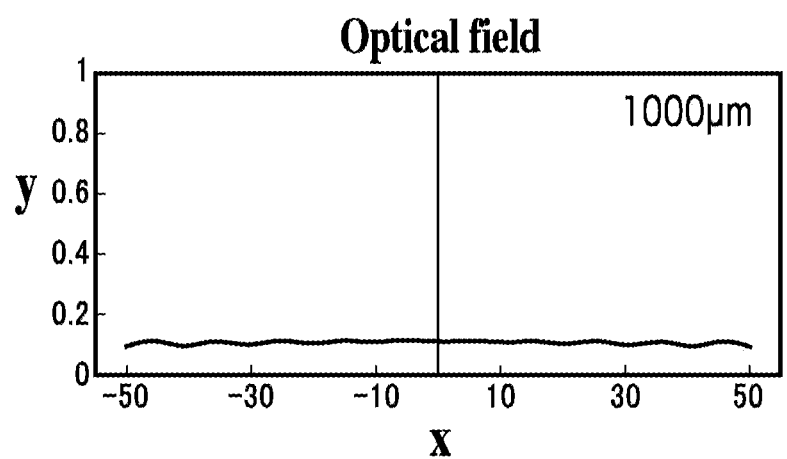
FIG. 25C is an explanatory diagram C of the analysis result of the optical guided wave mode in the case of setting off the free radiation in FIGS. 24A and 24B.
Figure 25D:
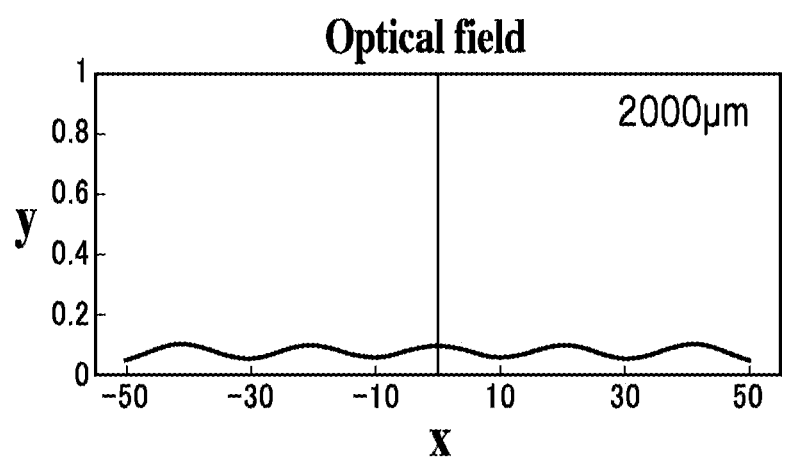
FIG. 25D is an explanatory diagram D of the analysis result of the optical guided wave mode in the case of setting off the free radiation in FIGS. 24A and 24B.

Meanwhile, FIG. 24B shows light intensity distribution on the X-Z plane of guided wave light and FIGS. 25A to 25D show cross-sectional profiles in the X direction of the light intensity at Z positions of 50 µm, 200 µm, 1000 µm, and 2000 µm, respectively, from a light incident position inclusive of the incident optical waveguide at 50 µm or the like.

The analysis result in FIGS. 25A to 25D reveals that the light intensity distribution of the light freely radiated into the clad medium exhibits flat light intensity distribution in which the single-mode distribution spreads rapidly in the incident optical waveguide (although waveforms like slight multimode interferences are observed in the drawings, they are thought to be due to an effect of an error of a boundary condition (PML) around an analysis area). While all the above-mentioned two-dimensional FD-BPM analyses were calculated in the TE mode, similar analysis results were obtained in a TM mode as well.

The above description reveals that the light intensity distribution in the slab optical waveguide of the optical branching unit maintains the Gaussian distribution in the direction perpendicular to the direction of travel of the light by using the tapered shape, which is the shape that does not cause the multimode interferences, for the slab optical waveguide of the optical branching unit. This is an advantageous characteristic for the waveguide type optical interferometer circuit.

Meanwhile, as mentioned above, in the case where the slab waveguide in the parabolic shape causes the multimode interferences, the light intensity distribution in the slab optical waveguide of the optical branching unit exhibits the Sinc function distribution in the direction perpendicular to the direction of travel of the light.

Example 7-1

Figure 26:
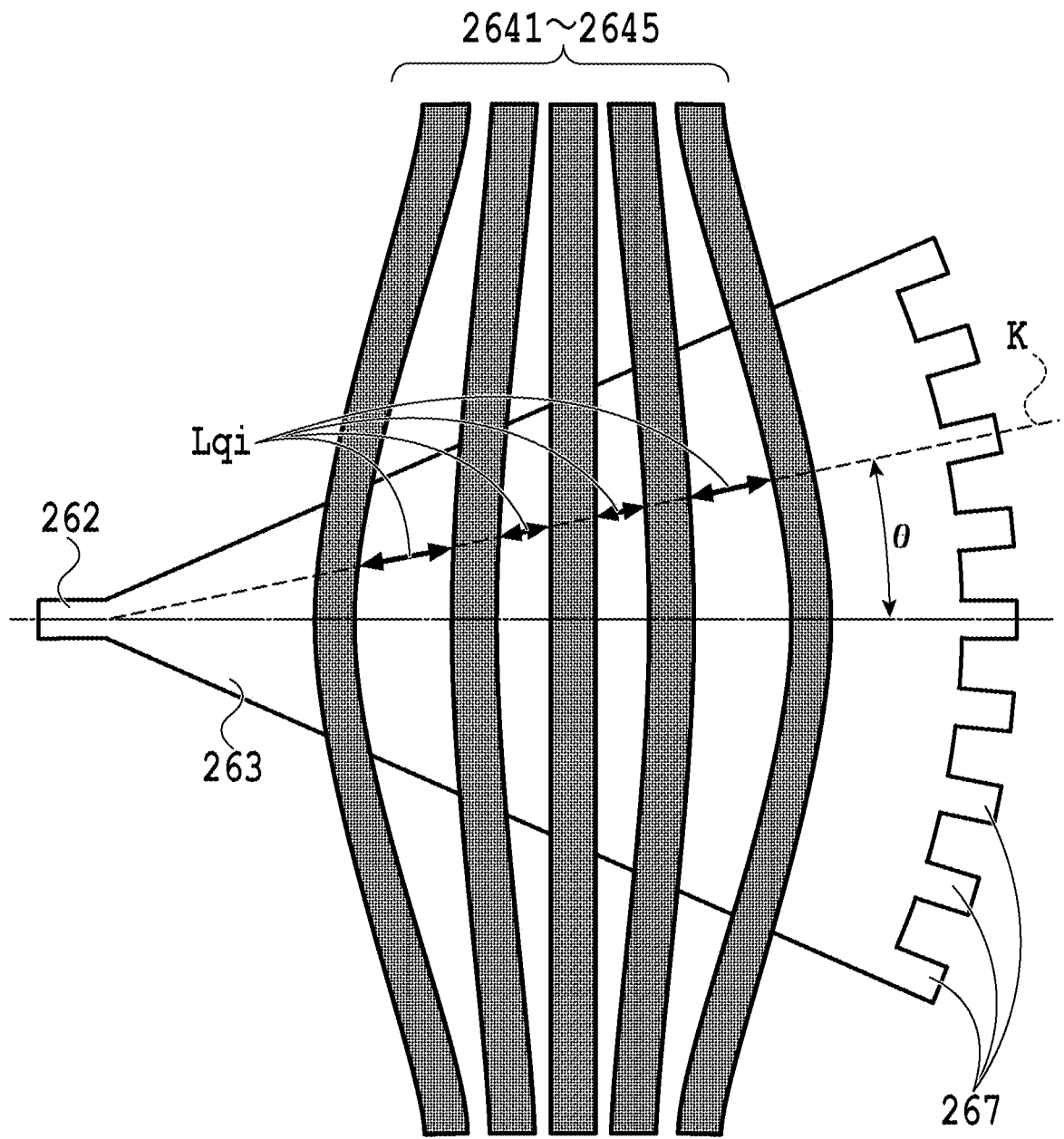
FIG. 26 is a substrate plan view to explain a slab optical waveguide core and a light intensity compensating region of a waveguide type optical interferometer circuit according to Example 7-1 of the present invention.

FIG. 26 shows a substrate plan view to explain a slab optical waveguide core of a waveguide type optical interferometer circuit according to Example 7 of the present invention and a mode of the light intensity compensating region (Example 7-1) therein.

According to the results of examination shown in Example 6, a light intensity distribution profile of light made incident from an input waveguide 262 exhibits Gaussian distribution by using the tapered shape, which is the shape that does not cause the multimode interferences, as the shape of the slab optical waveguide. Moreover, as mentioned above, in the case where the slab waveguide in the parabolic shape causes the multimode interferences, the light intensity distribution in the slab optical waveguide of the optical branching unit exhibits the Sinc function distribution in the direction perpendicular to the direction of travel of the light. In addition, it is possible to suppress a rise in temperature against the light intensity by changing the intervals of the grooves in the light intensity compensating region while keeping the groove widths of the grooves constant in the longitudinal direction of the grooves.

From the reasons mentioned above, interferometer circuits of this Example 7 and so on adopt a slab optical waveguide 263 having a fan-like tapered shape as shown in FIG. 26. In the slab optical waveguide 263 having the fan-like tapered shape in FIG. 26, light made incident is branched off while using a connecting end of an input waveguide 262 as a pivot of the fan. Each of branched light beams propagates on a straight line of an optical path K that forms a radiation angle θ with respect to the center axis. The branched light beams intersect with multiple grooves 2641 to 2645 constituting the light intensity compensating region and are demultiplexed while reaching input ends of multiple optical waveguides 267 arranged on an arc portion constituting a perimeter of the fan. In light of one of multiple output waveguides, a slab optical waveguide of the optical coupling unit on the output side of the optical interferometer circuit can also be treated as a slab optical waveguide of a fan-like tapered shape which is arranged symmetrically to the slab optical waveguide 263.

In Example 7-1 of FIG. 26, multiple grooves 2641 to 2645 having equal widths and intersecting with the optical paths while serving as the light intensity compensating region are formed in the slab optical waveguide 263 of the fan-like tapered shape while changing intervals between the respective grooves in the longitudinal direction of the grooves, and each of the grooves is filled with a material having a light intensity coefficient different from that of the optical waveguides 267.

In the optical branching unit in FIG. 26, assuming that θ is the radiation angle relative to the center axis of the connecting end of the input waveguide 262, K is the straight line of the optical path joining the center of a front end of an i-th (i is a positive integer) arrayed optical waveguide 267, θi is a radiation angle of K, and Lqi is a total of the optical distance of the intervals between the respective grooves in the case where the straight line K intersects with two or more grooves of the light intensity compensating region in accordance with Examples 4 and 5 (FIGS. 14 and 15), Lqi can be expressed as a function of Gaussian distribution of θ. In a case where the widths of the grooves are set constant, the intervals of the grooves vary in response to θ whereby general shapes of the grooves are formed into curved shapes as shown in the multiple grooves 2641 to 2645 in FIG. 26.

In this instance, it is possible to compensate for the balance of the optical distances changed due to the light intensity by configuring the light intensity compensating region such that either the total of the groove widths of the grooves or the total of the intervals of the grooves is made proportional to the light intensity distribution in the case where the incident light from the input waveguide is radiated inside the optical branching unit.

Particularly, in the case of the slab optical waveguide 263 of the fan-like tapered shape, it is possible to compensate for the balance of the optical distances changed due to the light intensity by configuring the light intensity distribution of the demultiplexed light subjected to suppression of the multimode interferences to have a proportional relation to the Gaussian distribution. Meanwhile, in the case where the multimode interferences occur in the parabolic slab waveguide, it is possible to compensate for the balance of the optical distances changed due to the light intensity by configuring the light intensity distribution of the demultiplexed light to have a proportional relation to the Sinc function distribution.

Example 7-2

Figure 27:
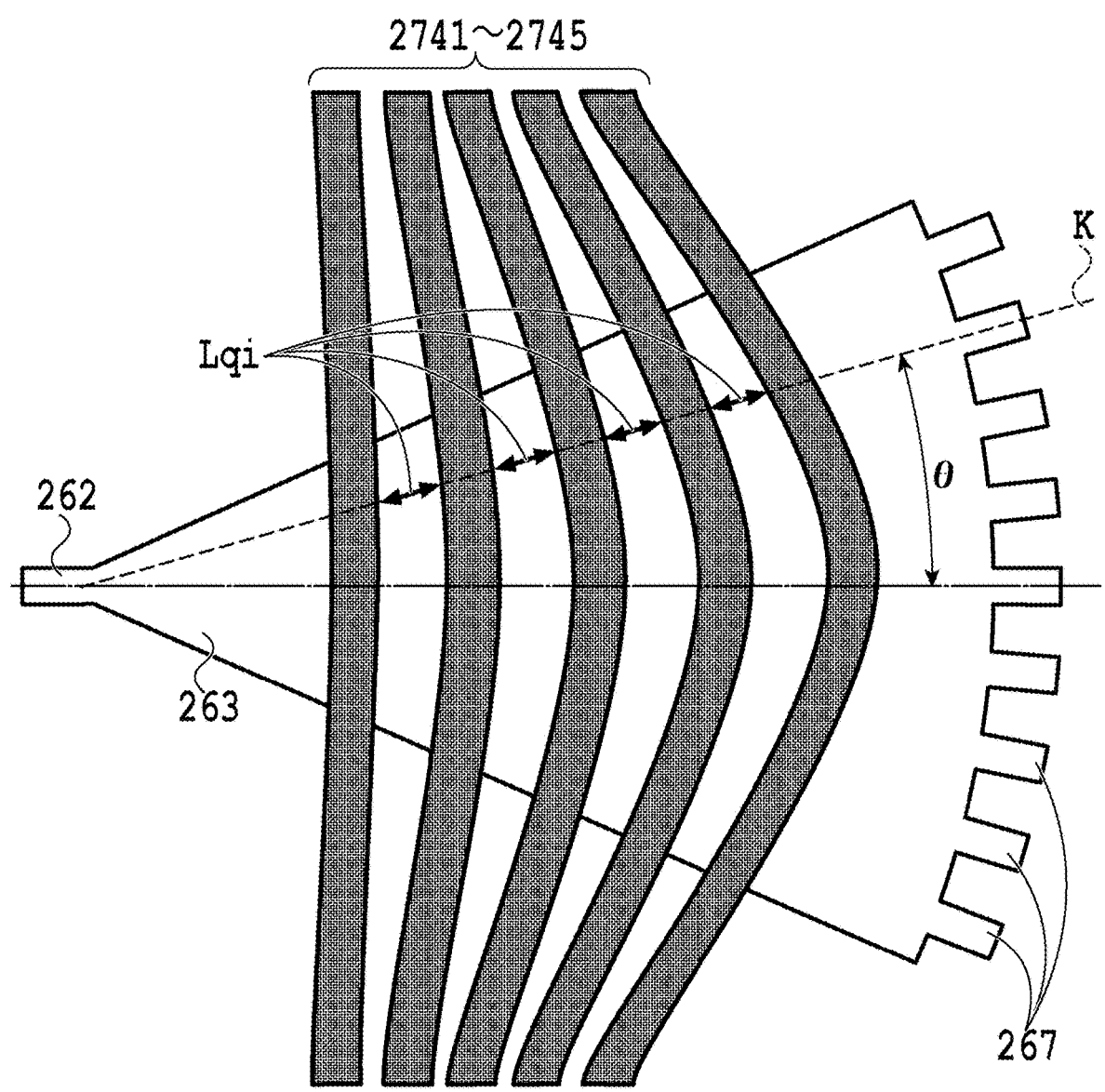
FIG. 27 is a substrate plan view to explain a slab optical waveguide core and a light intensity compensating region of a waveguide type optical interferometer circuit according to Example 7-2 of the present invention.

FIG. 27 shows a substrate plan view to explain the slab optical waveguide core of the waveguide type optical interferometer circuit according to Example 7 of the present invention and another mode of the light intensity compensating region (Example 7-2) therein. The same portions as those in FIG. 26 are denoted by the same reference signs.

As with FIG. 26, in the case where the total value Lqi of the intervals of the grooves is defined as a function of θ regarding multiple grooves 2741 to 2745 having equal widths, it is possible to compensate for the balance of the optical distances changed due to the light intensity by configuring this function to be a function of the Gaussian distribution proportional to the light intensity distribution in FIG. 27 as well. FIG. 26 shows the case of the groove structure of the light intensity compensating region which is symmetric with respect to the groove 2643 as the center in the substrate plan view without taking into account the radiation angle of the light from the input waveguide 262. In reality, however, it is desirable to design the structure while taking into account the radiation angle θi of the light from the input waveguide 262 in such a way as to bring an intersecting angle of the straight line K with the grooves 2741 to 2745 as perpendicular as possible as shown in FIG. 27.

Example 8-1

Figure 28:
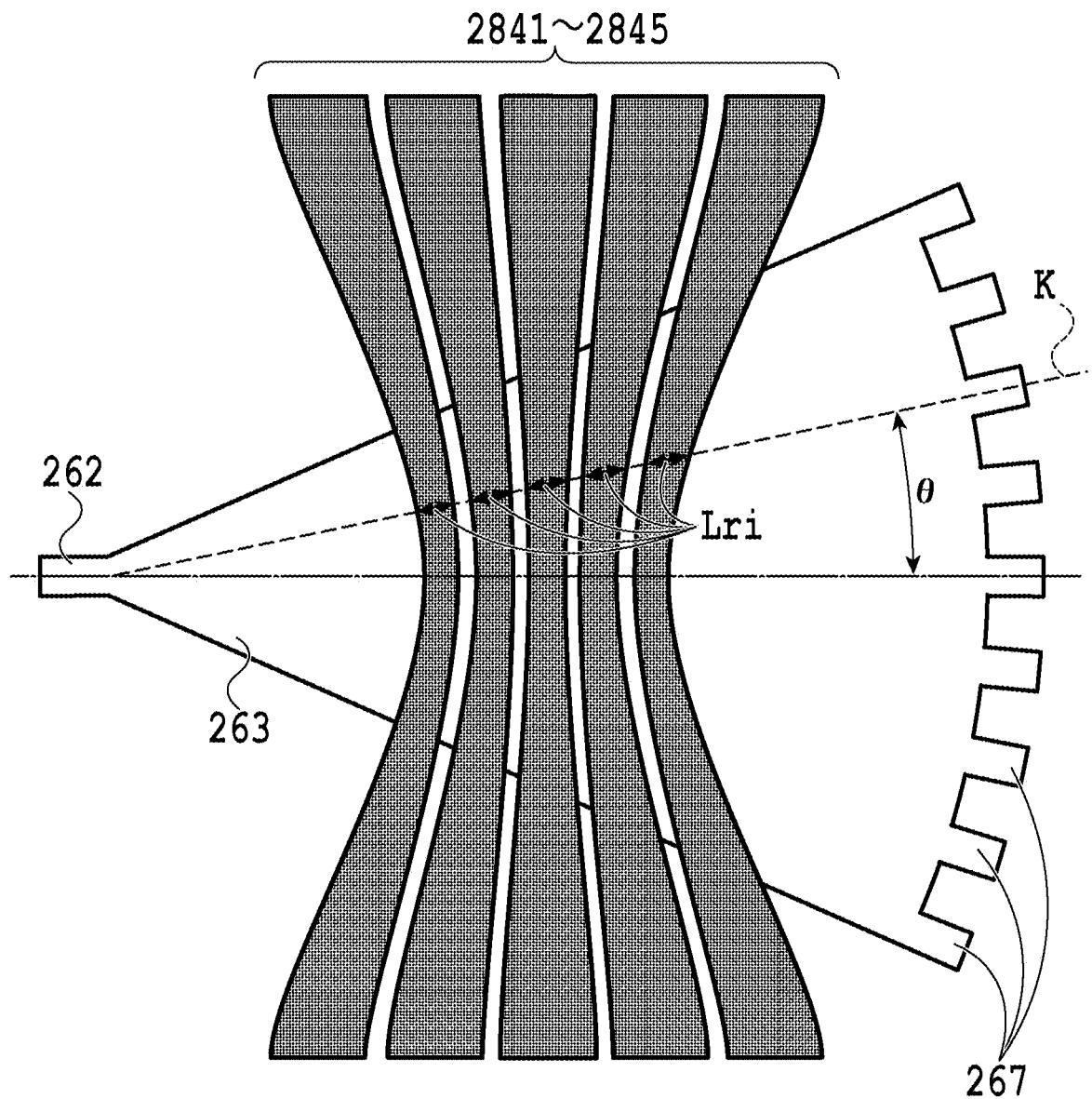
FIG. 28 is a substrate plan view to explain a slab optical waveguide core and a light intensity compensating region of a waveguide type optical interferometer circuit according to Example 8-1 of the present invention.

FIG. 28 shows a substrate plan view to explain a slab optical waveguide core of a waveguide type optical interferometer circuit according to Example 8 of the present invention and a mode of the light intensity compensating region (Example 8-1) therein.

As mentioned above, the light intensity distribution profile of the light made incident from the input waveguide 262 shows the Gaussian distribution by using the shape of the slab optical waveguide such as the tapered shape that does not cause the multimode interferences. This is why Examples 8-1 to 8-3 in FIGS. 28 to 30 also adopt the slab optical waveguide 263 of the fan-like tapered shape.

Moreover, in the case where the slab waveguide 263 in the parabolic shape causes the multimode interferences, it is also possible to compensate for the balance of the optical distances changed due to the light intensity by configuring the light intensity distribution profile of the demultiplexed light to have a proportional relation to the Sinc function distribution.

In addition, in Example 8, it is possible to suppress a rise in temperature against the light intensity by changing the groove widths of the respective grooves in the light intensity compensating region in the longitudinal direction of the grooves while keeping the intervals of the grooves constant.

In Example 8-1 of FIG. 28, one or more grooves 2841 to 2845 having variable groove widths in the longitudinal direction of the grooves while having constant intervals between the respective grooves intersecting with the optical paths are formed as the light intensity compensating region in the slab optical waveguide 263 having the fan-like tapered shape, and each of the grooves is filled with a material having a light intensity coefficient different from that of the optical waveguides 267.

In the optical branching unit, assuming that θ is the radiation angle relative to the center axis of the connecting end of the input waveguide 262, K is the straight line of the optical path joining the center of the front end of the i-th (i is a positive integer) arrayed optical waveguide 267, θi is the radiation angle of K, and Lri is a total of the optical distance of the respective groove widths in the case where the straight line K intersects with the multiple grooves 2841 to 2845, Lri can be expressed as a function of θ. In a case where the intervals of the grooves are set constant, the widths of the grooves vary in response to θ whereby general shapes of the grooves are formed into curved shapes as shown in the multiple grooves 2841 to 2845 in FIG. 28. It is possible to compensate for the balance of the optical distances changed due to the light intensity by configuring a difference obtained by subtracting Lri from a constant to be a function of the Gaussian distribution.

Moreover, in the case where the slab waveguide 263 in the parabolic shape causes the multimode interferences, it is also possible to compensate for the balance of the optical distances changed due to the light intensity by configuring the difference obtained by subtracting Lri from the constant to have a proportional relation to the Sinc function distribution.

Example 8-2

Figure 29:
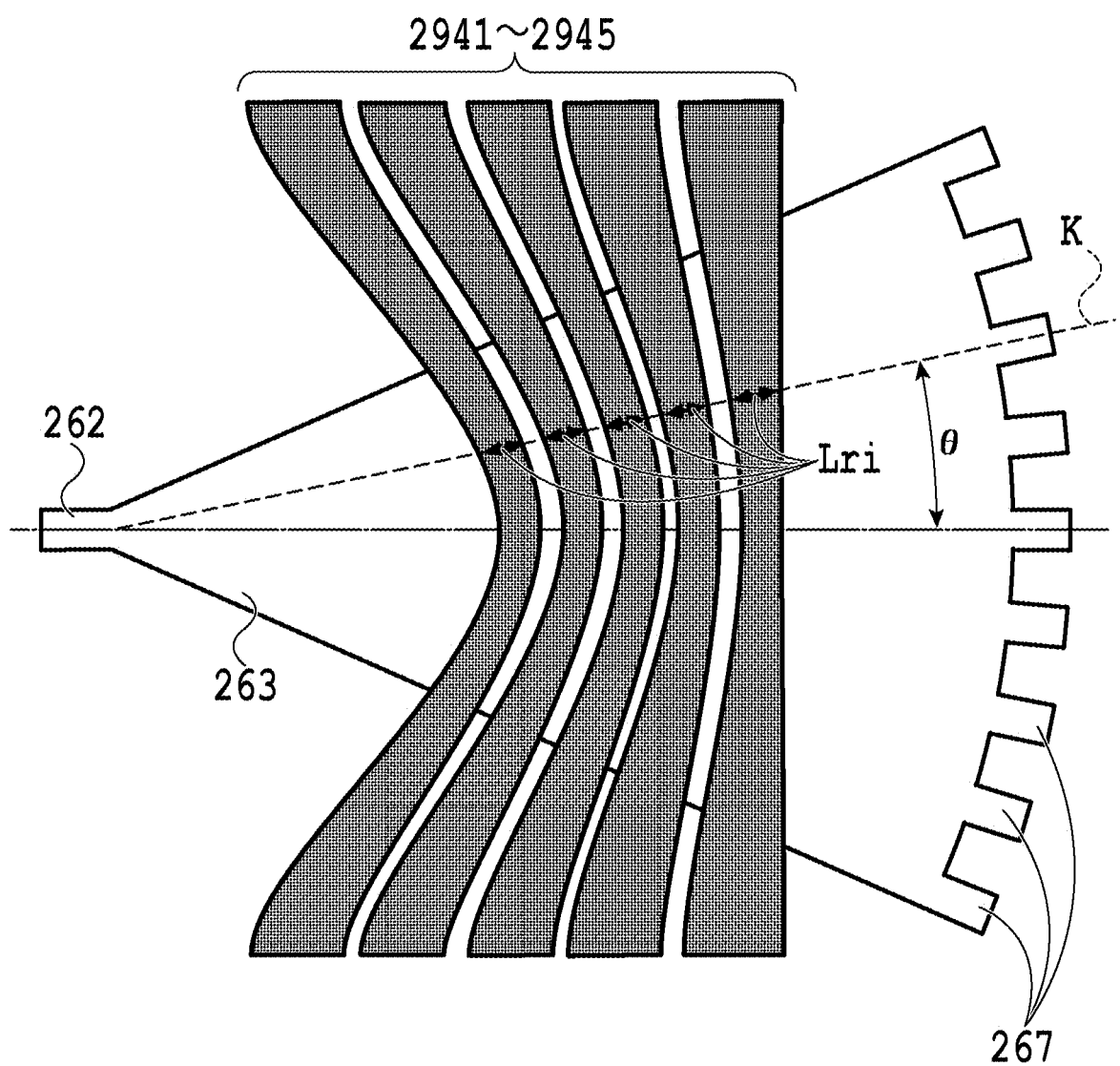
FIG. 29 is a substrate plan view to explain a slab optical waveguide core and a light intensity compensating region of a waveguide type optical interferometer circuit according to Example 8-2 of the present invention.

Meanwhile, FIG. 29 shows a substrate plan view to explain the slab optical waveguide core of the waveguide type optical interferometer circuit according to Example 8 of the present invention and another mode of the light intensity compensating region (Example 8-2) therein.

As with FIG. 28, in the case where the total value Lri of the groove widths is defined as a function of θ regarding multiple grooves 2941 to 2945 having equal intervals, it is possible to compensate for the balance of the optical distances changed due to the light intensity by configuring this function to be a function of the Gaussian distribution proportional to the light intensity distribution in FIG. 29 as well. FIG. 28 shows the groove structure of the light intensity compensating region which is symmetric with respect to the groove 2843 as the center in the substrate plan view without taking into account the radiation angle of the light from the input waveguide 262. In reality, however, it is desirable to design the structure while taking into account the radiation angle θi of the light from the input waveguide 262 in such a way as to bring an intersecting angle of the straight line K with the groove structures 2941 to 2945 as perpendicular as possible.

Example 8-3

Figure 30:
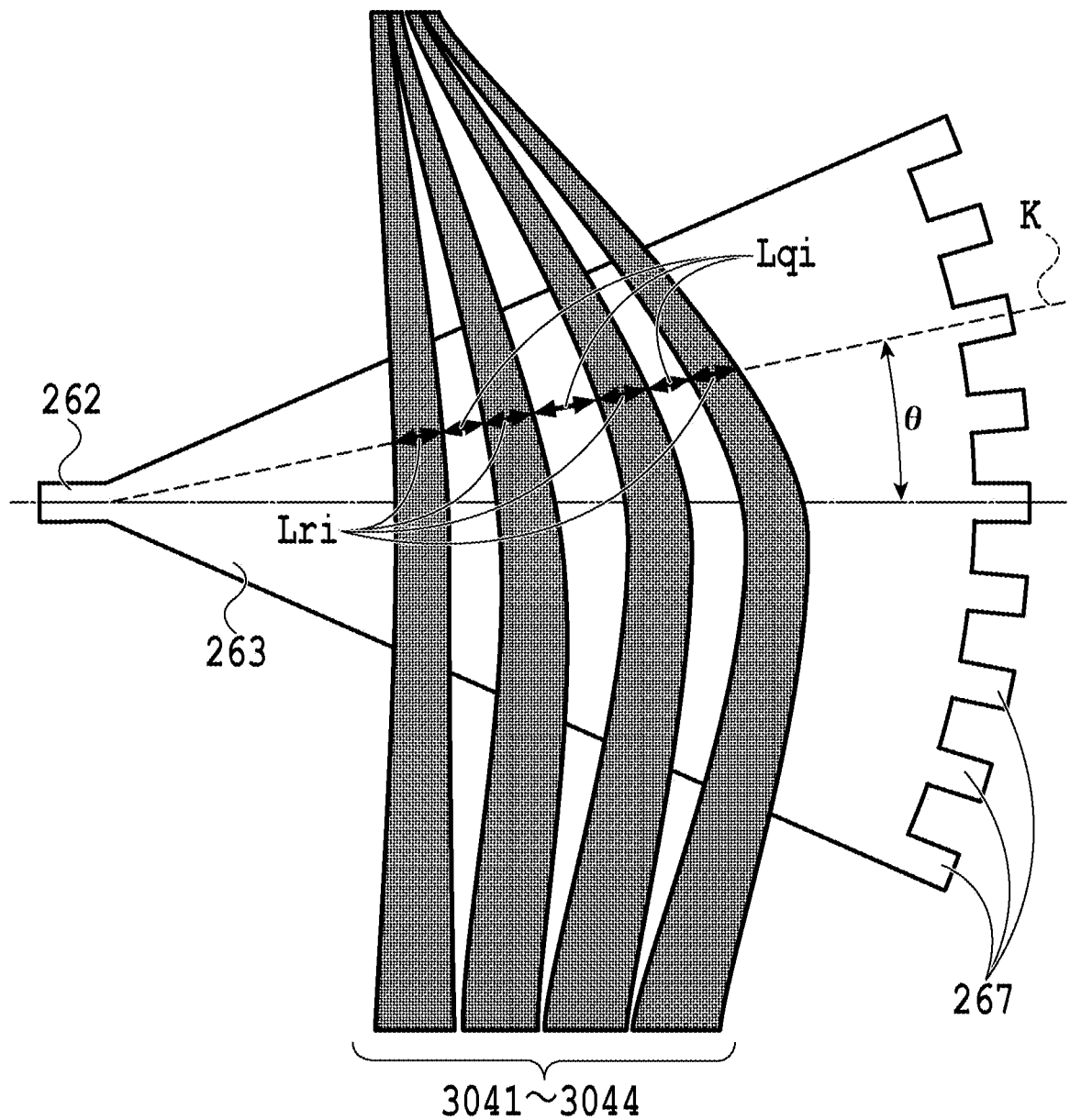
FIG. 30 is a substrate plan view to explain a slab optical waveguide core and a light intensity compensating region of a waveguide type optical interferometer circuit according to Example 8-3 of the present invention.

FIG. 30 shows a substrate plan view to explain the slab optical waveguide core of the waveguide type optical interferometer circuit according to Example 8 of the present invention and still another mode of the light intensity compensating region (Example 8-3) therein. In a case of not only compensating for the balance corresponding to the changes of the optical distances due to the light intensity distribution of the slab optical waveguide serving as the optical branching unit of the waveguide type optical interferometer circuit as in the above-described Examples 7 and 8 but also compensating for the balance while taking into account changes of the optical distances among the multiple arrayed optical waveguides having different lengths in the waveguide type optical interferometer circuit at the same time, it is possible to carry out Examples 7 and 8 in combination.

Specifically, regarding the change of the optical distances due to the light intensity distribution of the slab optical waveguide serving as the optical branching unit of the waveguide type optical interferometer circuit, the balance of the changes of the optical distances of the slab optical waveguide as the optical branching unit are compensated for in the first place by changing the intervals of the grooves in the light intensity compensating region according to Example 7, namely, by setting the total Lqi of the intervals of the grooves to the function of the Gaussian distribution.

Further, it is possible to compensate for the balance of the optical distances changed due to the light intensity occurring in the arrayed optical waveguide because of the guided wave light having the intensity distribution, by setting the total Lri of the groove widths in the light intensity compensating region such that the difference obtained by subtracting Lri from the constant becomes the function of the Gaussian distribution according to Example 8.

Moreover, in the case where the slab waveguide 263 in the parabolic shape causes the multimode interferences, it is also possible to compensate for the balance of the optical distances changed due to the light intensity by setting the total Lri of the groove widths in the light intensity compensating region such that the difference obtained by subtracting Lri from the constant has a proportional relation to the Sinc function distribution according to Example 8.

As a consequence of changing both the groove widths and the intervals between the grooves of the grooves constituting the light intensity compensating region at the same time as the functions of θ as described above, general shapes of the grooves are formed into curved shapes as shown in grooves 3041 to 3044 in FIG. 30.

Example 9

Figure 31:
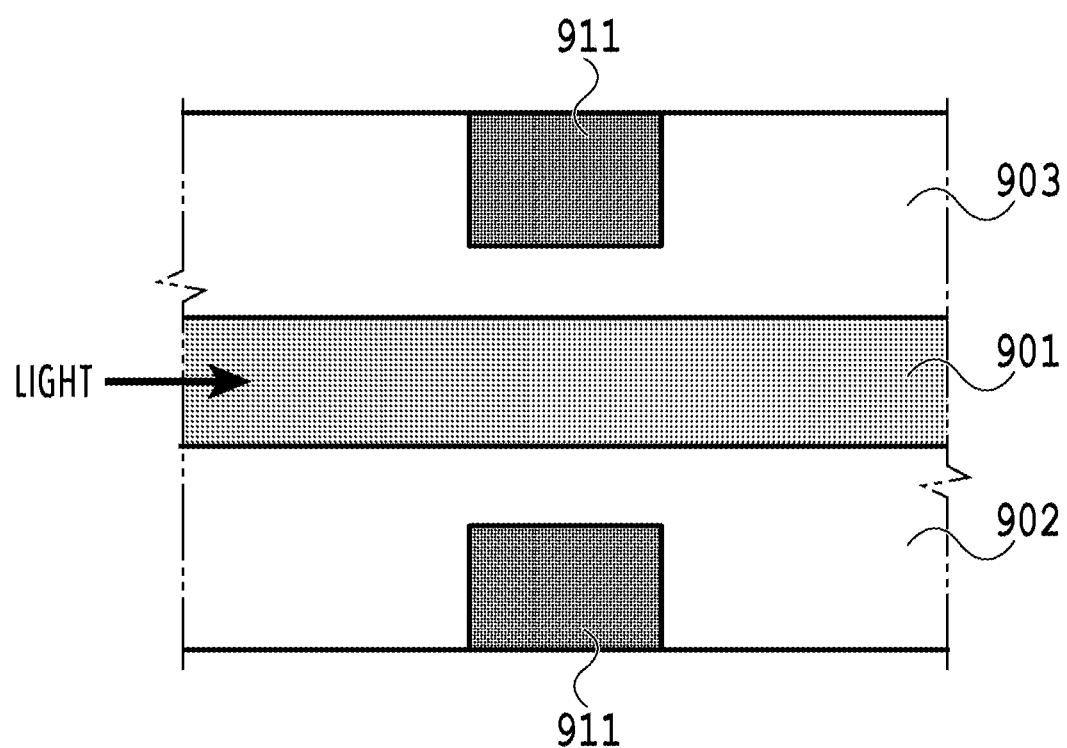
FIG. 31 is a substrate cross-sectional view taken in a longitudinal direction of a waveguide type optical interferometer circuit according to Example 9 of the present invention inclusive of a slab optical waveguide core in a light intensity compensating region.

FIG. 31 shows a substrate cross-sectional view of a light intensity compensating region of a waveguide type optical interferometer circuit according to Example 9 of the present invention, which is taken in a direction along an optical path inclusive of a core of a slab optical waveguide.

In the waveguide type optical interferometer circuit according to Example 9 of the present invention of FIG. 31, a cross-sectional structure of the slab optical waveguide is illustrated as a three-layered structure including a core 901, and an upper clad 903 as well as a lower clad 902 on an upper surface and a lower surface of the core, which are located on a not-illustrated substrate.

In Example 9 of the present invention of FIG. 31, the grooves constituting the light intensity compensating region are not formed in such away as to directly interrupt the core 901 in the slab optical waveguide. Instead, the light intensity compensating region is constructed by providing the upper clad 903 and the lower clad 902 on the upper surface and the lower surface of the core 901 in the slab optical waveguide with zones 911 formed along an optical path in the slab optical waveguide by using a material having a thermal conductivity different from that of the clads. Particularly, the light intensity compensating region is formed by either embedding or attaching a material having a thermal conductivity lower or higher than that of the clads into the zones 911.

By setting the thermal conductivity of each zone 911 different from that of the surrounding clad, it is possible to adjust temperature distribution of the core 901 while bringing about different states of heat dissipation therebetween. The adjustment of the temperature distribution of the core 901 in the slab optical waveguide makes it possible to adjust the light intensity coefficient while suppressing a rise in temperature of a portion where the light intensity is high. In addition to the light intensity compensating region formed from the groove structure, the structure further including such a zone located at a position on a top surface or a bottom surface of the light intensity compensating region to intersect with the optical path in the direction of the substrate plane is also acceptable.

Figure 32:
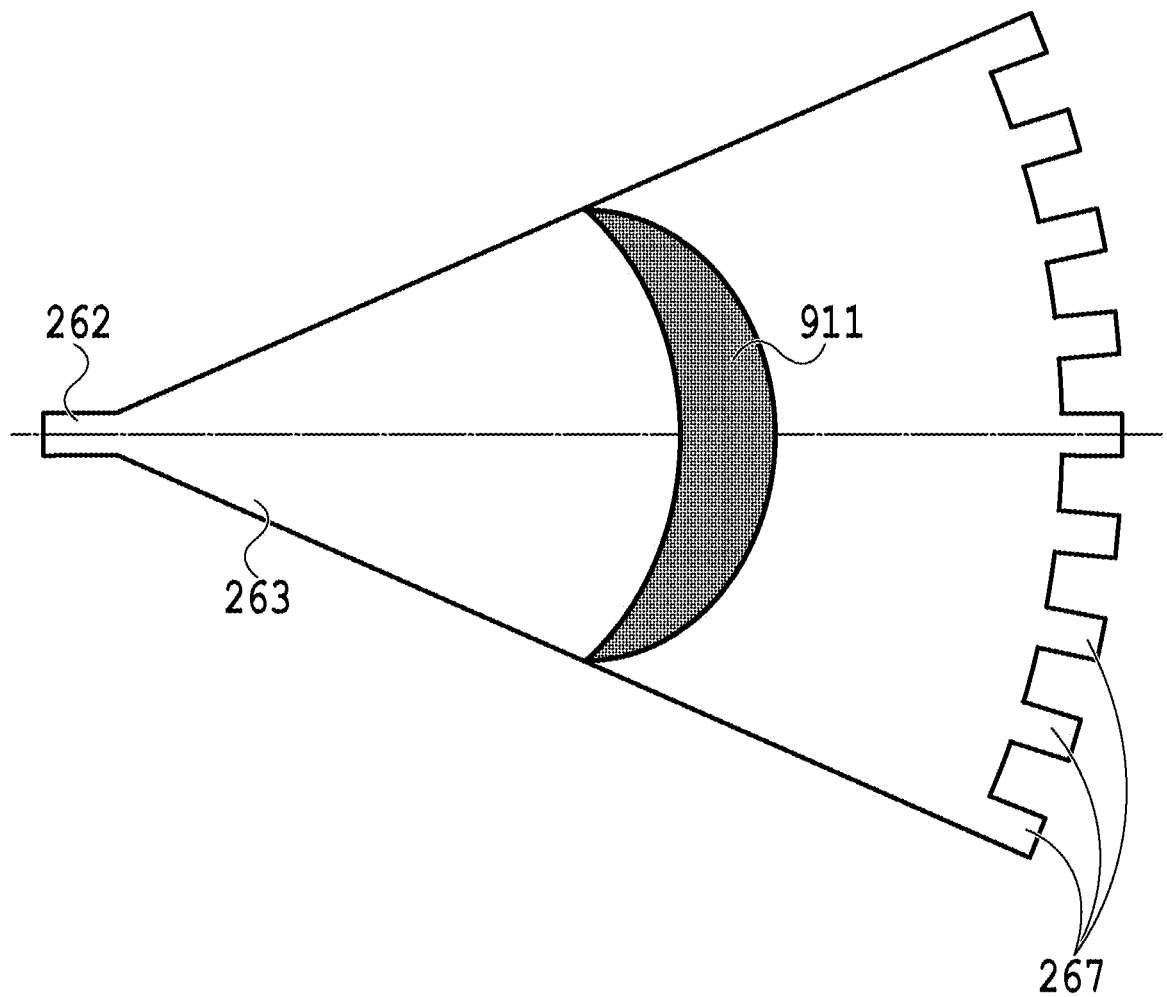
FIG. 32 is a substrate plan view to explain the slab optical waveguide core in the light intensity compensating region of the waveguide type optical interferometer circuit according to Example 9 of the present invention.

FIG. 32 shows a substrate plan view at a core portion of the slab optical waveguide of the light intensity compensating region of the waveguide type optical interferometer circuit according to Example 9 of the present invention.

For example, a case of using the slab optical waveguide 263 of the fan-like tapered shape similar to those in Examples 7 and 8 (FIGS. 26 to 30) as the slab optical waveguide of the optical branching unit as shown in FIG. 32 will be considered. A zone 911 filled with the material having the thermal conductivity different from that of the clads is provided as the light intensity compensating region on the upper surface and the lower surface of the core of the slab optical waveguide 263.

In the optical path from the connecting end of the input waveguide 262 to the optical waveguides 267, the zone 911 is formed at an intersection length that has light intensity distribution in an angular direction being proportional to the Gaussian distribution, thereby causing a difference in state of heat dissipation. In this way, it is possible to adjust the light intensity coefficient while adjusting the temperature distribution caused by the light intensity distribution.

Example 10

Figure 33:
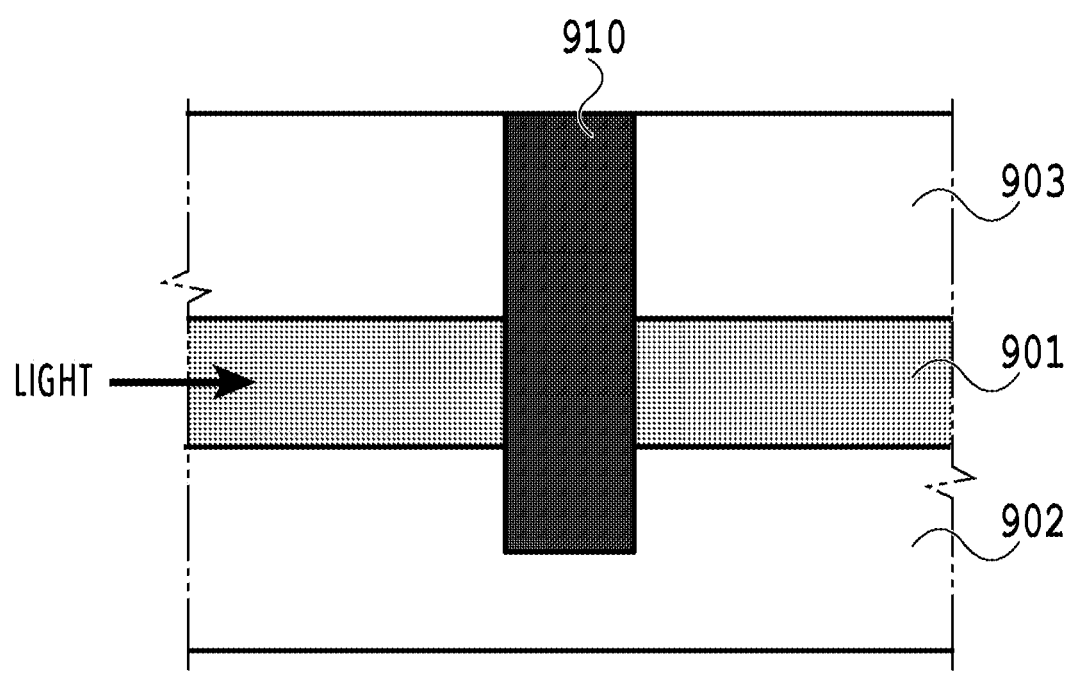
FIG. 33 is a substrate cross-sectional view taken in a longitudinal direction of a waveguide type optical interferometer circuit according to Example 10 of the present invention inclusive of a slab optical waveguide core in a light intensity compensating region.

FIG. 33 shows a substrate cross-sectional view of a light intensity compensating region of a waveguide type optical interferometer circuit according to Example 10 of the present invention, which is taken in a direction along an optical path inclusive of a core of a slab optical waveguide.

In the Example 10 as well, the slab optical waveguide is illustrated as the three-layered structure including the core 901, and the upper clad 903 as well as the lower clad 902 on the upper surface and the lower surface of the core as with Example 9.

In Example 10 of the present invention in FIG. 33, a groove 910 is formed in such a way as to intersect with and block the core 901 at least partially, and the light intensity compensating region is constructed by packing the light intensity compensating material therein.

The optical waveguide may adopt an embedded waveguide structure formed from the lower clad, the core, and the upper clad. The light intensity compensating region may be formed on a plane intersecting with a direction of travel of a lightwave, and may construct a groove structure that crosses the core at least partially and intersects with the upper clad, the core, and the lower clad.

In particular, the embedded waveguide structure is highly desirable as the structure of the present invention because of being excellent in confining optical signals and being capable of packing the light intensity compensating material easily into the groove by forming the groove structure that cuts across the upper clad, the core, and the lower clad. The substrate cross-sectional structures as disclosed in Examples 9 and 10 can realize the structures of the light intensity compensating regions of the present invention inclusive of the following examples.

Each of the following Examples 11 to 15 explains an example of forming a light intensity compensating region on at least one of multiple optical waveguides having different lengths from each other and being interposed between an optical branching unit and an optical coupling unit.

Example 11

Figure 34:
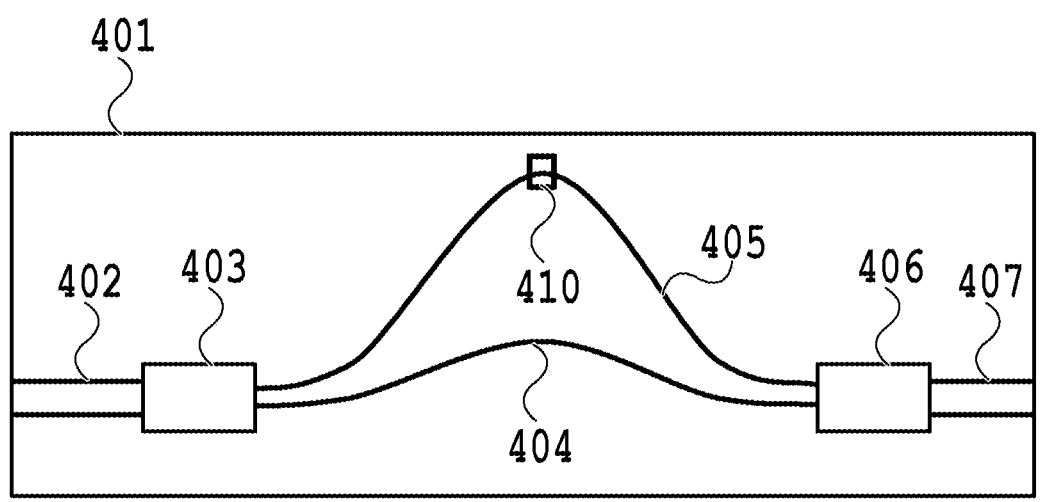
FIG. 34 is a substrate plan view to explain a configuration of a waveguide type optical interferometer circuit according to Example 11 of the present invention.

FIG. 34 is a substrate plan view to explain a configuration of a waveguide type optical interferometer circuit according to Example 11 of the present invention. In FIG. 34, two input waveguides 402, directional couplers 403 and 406, two arm waveguides 404 and 405 that have different lengths from each other and are connected while being interposed between the two couplers, and two output waveguides 407 are formed on a substrate 401 of a planar lightwave circuit (PLC) as with the optical multiplexer-demultiplexer adopting the Mach-Zehnder interferometer circuit in FIG. 1.

The above-mentioned waveguide type optical interferometer circuit, along with the case of the AWG configuration, can be said to be an optical interferometer circuit formed in the same plane, which includes the optical branching unit, the optical coupling unit, and optical paths formed from multiple optical waveguides having different lengths from one another and being interposed between the optical branching unit and the optical coupling unit.

In the waveguide type optical interferometer circuits according to Example 11 of the present invention in FIG. 34, a groove 410 filled with the material for light intensity compensation is provided in the middle of the arm waveguide 405, which constitutes the light intensity compensating region formed from the material having the light intensity coefficient different from the light intensity coefficient of the arm waveguide.

As with Example 1 (FIG. 4), regarding the two arm waveguides 404 and 405 having the different lengths from each other, a total incident light intensity to be made incident on the directional coupler 403 (the optical branching unit) is defined as Ptotal. Meanwhile, regarding an i-th (i=1 or 2) arm waveguide, the optical distance of each arm waveguide in the case of incidence of Ptotal is defined as Li, and a light intensity coefficient of the optical distance of each arm waveguide relative to the total incident light intensity Ptotal is defined as dLi/dPtotal. In this case, the number of the light intensity compensating regions (grooves), lengths thereof, and a filling material are configured to satisfy:

$$dLi/dPtotal < 25 (\mu m/W)$$

Here, two or more grooves may be provided to the light intensity compensating region.
(Grounds for Limitation of Formula (6))

In a case of considering an application to a spectroscope (a light source of 0.5 W or above) in the infrared range from about 2.5 μm to about 25 μm, for example, it is possible to split a measurement spectrum at least into a half as large as a measurement range if a bandpass filter having a half width of 25 μm can be realized. Accordingly, the respective arms are set to satisfy $$dLi/dPtotal < 25\ \mu m/2/0.5\ W = 25\ \mu m/W,$$

thus balancing the light intensity compensation.

In the case of forming the AWG as the waveguide type optical interferometer circuit, the light intensity compensating region (grooves) may be provided to each of the arrayed optical waveguides. Moreover, multiple light intensity compensating regions (grooves) having lengths and intervals identical to or different from each other may be provided at an interval in the direction of the optical guided wave to one optical waveguide. In other words, it is possible to balance the light intensity compensation between the arms in accordance with the conditions of the aforementioned Formula (6) by providing at least one light intensity compensating region, which has the light intensity coefficient different from the light intensity coefficient of the optical distance of the waveguide, to at least one of the waveguides.

Example 12

Figure 35A:
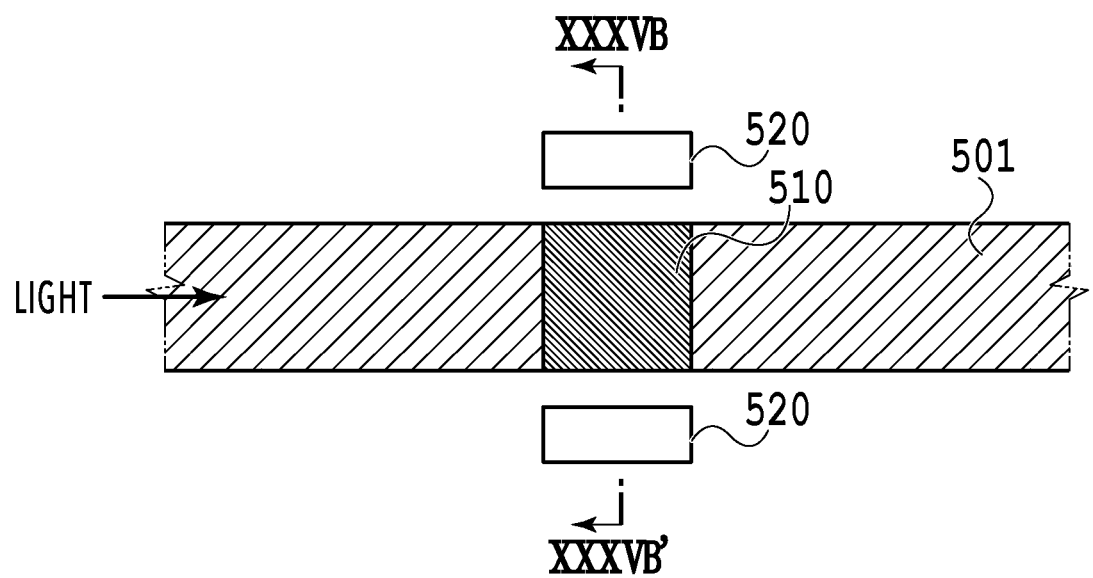
FIG. 35A is a substrate plan view A to explain a structure in the vicinity of a core in a light intensity compensating region in an optical waveguide of a waveguide type optical interferometer circuit according to Example 12 of the present invention.
Figure 35B:
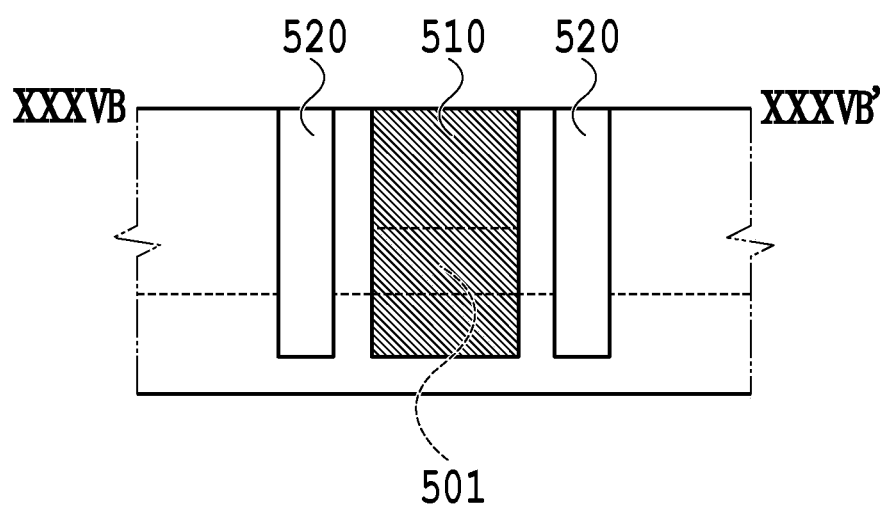
FIG. 35B is a cross-sectional view B which is perpendicular to the core of the optical waveguide of the waveguide type optical interferometer circuit according to Example 12 of the present invention.

FIG. 35A is a substrate plan view to explain a structure in the vicinity of a plane including a core in a light intensity compensating region in an optical waveguide of a waveguide type optical interferometer circuit according to Example 2 of the present invention, and FIG. 35B is a substrate cross-sectional view B of a cross-section 35B-35B' perpendicular to the core.

The optical waveguide of the waveguide type optical interferometer circuit according to Example 12 of the present invention in FIGS. 35A and 35B is characterized in that grooves 520 for temperature adjustment are formed and located along the waveguide around a groove 510, which is provided to a core 501 of the optical waveguide as a groove that intersects with the optical waveguide at least partially, thus serving as the light intensity compensating region. It is possible to form one or more groove structures as mentioned above around the light intensity compensating region so as to impart a temperature adjustment effect such as heat insulation and heat retention by using air or vacuum.

These grooves 520 for temperature adjustment may be filled with a material having a thermal conductivity different from that of the surroundings, in particular, a material having a thermal conductivity lower or higher than that of the surroundings, respectively. In this way, it is possible to bring about a difference in state of heat dissipation and thus to adjust temperature distribution.

Meanwhile, the above-mentioned grooves 520 for temperature adjustment need not be formed especially in a case where the optical waveguide is a waveguide of a ridge type, a (high) mesa-type, or the like. In this case, it is also possible to bring about a difference in state of heat dissipation and to adjust the temperature distribution by covering side surfaces of the core or an upper surface of the core with a material having a thermal conductivity different from that of the surroundings, in particular, a material having a thermal conductivity lower or higher than that of the surroundings, for example.

Example 13

The following Examples 13 to 15 each describe a case of forming a structure of a light intensity compensating region as one or more groove structures each intersecting with an optical waveguide and being filled with a light intensity compensating material. Specifically, a description will be given of a case where the light intensity compensating region is formed as multiple grooves having different lengths in a direction of an optical guided wave, and is designed to compensate for a change in optical distance relative to a desired light intensity by filling those grooves with the same light intensity compensating material that has a positive light intensity coefficient. In this case, the change in optical distance in the light intensity compensating region is proportional to physical distances of the grooves. Accordingly, the change in optical distance in the light intensity compensating region will be described briefly by use of the lengths of the groove. In reality, however, it is obvious that the light intensity compensating region can achieve a similar effect also by forming multiple grooves of the same physical length and filling the respective grooves with light intensity compensating materials of different types each having a desired light intensity coefficient, for example. The lengths of the grooves and the lengths of the optical waveguides between the grooves illustrated in the respective drawings below are defined as the optical distances with respect to the light intensity of the relevant light intensity compensating region.

Moreover, if the light intensity coefficient of the optical waveguide of its own is greater than the light intensity coefficient of the light intensity compensating material in the aforementioned waveguide type optical interferometer circuit, then it is needless to say that the relative light intensity coefficient of the light intensity compensating material can be defined as being "negative".

Figure 36:
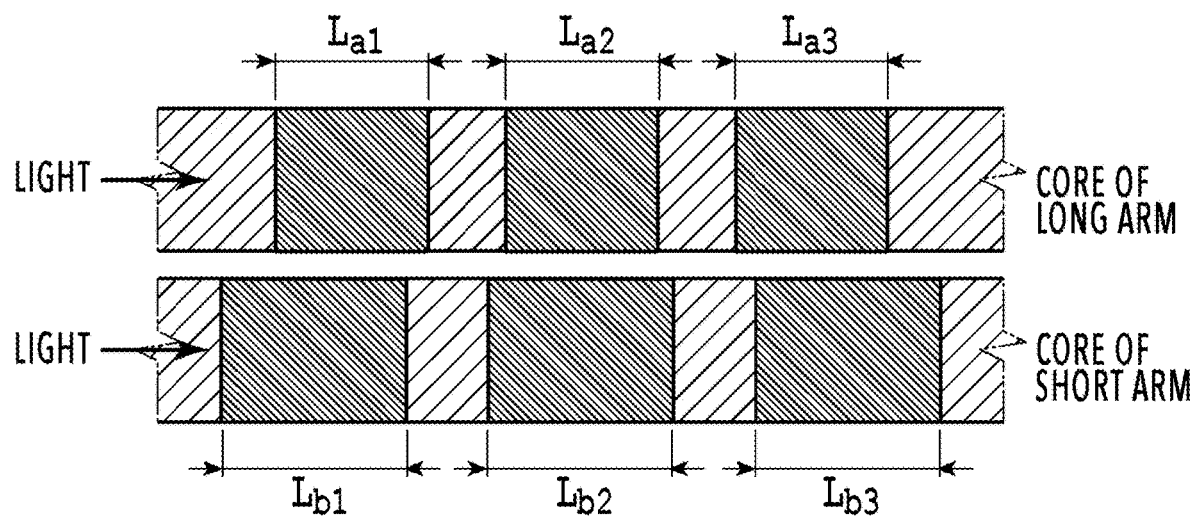
FIG. 36 is a substrate plan view to explain structures of optical waveguides of a waveguide type optical interferometer circuit according to Example 13 of the present invention while comparing a short arm with a long arm.

FIG. 36 is a substrate plan view to explain structures of optical waveguides of a waveguide type optical interferometer circuit according to Example 13 of the present invention while comparing a short arm with a long arm.

The structures of the optical waveguides of the waveguide type optical interferometer circuit according to Example 13 of the present invention in FIG. 36 are designed to improve the balance of the light intensity compensation among the multiple light intensity compensating regions (the grooves) located in respective arms of different lengths in the interferometer, by setting an average value of "groove lengths on the long arm" (an optical distance) smaller than an average value of "groove lengths on the short arm" (an optical distance).

The waveguide type optical interferometer circuit according to Example 13 is an optical interferometer formed in the same plane. The optical interferometer includes an optical branching unit, an optical coupling unit, and multiple optical waveguides having different lengths from one another and being interposed between the optical branching unit and the optical coupling unit.

The waveguide type optical interferometer circuit is characterized in that an average value $L_{aj}$ ($L_{aj}=(L_{a1}+L_{a2}+L_{a3})/3$ in FIG. 36) of lengths of j pieces (j is a positive integer) of light intensity compensating regions formed by breaking up a sum $L_a$ of the length of the light intensity compensating region into j pieces in one of the waveguides having a longer length out of the waveguides having different lengths is made smaller than an average value $L_{bk}$ ($L_{bk}=(L_{b1}+L_{b2}+L_{b3})/3$ in FIG. 36) of lengths of k pieces (k is a positive integer) of light intensity compensating regions formed by breaking up a sum $L_b$ of the length of the light intensity compensating region into k pieces in another one of the waveguides having a shorter length out of the waveguides having different lengths.

In other words, the balance of the light intensity compensation between the two arms can be improved by setting the average value $L_{aj}$ of the groove lengths on the long arm smaller than the average value $L_{bk}$ of the groove lengths on the short arm regarding the multiple light intensity compensating regions located in the respective arms of the interferometer so as to satisfy:

$$L_{aj} < L_{bk} \qquad \text{Formula (11)}.$$

Note that both of the long and short arms shown as an example here encompass not only the arms in the Mach- Zehnder interferometer (MZI) but also any two of multiple waveguides with different lengths in the arrayed waveguide type wavelength multiplexer-demultiplexer (AWG) and the same applies to the following examples.

Meanwhile, regarding the values of j and k each being a positive integer, FIG. 36 shows the case where j=3 and k=3 while the average values of the groove lengths are defined by breaking up the respective sums. However, it is obvious that the lengths of the light intensity compensating regions (the grooves) may be different from or equal to one another. Here, j does not have to be equal to k. In the meantime, even in the case where j=1 or k=1, in other words, in the case where there is only one groove, the average value of the groove lengths can naturally be defined as the length of the single groove.

Example 14

Figure 37:
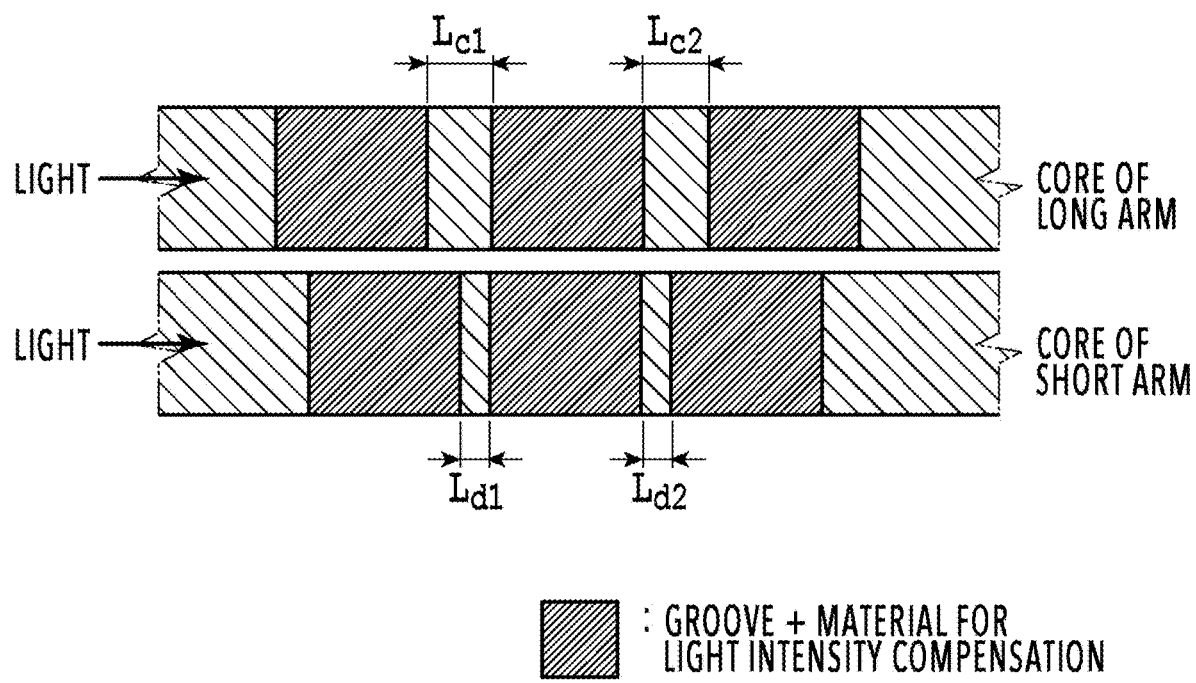
FIG. 37 is a substrate plan view to explain structures of optical waveguides of a waveguide type optical interferometer circuit according to Example 14 of the present invention while comparing a short arm with a long arm.

FIG. 37 is a substrate plan view to explain structures of optical waveguides of a waveguide type optical interferometer circuit according to Example 14 of the present invention while comparing a short arm with a long arm.

The structures of the optical waveguides of the waveguide type optical interferometer circuit according to Example 14 of the present invention in FIG. 37 are designed to improve the balance of the light intensity compensation among the multiple light intensity compensating regions located in respective arms of different lengths in the interferometer, by setting an average value of lengths (an optical distance) of "the optical waveguide between grooves in the long arm" larger than an average value of lengths (an optical distance) of "the optical waveguide between grooves in the short arm".

The waveguide type optical interferometer circuit according to Example 14 is an optical interferometer formed in the same plane. The optical interferometer includes an optical branching unit, an optical coupling unit, and multiple optical waveguides having different lengths from one another and being interposed between the optical branching unit and the optical coupling unit.

The waveguide type optical interferometer circuit is characterized in that an average value Lcj (Lcj=(Lc1+Lc2)/2 in FIG. 37) of lengths of j–1 pieces (j is a positive integer not less than 2) of light intensity compensating regions formed by breaking up a sum Lc of the length of the light intensity compensating region into j pieces in one of the waveguides having a longer length out of the waveguides having different lengths is made larger than an average value Ldk (Ldk=(Ld1+Ld2)/2 in FIG. 37) of lengths of k–1 pieces (k is a positive integer not less than 2) of light intensity compensating regions formed by breaking up a sum Ld of the length of the light intensity compensating region into k pieces in another one of the waveguides having a shorter length out of the waveguides having different lengths.

In other words, the balance of the light intensity compensation between the two arms can be improved by setting the average value Lcj of the lengths of the optical waveguide between the grooves on the long arm larger than the average value Ldk of the lengths of the optical waveguide between the grooves on the short arm regarding the multiple light intensity compensating regions located in the respective arms of the interferometer so as to satisfy:

$$Lcj > Ldk \quad \text{Formula (12)}.$$

Meanwhile, regarding the values of j and k each being a positive integer not less than 2, FIG. 37 shows the case where j=3 and k=3 while the average values of the optical waveguides between the light intensity compensating regions (the grooves) are defined by breaking up the respective sums. However, it is obvious that the lengths of the optical waveguides between the grooves may be different from or equal to one another. Here, j does not have to be equal to k. Both of the values of j and k have to be 2 or above in order to provide at least one section of each optical waveguide in existence between the grooves. Even in the case where j=2 or k=2, in other words, in the case where there is only one section of the optical waveguide between the grooves, the average value of the lengths of the optical waveguide between the grooves can be defined as the length of the single section of the optical waveguide between the grooves.

Example 15

Figure 38:
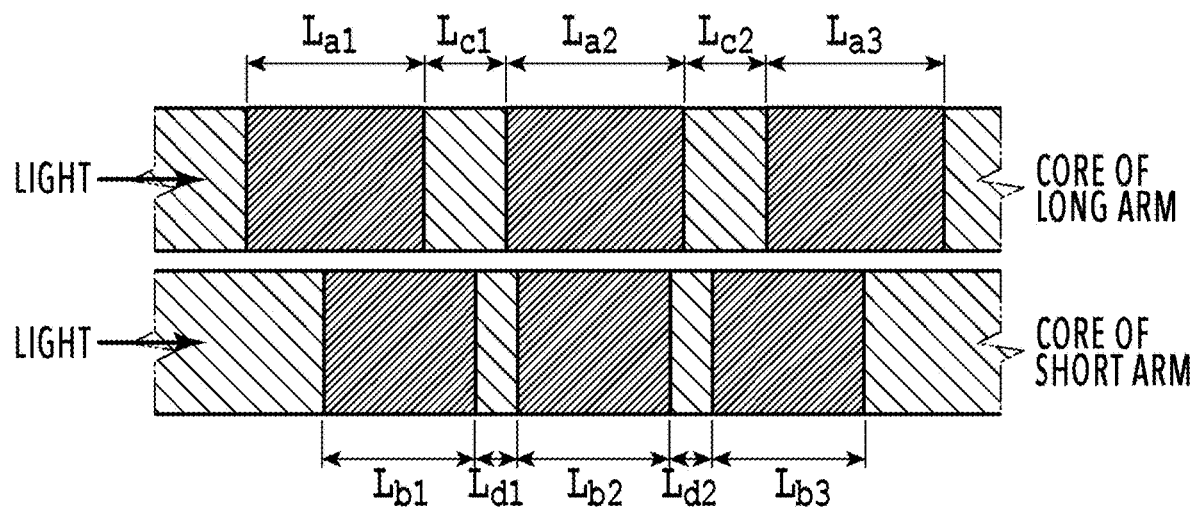
FIG. 38 is a substrate plan view to explain structures of optical waveguides of a waveguide type optical interferometer circuit according to Example 15 of the present invention while comparing a short arm with a long arm.

FIG. 38 is a substrate plan view to explain structures of optical waveguides of a waveguide type optical interferometer circuit according to Example 15 of the present invention while comparing a short arm with a long arm.

The structures of the optical waveguides of the waveguide type optical interferometer circuit according to Example 15 of the present invention in FIG. 38 are designed to improve the balance of the light intensity compensation by setting a ratio of "groove lengths" (an optical distance) relative to "optical waveguide lengths" (an optical distance) between the respective grooves of the light intensity compensating regions on the long arm of the MZI smaller than a ratio of "groove lengths" (an optical distance) relative to "optical waveguide lengths" (an optical distance) between the respective grooves of the light intensity compensating regions on the short arm thereof. High optical power resistance is imparted simply by breaking off the light intensity compensating regions into more pieces and thus improving heat dissipation. This structure intends definition and restriction as the ratio of the "groove lengths" to the "optical wavelengths" between the grooves.

The waveguide type optical interferometer circuit according to Example 15 is an optical interferometer formed in the same plane. The optical interferometer includes an optical branching unit, an optical coupling unit, and multiple optical waveguides having different lengths from one another and being interposed between the optical branching unit and the optical coupling unit.

The waveguide type optical interferometer circuit is characterized in that, in a case where a ratio of the average value Laj of the lengths of the respective light intensity compensating regions formed by breaking up the sum La of the length of the light intensity compensating region into j pieces (j is a positive integer not less than 2) to the average value Lcj of the lengths of j–1 sections of the optical waveguide between the respective light intensity compensating regions in one of the waveguides having a longer length out of the waveguides having different lengths is defined as (Laj/Lcj), while a ratio of the average value Lbk of the lengths of the respective light intensity compensating regions formed by breaking up the sum Lb of the length of the light intensity compensating region into k pieces (k is a positive integer not less than 2) to the average value Ldk of the lengths of k–1 sections of the optical waveguide between the respective light intensity compensating regions in one of the waveguides having a shorter length out of the waveguides having different lengths is defined as (Lbk/Ldk), the waveguide type optical interferometer circuit satisfies:

$$(Laj/Lcj) \leq (Lbk/Ldk) \quad \text{Formula (13)}$$

The conditions of this Formula (11) do not conflict with the conditions of Formula (12). Let us consider a case where the aforementioned average values of the groove lengths are Laj=1 and Lbk=3 and the average values of the lengths of the sections of the optical waveguide between the grooves are Lcj=2 and Ldk=1. Here, the ratio according to Formula (13) turns out to be (1/2)≤(3/1) while satisfying the conditions of Formula (11) and Formula (12). Thus, all the three formulae are satisfied. In this way, it is possible to further improve the balance of the light intensity compensation between the two arms.

Meanwhile, regarding the values of j and k each being a positive integer not less than 2, FIG. 38 shows the case where j=3 and k=3 while the average values of the groove lengths are defined by breaking up the respective sums. However, it is obvious that the lengths of the light intensity compensating regions (the grooves) and of the sections of the optical waveguides between the grooves may be different from or equal to one another. Here, j does not have to be equal to k. Both of the values of j and k have to be 2 or above in order to provide at least one section of each optical waveguide in existence between the grooves. In the case where there is one section of the optical waveguide between the grooves, the average value can be defined as the length of the single section of the optical waveguide between the grooves.

(Waveguide Materials)

In any of the examples, various optical materials can be used as waveguide materials for the upper clad, the core, and the lower clad. Specifically, as the material of the core, it is possible to use $SiO_2$ (silica glass) with an increased refractive index by containing a dopant selected from the materials including Ge (germanium), B (boron), P (phosphorus), Sn (tin), Al (aluminum), Ti (titanium), Mg (magnesium), Nb (niobium), Zr (zirconia), Hf (hafnium), and the like. In this case, pure $SiO_2$ (silica glass) or $SiO_2$ (silica glass) containing a dopant that undergoes an adjustment of a difference in refractive index from that in the core can be used as a waveguide material for the upper clad and the lower clad.

INDUSTRIAL APPLICABILITY

As described above, the present invention can be used in an optical waveguide circuit and an optical waveguide circuit module including the optical waveguide circuit, which are used in spectroscopic analysis techniques employing high intensity incident light, photoanalysis techniques adopting light scattering and the like, and moreover, in the fields of optical communication or optical information processing. The specification also discloses a method of manufacturing the optical waveguide circuit. In particular, the present invention is applicable to a guided wave type optical element with optical characteristics not dependent on an optical signal intensity, or more specifically, to a waveguide type optical interferometer circuit such as an optical wavelength multiplexer-demultiplexer formed from waveguides formed on a planar substrate, of which optical characteristics are less likely to vary with an increase in optical signal intensity.

REFERENCE SIGNS LIST 101, 201, 401, 501, 601 substrate
102, 202, 402, 502, 262 input waveguide
103, 106 directional coupler
403, 406 MMI
263, 503, 506 slab optical waveguide
104, 105, 404, 405 arm waveguide
107, 208, 407, 508 output waveguide
203 optical branching unit
206 optical coupling unit
207, 507, 267 (arrayed) optical waveguide
610. 620, 5041 to 5043, 131 to 133, 141 to 143, 151 to 153, 2641 to 2645, 2741 to 2745, 2841 to 2845, 2941 to 2945, 3041 to 3044, 910, 410 groove
408, 504 light intensity compensating region
520 groove for temperature adjustment
603, 901 core layer
602, 902 lower clad layer
603, 903 upper clad layer
640 high intensity light
911 zone formed from material having different thermal conductivity

The invention claimed is:

1. A waveguide type optical interferometer circuit formed in one plane comprising:
   an input waveguide;
   an optical branching unit;
   an optical coupling unit;
   an output waveguide;
   a plurality of optical waveguides having different lengths from each other and being interposed between the optical branching unit and the optical coupling unit, and
   a light intensity compensating region provided to at least one of the optical branching unit the optical coupling unit and formed as at least one groove intersecting with and optical path, wherein
   a straight line of the optical path joining a center of a connecting end from the input waveguide to a center of a connecting end to the i-th, where i is a positive integer, optical waveguide interposed between the optical branching unit and the optical coupling unit in a case of absence of the light intensity compensating region is defined as K,
   an optical distance of K is defined as Lai,
   an optical distance of the i-th optical waveguide is defined as Lbi,
   a total value of changes in optical distances due to formation of the light intensity compensating region having a groove width of the groove intersected by the optical path of the i-th straight line K is defined as Lri, and
   a light intensity coefficient of a prescribed optical distance with respect to a total incident light intensity Ptotal is defined as d/dPtotal,
   the waveguide type optical interferometer circuit satisfies $d(2 \times Lai + Lbi + Lri)/dPtotal = C$, where i=1 to N, C is a constant value irrespective of the value of i, and N is the number of the optical waveguides.

2. The waveguide type optical interferometer circuit according to claim 1, wherein
   if a total value of an optical distance of a groove width of the groove intersected by the j-th optical path, where j is a positive integer not equal to i, is defined as Lrj, the waveguide type optical interferometer circuit satisfies $Lri > Lrj$, n a case where the optical distance Lbi of the i-th optical waveguide is larger than an optical distance Lbj of the j-th optical waveguide.

3. The waveguide type optical interferometer circuit according to claim 1, wherein
if a total value of an optical distance of an interval between the grooves intersected by the i-th optical path is defined as Lqi, and
a total value of an optical distance of an interval between the grooves intersected by the j-th optical path, where j is a positive integer not equal to i, is defined as Lqj,
the waveguide type optical interferometer circuit satisfies Lqi>Lqj, in a case where the optical distance Lbi of the i-th optical waveguide is larger than an optical distance Lbj of the j-th optical waveguide.

4. The waveguide type optical interferometer circuit according to claim 1, wherein
if a total value of an optical distance of the groove width of the groove intersected by the j-th optical path, where j is a positive integer not equal to i, is defined as Lrj,
a total value of an optical distance of an interval between the grooves intersected by the i-th optical path is defined as Lqi, and
a total value of an optical distance of an interval between the grooves intersected by the j-th optical path is defined as Lqj,
the waveguide type optical interferometer circuit satisfies (Lri/Lqi)≤(Lrj/Lqj), in a case where the optical distance Lbi of the i-th optical waveguide is larger than an optical distance Lbj of the j-th optical waveguide.

5. The waveguide type optical interferometer circuit according to claim 1, wherein any of a total of a groove width of the groove and a total of an interval between the plurality of grooves is proportional to light intensity distribution in a case where the light made incident from the input optical waveguide is radiated inside the optical branching unit.

6. The waveguide type optical interferometer circuit according to claim 5, wherein
if a radiation angle of a straight line of the i-th optical path, where i is a positive integer, relative to a center axis is defined as θi and a total of an optical distance of an interval between the grooves intersected by the straight line of the optical path is defined as Lqi,
Lqi is a function of θ and is a function of Gaussian distribution.

7. The waveguide type optical interferometer circuit according to claim 5, wherein
if a radiation angle of a straight line of the i-th optical path, where i is a positive integer, relative to a center axis is defined as θi and a total of an optical distance of the groove width intersected by the straight line of the optical path is defined as Lri,
Lri is a function of θ, and
a difference obtained by subtracting Lri from a constant is a function of Gaussian distribution.

8. The waveguide type optical interferometer circuit according to claim 5, wherein
if a radiation angle of a straight line of the i-th optical path, where i is a positive integer, relative to a center axis is defined as θi and a total of an optical distance of an interval between the grooves intersected by the straight line of the optical path is defined as Lqi,
Lqi is a function of θ and is a Sinc function.

9. The waveguide type optical interferometer circuit according to claim 5, wherein
if a radiation angle of a straight line of the i-th optical path, where i is a positive integer, relative to a center axis is defined as θi and a total of an optical distance of the groove width intersected by the straight line of the optical path is defined as Lri,
Lri is a function of θ, and
a difference obtained by subtracting Lri from a constant is a Sinc function.

10. The waveguide type optical interferometer circuit according to claim 1, wherein the waveguide type optical interferometer circuit has a structure in which a material having a different thermal conductivity is located on a top surface or a bottom surface of the light intensity compensating region and along the optical path.

11. The waveguide type optical interferometer circuit according to claim 1, wherein
any of the optical branching unit and the optical coupling unit is formed from a slab optical waveguide and adopts an embedded waveguide structure including a lower clad, a core, and an upper clad, and
the light intensity compensating region forms a groove structure that intersects with the optical path and intersects with the core at least partially.

12. The waveguide type optical interferometer circuit according to claim 1, further comprising a second light intensity compensating region provided to at least one of the plurality of optical waveguides.

13. The waveguide type optical interferometer circuit according to claim 12, wherein the light intensity compensating region is formed from a groove at least partially intersecting with the optical waveguide.

14. The waveguide type optical interferometer circuit according to claim 12, wherein a groove for temperature adjustment is formed around the second light intensity compensating region and along the optical waveguide.

15. The waveguide type optical interferometer circuit according to claim 12, further comprising:
a structure to locate a material having a different thermal conductivity around the second light intensity compensating region and along the optical waveguide.

16. The waveguide type optical interferometer circuit according to claim 12, wherein an average value Laj of optical distances of a plurality of the second light intensity compensating regions in one optical waveguide having a longer waveguide length out of the plurality of optical waveguides having different lengths is smaller than an average value Lbk of optical distances of a plurality of the second light intensity compensating regions in another optical waveguide having a shorter waveguide length out of the plurality of optical waveguides having different lengths.

17. The waveguide type optical interferometer circuit according to claim 12, wherein an average value Lcj of an optical distance of the optical waveguide between a plurality of the second light intensity compensating regions in one optical waveguide having a longer waveguide length out of the plurality of optical waveguides having different lengths is larger than an average value Ldk of an optical distance of the optical waveguide between the plurality of the second light intensity compensating regions in another optical waveguide having a shorter waveguide length out of the plurality of optical waveguides having different lengths.

18. The waveguide type optical interferometer circuit according to claim 12, wherein
if a ratio of an average value Laj of optical distances of a plurality of the second light intensity compensating regions to an average value Lcj of an optical distance of the optical waveguide between the plurality of second light intensity compensating regions in one optical waveguide having a longer waveguide length out of the plurality of optical waveguides having different lengths is defined as (Laj/Lcj), and a ratio of an average value Lbk of optical distances of a plurality of the second light intensity compensating regions to an average value Ldk of an optical distance of the optical waveguide between the plurality of second light intensity compensating regions in another optical waveguide having a shorter waveguide length out of the plurality of optical waveguides having different lengths is defined as (Lbk/Ldk), the waveguide type optical interferometer circuit satisfies $(Laj/Lcj) \leq (Lbk/Ldk)$.

19. The waveguide type optical interferometer circuit according to claim 12, wherein the optical waveguide adopts an embedded waveguide structure including a lower clad, a core, and an upper clad, and the light intensity compensating region forms a groove structure that intersects with a direction of travel of a lightwave and intersects with the core at least partially.

* * * * *